(12) United States Patent
Tamatsu

(10) Patent No.: US 7,765,180 B2
(45) Date of Patent: *Jul. 27, 2010

(54) DATABASE RE-ORGANIZING SYSTEM AND DATABASE

(75) Inventor: Masaharu Tamatsu, Toma (JP)

(73) Assignee: Annex Systems Incorporated, Tokyo (JP)

(*) Notice: Subject to any disclaimer, the term of this patent is extended or adjusted under 35 U.S.C. 154(b) by 754 days.

This patent is subject to a terminal disclaimer.

(21) Appl. No.: 10/527,050

(22) PCT Filed: Sep. 10, 2003

(86) PCT No.: PCT/JP03/11592

§ 371 (c)(1),
(2), (4) Date: May 4, 2005

(87) PCT Pub. No.: WO2004/025475

PCT Pub. Date: Mar. 25, 2004

(65) Prior Publication Data

US 2006/0143238 A1 Jun. 29, 2006

(30) Foreign Application Priority Data

Sep. 10, 2002 (JP) .............................. 2002-264283

(51) Int. Cl.
*G06F 17/00* (2006.01)
(52) U.S. Cl. ........................ 707/101; 707/100; 707/102
(58) Field of Classification Search .......... 707/100–102
See application file for complete search history.

(56) References Cited

U.S. PATENT DOCUMENTS

| | | | | |
|---|---|---|---|---|
| 5,006,978 A | * | 4/1991 | Neches | 718/102 |
| 6,070,170 A | * | 5/2000 | Friske et al. | 1/1 |
| 6,519,613 B1 | * | 2/2003 | Friske et al. | 1/1 |
| 2003/0074600 A1 | * | 4/2003 | Tamatsu | 714/6 |
| 2003/0135478 A1 | * | 7/2003 | Marshall et al. | 707/1 |
| 2004/0215948 A1 | * | 10/2004 | Abbey et al. | 713/1 |
| 2006/0059253 A1 | * | 3/2006 | Goodman et al. | 709/223 |
| 2006/0106835 A1 | * | 5/2006 | Murray et al. | 707/100 |

FOREIGN PATENT DOCUMENTS

JP 11-031096 A 2/1999

OTHER PUBLICATIONS

Junichi Aoe, Dynamic hash method and application thereof, 33, Journal of Information Processing Society of Japan, P1465; 3-19, P1468; 21-50 (1992).

* cited by examiner

*Primary Examiner*—Sana Al-Hashemi
(74) *Attorney, Agent, or Firm*—Apex Juris, pllc; Tracy M Heims

(57) ABSTRACT

A reorganization system permitting reorganization in an operating implementation of the data storage and retrieval system invention disclosed in Japanese Patent Hei11-310096 Japanese Patent 3345628. The invention permits the reorganization of primary keys and blocks storing records by means of the provision of current location tables LC and new location tables LN and writing location table entries from LC to LN for one or multiple blocks in a given reorganization pass. Alternate-key indices may also be reorganized in the same fashion. Reorganization is performed continuously. The use of reorganization pointers to indicate during reorganization how far reorganization has advanced permits reorganization of a database without suspending the database while executing data retrieval, addition, updating and deletion by means of primary keys and alternate keys.

6 Claims, 21 Drawing Sheets

DATABASE RE-ORGANIZING SYSTEM AND DATABASE

DETAILED DESCRIPTION OF THE INVENTION

1. Field of the Invention

The invention relates to the field of computerized database storage and retrieval systems and particularly to database systems that permit the uninterrupted and automatic reorganization of the database while the system is operating.

2. Description of Related Art

Conventional computerized database storage and retrieval systems have generally employed hierarchical indices, as described in Jeffrey D. Ullman, *Deetabaesu Shisutemu no Genri* [Principles of Database Systems], 1st ed. (trans. Kunii et al., Nihon Konpyuuta Kyoukai, 25 May 1985, pp. 45-71), Samuel Leffler et al., *UNIX (Touroku Shoyhyou)* 4.3*BSD no Sekkei to Jissou* [The Design and Implementation of UNIX® BSD 4.3] (trans. Akira Nakamura et al., Maruzen K. K., 30 Jun. 1991, pp. 193-191) and Michael J. Folk et al., "Fairu Kouzou" [File Structures], bit supplement (trans. H. Kusumoto, Kyouritsu Shuppan K. K., 5 Jun. 1997, pp. 169-191).

These conventional database storage and retrieval systems suffer from such shortcomings as:

(1) Load deriving from the creation and maintenance of indices;

(2) The need for advance generation of blocks of the size that is the maximum that is foreseen will be utilized; and (3) Susceptibility, due to the hierarchical structure of the indices, to the expansion of exclusion ranges and deadlock resulting from modifications to a higher-order index when the insertion or deletion of data results in the updating of an index.

In order to resolve these shortcomings of conventional database storage and retrieval systems, the inventors have proposed a data storage and retrieval system (Japanese Provisional Patent publication No. 11-231096, Japanese Patent No. 3345628, and U.S. Pat. Nos. 6,415,375 and 6,654,868) providing acceleration and ease of maintenance through the utilization of such means as the introduction of the concepts of location tables and alternate-key tables instead of conventional hierarchical indices, the simplification of the complex processing that accompanies indexing and the application of binary searches on the tables themselves.

A simple description follows of the data storage and retrieval system proposed by the inventors. The data storage and retrieval system of the invention employs location tables and alternate-key tables and applies binary-search techniques to these tables to retrieve target records. Records are stored in storage regions of fixed length termed blocks. Location tables are reserved in contiguous regions. These contiguous regions are in logical order and may be in physically separate regions. Records are stored in blocks. Block addresses are held in location table entries. Records are stored in blocks in the order of their primary keys (also termed unique keys in some types of databases, one example being employee codes in a database of employees) such that the primary key of the record in a block immediately prior is smaller than that of the primary key of the record in the block immediately subsequent. Records are initially stored in a primary block, and since it will no longer be able to store a record in that primary block after it has become full when a record is to be inserted into the block, an overflow block is created and linked to that primary block and records are stored in the primary block after a part of the records is moved to the overflow block. After that overflow block has become full and when another record is then to be inserted, another overflow block is created and linked to that overflow block.

This linkage does not refer to a physical linkage; rather, this expression is employed (here and also below) since the state in which a primary block holds the address of a first overflow block and the first overflow block holds the address of a second overflow block may be handled as though the blocks were physically connected.

Thus, the data storage and retrieval system proposed by the inventors provides the advantage that, since overflow blocks may be linked without limit, circumstances will not arise in which a record cannot be stored.

Problems Solved by the Invention

However, the following problems arise with the data storage and retrieval system proposed as this invention.

(1) When multiple overflow blocks are linked as described above, it takes a longer time than when primary blocks alone exist to retrieve a target record after searching location table entries and identifying the primary block.

(2) As well, records are stored in blocks in the order of their primary key values, and this is so both within an overflow block(s) linked to a primary block and across a primary block and an overflow block(s). Since records are thus stored in the order of their primary key values, the insertion of a record may require the movement of records across multiple overflow blocks when many overflow blocks are linked, which takes longer than when primary blocks alone exist.

(3) Additionally, when few record insertions occur after the generation of an overflow block or when the deletion of data results in fewer records in a block, the result is empty space in that primary block or overflow block, and the empty space in a block goes unused unless records are inserted in that block, with the result of lower storage efficiency in storage regions.

(4) Similarly, entries in alternate-key tables are normally the result of insertions and so alternate-key blocks are susceptible to the generation of alternate-key overflow blocks, with the attendant problem of lower alternate-key access speeds than when alternate-key overflow blocks do not exist. This is because even when the target alternate-key block for a target key value is retrieved, when overflow blocks are linked to that alternate-key block, these too must be retrieved in order to retrieve the target entry.

(5) Furthermore, as described with respect to blocks, the insertion of an entry requires storage in an alternate-key block in the order of the alternate-key values, and when alternate-key overflow blocks exist, that order applies likewise across alternate-key block(s) and alternate-key overflow blocks. Therefore, it takes longer to retrieve a target entry than when alternate-key blocks alone exist. Additionally, the insertion of an alternate-key entry requires the movement of entries, and it is a drawback that when there are many alternate-key overflow blocks, the volume moved is large.

(6) In addition, the storage of keys in alternate-key tables is done, as described above, by means of insertion rather than addition, and in the data storage and retrieval system proposed by the inventors, the use of pre-alternate-key tables was also considered, in addition to the absorption of the generation of alternate-key overflow blocks, as a device to accommodate such insertion, but it has proven problematic to eliminate overflow blocks entirely.

However, these problems (1) through (6) described above are more marked in conventional data storage and retrieval systems that employ hierarchical indices, and since in conventional data storage and retrieval systems that employ hierarchical indices the insertion of data results in the split of indices, these have suffered from the drawbacks of changes to index structure and slower access speeds.

In order to eliminate these drawbacks in conventional data storage and retrieval systems that employ hierarchical indices, it is necessary to use methods called regeneration or reorganization.

These methods called regeneration or reorganization work as follows. The system is temporarily shut down entirely and the records (data) stored on the system all copied to other storage media. The original data (records, primary-key index and alternate-key indices) are then erased and the records written back. Next, the primary-key indices and alternate-key indices are created. Creation of the primary-key indices consists of reading primary keys from all the records, creating entries that combine them with, for example, the addresses of the blocks in which records are stored, then sorting by the primary keys and creating first the lowest-order index and then sequentially creating the higher-order indices.

The creation of the alternate-key indices likewise consists of reading the alternate keys from the records, creating entries that combine them with, for example, the addresses of the blocks in which records are stored, then sorting by the alternate keys and creating first the lowest-level index and then sequentially creating the higher-level indices. Where multiple kind of alternate keys exist, this procedure must be executed for each type of alternate key. Since the operations are performed in this order, regeneration can take such long periods of time, as from several hours to several hundreds of hours in conventional data storage and retrieval systems that employ hierarchical indices, depending on such factors as the volume of data and the kind (number) of indices, and suffers from the drawback that the system cannot be used during that time.

And since such bothersome methods must be performed in a number of stages, it has been problematic to implement regeneration in an entirely automatic fashion that does not require human intervention, and these methods entail the further administrative problems entailed by system personnel performing regeneration through the night or on holidays, for example.

Furthermore, regeneration cannot be performed on systems that run uninterrupted around the clock, even when access efficiency falls, thus incurring costs in the form of high-performance hardware to make up for the unavoidable deterioration in performance that befalls them.

Such developments as the use of redundant hardware have enabled uninterrupted operation, and the difficulty of uninterrupted database operation is especially recently becoming a problem.

Meanwhile, although the data storage and retrieval system proposed by the inventors is basically equivalent to conventional data storage and retrieval systems that employ hierarchical indices in terms of regeneration, since the data storage and retrieval system proposed by the inventors does not, unlike conventional data storage and retrieval systems that employ hierarchical indices, make use of complicated indices, but is comprised of location table and alternate-key tables, regeneration takes far less time to complete than it does with conventional data storage and retrieval systems that employ hierarchical indices, but nor may the database be used during regeneration.

Specifically, regeneration in the data storage and retrieval system proposed by the inventors consists of shutting down the operation of a primary system, reading the records stored in the blocks, storing them on separate storage media and then recreating the location table, blocks and alternate-key tables for each type of alternate key of the primary system, creating location table entries while storing the records stored on the separate storage media back into newly created blocks and, after completing the storage of the data, creating entries in alternate-key tables for each type of alternate key. Since this method required the shutdown of the primary system, like conventional data storage and retrieval systems, it was problematic to apply it to an uninterrupted system.

The present invention was developed in light of the problems discussed above with the objective of providing a database system permitting uninterrupted and automatic reorganization of the data and the databases while the system is running.

Means for Solving the Problem

In order to achieve the above objective, the present invention is as follows.

Basis of the Invention

First of all, the data storage and retrieval system proposed by the inventors makes use of location table and alternate-key tables and retrieves target records by means of binary searches performed on these tables. These records are stored in storage regions of fixed length termed blocks. Of these blocks, primary blocks alone are managed by means of the location tables, and overflow blocks are managed by the primary blocks. Both the location tables and the alternate-key tables are flat tables lacking a hierarchical structure. These characteristics of the data storage and retrieval system proposed by the inventors are exploited to perform reorganization of the location table and blocks. The alternate-key tables are likewise subjected to reconfiguration.

Reorganization here refers to the re-ordering of data or indices due to variation in the structure of the data and slower data access resulting from data insertion, addition, modification and deletion performed on the data stored in a system, and consists of (i) the elimination of overflow blocks, (ii) the elimination of fragmentation and (iii) the reservation of suitable initial storage rates. Descriptions follow of (i) through (iii) above.

(i) the elimination of overflow blocks consists of the following. Overflow blocks result from the insertion of records. When records have filled a primary block and a further record is then to be inserted into that primary block, the insertion cannot be performed as is. In order to allow such an insertion, an overflow block is allocated to that primary block, the necessary number of records moved from the primary block to the overflow block and the object record then inserted into the original primary block to make the insertion of the record possible.

However, since record retrieval necessitates a greater load when overflow blocks exist than when primary blocks alone exist, overflow blocks must be made over into primary blocks and managed from location tables in order to achieve faster access.

Also, since records are stored in blocks in the order of their primary keys, the insertion of a record requires the movement of records, and the number of records moved increases when there are many overflow blocks, resulting in efficiency problems.

(ii) the elimination of fragmentation consists of the following. Fragmentation consists in dispersion in storage regions. When a record stored in a block (either a primary block or an overflow block) is no longer required and is erased, the space it once occupied in the storage region of the block is then empty. The storage region will remain empty and go wasted unless there is a record to insert. As well, where an overflow block is generated and few records are stored in that overflow block relative to its storage capacity, that empty space will go unused as wasted storage region unless record insertions subsequently occur.

In order to eliminate such wasted storage regions, records stored in a subsequent block are moved to the anterior block so that records are sufficiently stored in that block and so permit the elimination of waste in the use of storage regions.

(iii) the reservation of suitable initial storage rates is described below. Initial storage rates are used to prevent to some extent the generation of overflow blocks by leaving a certain proportion of the space in a block empty when first creating the block and writing records to it. When initially storing records in a block, these records may be stored at 100% of the capacity of the block, but thus storing records at the full capacity of the block will result in the generation of an overflow block immediately when a record is inserted. In order to avoid this development, when first storing records in a primary block, records are stored up to a limit of, for example, 90% of the storage capacity and that empty space is used to store records when records are subsequently inserted, making it possible to prevent the immediate generation of an overflow block.

The foregoing discussion focuses on location tables, blocks and overflow blocks, but applies equally to alternate-key blocks and alternate-key overflow blocks.

The Invention as it Concerns Primary Keys

The invention as it concerns primary keys consists in the reorganization of location tables and blocks, and is described below.

The invention as it concerns primary keys notes that a location table entry holds, in addition to the number of the block that the entry that the entry points to and the address of that block, either both or either one of the minimum and maximum primary key values of the records stored in the block and in all of the overflow blocks linked to that block, as needed.

The invention as it concerns primary keys creates a new location table for a current location table and sequentially transfers entries from the current location table to the new location table. For the purposes of the present invention, this transfer may refer either to instances of the duplication of information as is or to instances of the modification, as needed, of a part of that information and then writing that modified information. The present invention consists, when performing this sequential transfer, of delinking overflow blocks that are linked to a primary block and adding new entries to the new location table, thus rendering those overflow blocks primary blocks in the new location table and not moving them. In this manner does the invention as it concerns primary keys eliminate overflow blocks.

Fragmentation is eliminated as follows in the invention as it concerns primary keys. Elimination of fragmentation is implemented by identifying the storage rates of multiple blocks (primary blocks and overflow blocks), moving records between blocks within a set of multiple blocks and, as needed, either newly adding blocks and adding from location table entries or rendering unused blocks that had been in use and making deletions from location table entries.

Reservation of suitable initial storage rates is similar to the elimination of fragmentation and is implemented by moving records so that the amount of space that records take up in a block is that of a prescribed initial storage rate.

To synthesize the foregoing description, one or multiple blocks are placed under exclusion for a unit-processing interval and reorganization is performed. This consists of performing the elimination of overflow blocks, the elimination of fragmentation and the reservation of suitable initial storage rates together. When reorganization of the affected blocks has completed, exclusion is lifted on them and they are made available for use. Since it appears to be the processing of a single transaction, this reorganization does not conflict with data updating through regular processing.

In order to perform reorganization as per the method described above in the invention as it concerns primary keys, reorganization is enabled to run automatically and without interrupting access to data. In the present invention, access to one or multiple blocks is delayed under exclusion during the unit-processing interval due to reorganization, but blocks other than these are always accessible. The state in which access to one or multiple blocks is delayed under exclusion during reorganization also occurs in regular record updating and is not a particular problem.

Reorganization pointers are used in the invention as it concerns primary keys in order to access records during reorganization. One reorganization pointer each is provided for the current location table and the new location table. The reorganization pointers are for indicating how far reorganization of the location table and blocks has progressed.

In the invention as it concerns primary keys, when retrieving, storing, updating or deleting a record with a primary key during reorganization, the target primary key value is compared with the primary key value of the record contained in the primary block and overflow block of the entry that the reorganization pointer is pointing to, and if the target key value is greater than or equal to the primary key value of the record stored in the block that the reorganization pointer is pointing to, the current location table is used to retrieve the target record, and if the target key value is less than that primary key value, the new location table is used to retrieve the target record.

Here, when the current location table is used to retrieve a target record, a binary search is performed on the range between the reorganization pointer and the final pointer of the current location table. A final pointer is reserved for the location table in advance, its purpose being to indicate through which entry the location table is used.

On the other hand, when the new location table is used to retrieve a target record, a binary search is performed on the range between the head pointer of the new location table and the reorganization pointer of the new location table.

In this way, the use of reorganization pointers in the invention as it concerns primary keys allows the retrieval of target records during reorganization.

Since the updating, addition, insertion and deletion of records also first require finding the target block, these operations may also be achieved with the same logic as that described above.

Outline of the Invention as it Concerns Alternate Keys

The invention as it concerns alternate keys consists in the reorganization of alternate key tables.

Although alternate-key tables in the data storage and retrieval system had a format consisting of alternate-key blocks alone, in the present invention alternate-key location tables are added to the alternate-key tables and reorganization is performed on the alternate-key tables and the alternate-key location tables. In the invention as it concerns alternate keys, the reorganization of alternate-key tables is handled as follows. In the invention as it concerns alternate keys, the means for solving the problem for the reorganization of alternate-key tables is similar to the means for the reorganization of location table and blocks.

In the data storage and retrieval system proposed by the inventors, alternate-key entry comprising alternate-key value and the primary key value of its record may be stored in the order of their alternate keys, alternate-key blocks are used that may be reserved contiguously in advance in an identical size and in the quantity required, alternate-key table entries are stored in alternate-key blocks in the order of their alternate keys, alternate-key table entries having identical alternate keys are stored in the same alternate-key block, alternate-key overflow blocks are added to alternate-key blocks to store entries when a large number of entries have an identical alternate key or when the insertion of an alternate key cannot be accommodated in an alternate-key block, and one level or more of pre-alternate-key blocks having the same structure as the alternate-key blocks may be used when the initial number of records is fewer than the number of records intended finally to be stored.

Also in the data storage and retrieval system proposed by the inventors, alternate-key tables are stored themselves in contiguous regions, and target alternate-key blocks are retrieved by performing binary searches on the alternate-key tables. The invention as it concerns alternate keys is a method allowing greater efficiency of reorganization by newly adding alternate-key location tables to these alternate-key tables.

Alternate-key tables here are comprised of alternate-key blocks and alternate-key overflow blocks.

The Invention as it Concerns Alternate Keys

The invention as it concerns alternate keys consists in the reorganization of alternate-key table with respect to alternate-key tables and formats that maintain alternate-key location tables and is specifically as described below.

In the invention as it concerns alternate keys, an alternate-key location table entry holds the number and the address of the alternate-key block that entry points to and, as necessary, either one or both of the minimum and maximum primary key values of records stored in the alternate-key block that entry points to and in all alternate-key overflow blocks linked to that alternate-key block.

In the invention as it concerns alternate keys, new alternate-key location table are created for current alternate-key location table, and current alternate-key location table entries are sequentially transferred to the new alternate-key location tables. In the third application of the invention, when this sequential transfer is effected, alternate-key overflow blocks are delinked, and new entries are added to the new alternate-key location table and rendered alternate-key blocks in the new alternate-key location table.

In the invention as it concerns alternate keys, the elimination of fragmentation is performed as follows. The elimination of fragmentation is achieved by finding the rate of space used in multiple alternate-key blocks and alternate-key overflow blocks, transferring records between alternate-key blocks and alternate-key overflow blocks among multiple alternate-key blocks and alternate-key overflow blocks, and, as necessary, adding new alternate-key blocks or rendering unused alternate-key blocks and alternate-key overflow blocks that had been in use and deleting them from alternate-key location table entries.

The reservation of suitable storage rates is performed at the same time as the elimination of overflow blocks and the elimination of fragmentation, and consists in the transfer of entries so that the space taken up by entries in blocks is then an initial storage rate.

The above operations are performed with one or multiple alternate-key blocks placed under exclusion.

When reorganization is performed in this fashion, although access to one or multiple alternate-key blocks is delayed during the unit-processing interval, alternate-key blocks other than these may be accessed. The state of delayed access to a few or multiple alternate-key blocks also occurs in regular record updating and does not constitute a particular problem.

In the invention as it concerns alternate keys, reorganization pointers are used to access records during reorganization. One reorganization pointer each is provided for the current alternate-key location table and the new alternate-key location table. The reorganization pointers are for indicating how far reorganization of the alternate-key location table and alternate-key blocks has progressed.

In the invention as it concerns alternate keys, when retrieving a record with an alternate key during reorganization, the target alternate key value is compared with the alternate-key value of the record contained in the alternate-key block of the entry that the reorganization pointer is pointing to, and if the target key value is greater than or equal to the alternate-key value of the record stored in the alternate-key block that the reorganization pointer is pointing to, the current alternate-key location table is used to retrieve the target entry, and if the target key value is less than that alternate-key value, the new alternate-key location table is used to retrieve the target entry.

Here, when the current alternate-key location table is used to retrieve a target record from an alternate key undergoing reorganization, a binary search is performed on the range between the reorganization pointer and the final pointer of the current alternate-key location table.

On the other hand, when the new alternate-key location table is used to retrieve a target record from an alternate key undergoing reorganization, a binary search is performed on the range between the head pointer of the new alternate-key location table and the reorganization pointer of the new alternate-key location table.

In this way, target entries may be retrieved in the invention as it concerns alternate keys. Since the updating, addition, insertion and deletion of entries also first require finding the target alternate-key block, these operations may also be achieved with the same logic as that described above.

Thus, the present invention is comprised of the following.

(1) A database reorganization system that is a computerized system that uses blocks sequentially storing records having one unique primary key and zero or one or more non-unique alternate keys, manages the locations of these blocks by means of location tables that place them in correspondence with addresses in random access memory and manages a database stored in that random access memory, wherein a first means is provided of creating a new location table added to an existing location table upon receiving a database reorganization command and a second means is provided of, during a unit-processing interval, sequentially transferring entries in one or multiple blocks from the current location table to the new location table and delinking overflow blocks that are identified, adding new entries to the new location table and rendering them as primary blocks in the new location table when sequentially performing transfers.

(2) A database reorganization system that is a computerized system that uses blocks sequentially storing records having one unique primary key and zero or one or more non-unique alternate keys, manages the locations of these blocks by means of location tables that place them in correspondence with addresses in random access memory and manages a database stored in that random access memory, and is provided with means of moving the records of adjacent blocks to eliminate fragmentation when storage rates in those blocks fall outside a prescribed range of values.

(3) The database reorganization system of (1) and (2) above wherein a means is provided of providing reorganization pointers to each of the current location table and the new location table, storing in each of those reorganization pointers the location at which the reorganization processing ended for one or multiple blocks during a unit-processing interval and completing reorganization processing when reorganization reaches a final pointer.

(4) A database reorganization system wherein a comparison means is provided that, when retrieving a record with a primary key during reorganization, evaluates whether the target primary key value is greater than or less than the primary key of the record contained in the primary block and overflow blocks that the reorganization pointer is pointing to, and a retrieval means is provided that, when the target primary key is evaluated by the comparison means to be greater than or equal to the primary key of the record stored in the block that the reorganization pointer is pointing to, uses the current location table to retrieve the target record and, when the when the target primary key is evaluated to be less than that primary key, uses the new location table to retrieve the target record.

(5) A database reorganization system that is a data retrieval and storage system that may sequentially store, in the order of their alternate keys, multiple entries made up of the numbers of blocks storing records of alternate keys and their alternate-key values and the primary keys of those records, uses alternate-key blocks storing those entries, stores the entries of alternate-key tables in alternate-key blocks in the order of their alternate keys, stores the entries of alternate-key table that have identical alternate keys in identical alternate-key blocks, and adds alternate-key overflow blocks to an alternate-key block and stores entries there when a large number of entries have an identical alternate key or when the insertion of an alternate key cannot be accommodated in an alternate-key block, wherein a first means is provided of creating a new alternate-key location table added to an existing alternate-key location table upon receiving a database reorganization command and a second means is provided of, during a unit-processing interval, sequentially transferring entries in one or multiple blocks from the current alternate-key location table to the new alternate-key location table and delinking alternate-key overflow blocks that are identified, adding new entries to the new alternate-key location table and rendering them as alternate-key blocks in the new alternate-key location table when sequentially performing transfers.

(6) A database reorganization system that is a data retrieval and storage system that may sequentially store, in the order of their alternate keys, multiple entries made up of the numbers of blocks storing records of alternate keys and their alternate-key values and the primary keys of those records, uses alternate-key blocks that may be reserved contiguously in advance in the number required and in an identical size, stores the entries of alternate-key tables in alternate-key blocks in the order of their alternate keys, stores the entries of alternate-key tables that have identical alternate keys in identical alternate-key blocks, and adds alternate-key overflow blocks to an alternate-key block and stores entries there when a large number of entries have an identical alternate key or when the insertion of an alternate key cannot be accommodated in an alternate-key block, wherein means is provided of moving the records of adjacent alternate-key blocks to eliminate fragmentation when storage rates in those alternate-key blocks fall outside a prescribed range of values.

(7) The database reorganization systems of (4) and (5) above a means of providing a reorganization pointer to each of the current alternate-key location table and the new alternate-key location table, and storing in each of those reorganization pointers the location at which the reorganization processing ended during a unit-processing interval.

(8) A database reorganization system wherein a comparison means is provided that, when retrieving a record with an alternate key undergoing reorganization, evaluates whether the target primary key value is greater than or less than the alternate key of the record contained in the alternate-key block of the entry that the reorganization pointer is pointing to, and a retrieval means is provided that, when the target alternate key is evaluated by the comparison means to be greater than or equal to the alternate key of the entry stored in the alternate-key block that the reorganization pointer is pointing to, uses the current alternate-key location table to retrieve the target record and, when the when the target alternate key is evaluated to be less than that alternate key, uses the new alternate-key location table to retrieve the target record.

(9) A database system capable of storage in a computerized database system of multiple entries comprising the number of the blocks storing alternate keys and the primary keys of those records, wherein alternate-key blocks are used that may be reserved contiguously in advance in the number required and in an identical size, alternate-key location tables are used to manage the location of the alternate-key blocks in storage devices by placing numbers assigned to the alternate-key blocks in correspondence with physical locations in the storage devices, alternate-key entries are stored in the alternate-key blocks in the order of their alternate keys, new alternate-key overflow blocks are allocated to store alternate-key entries when these cannot be stored in the alternate-key blocks, and the locations of the alternate-key blocks in the storage devices are managed by means of the alternate-key location tables.

(10) A database system that is a computerized system that uses blocks sequentially storing records having one unique primary key and zero or one or more non-unique alternate keys, manages the locations of these blocks by means of location table that place them in correspondence with addresses in random access memory, has means of moving the records of adjacent blocks to eliminate fragmentation when storage rates in those blocks fall outside a prescribed range of values, and manages databases stored in that random access memory, wherein contiguous regions are used to store the addresses of unused blocks resulting from the elimination of fragmentation and pointers that point to the starting locations and ending locations of those regions.

(11) A database that is a computerized system that uses blocks sequentially storing records having one unique primary key and zero or one or more non-unique alternate keys, manages the locations of these blocks by means of location tables that place them in correspondence with addresses in random access memory and manages databases stored in that random access memory, wherein each block retains the rate of space utilization in that block.

(12) A database reorganization system that is a computerized system that uses blocks sequentially storing records having one unique primary key and zero or one or more non-unique alternate keys, manages the locations of these blocks by means of location table that place them in correspondence with addresses in random access memory and manages databases stored in that random access memory, wherein a first means is provided of creating a new location table added to an existing location table upon receiving a database reorganization command, a second means is provided of, during a unit-processing interval, sequentially transferring entries in one or multiple blocks from the current location table to the new location table and delinking overflow blocks that are identified, adding new entries to the new location table and rendering them as primary blocks in the new location table when sequentially performing transfers, and a third means is provided of, during a unit-processing interval, sequentially transferring one or multiple blocks from the current location table to the new location table.

(13) A database reorganization system that is a secondary system that uses blocks sequentially storing records having one unique primary key and zero or one or more non-unique alternate keys, manages the locations of these blocks by means of location tables that place them in correspondence with addresses in random access memory and updates its own data with log data transmitted from a primary system, wherein a first means is provided of creating a new location table added to an existing location table upon receiving a database reorganization command and a second means is provided of, during a unit-processing interval, sequentially transferring entries in one or multiple blocks from the current location table to the new location table and delinking overflow blocks that are identified, adding new entries to the new location table and rendering them as primary blocks in the new location table when sequentially performing transfers.

(14) A database reorganization system that is a secondary system that uses blocks sequentially storing records having one unique primary key and zero or one or more non-unique alternate keys, manages the locations of these blocks by means of location table that place them in correspondence with addresses in random access memory and updates its own data with log data transmitted from a primary system, wherein a first means is provided of creating a new location table added to an existing location table upon receiving a database reorganization command and a second means is provided of, during a unit-processing interval, sequentially transferring entries in one or multiple blocks from the current location table to the new location table and delinking overflow blocks that are identified, adding new entries to the new location table and rendering them as primary blocks in the new location table when sequentially performing transfers.

REFERENCE NUMERALS IN DRAWINGS

Figure 1:
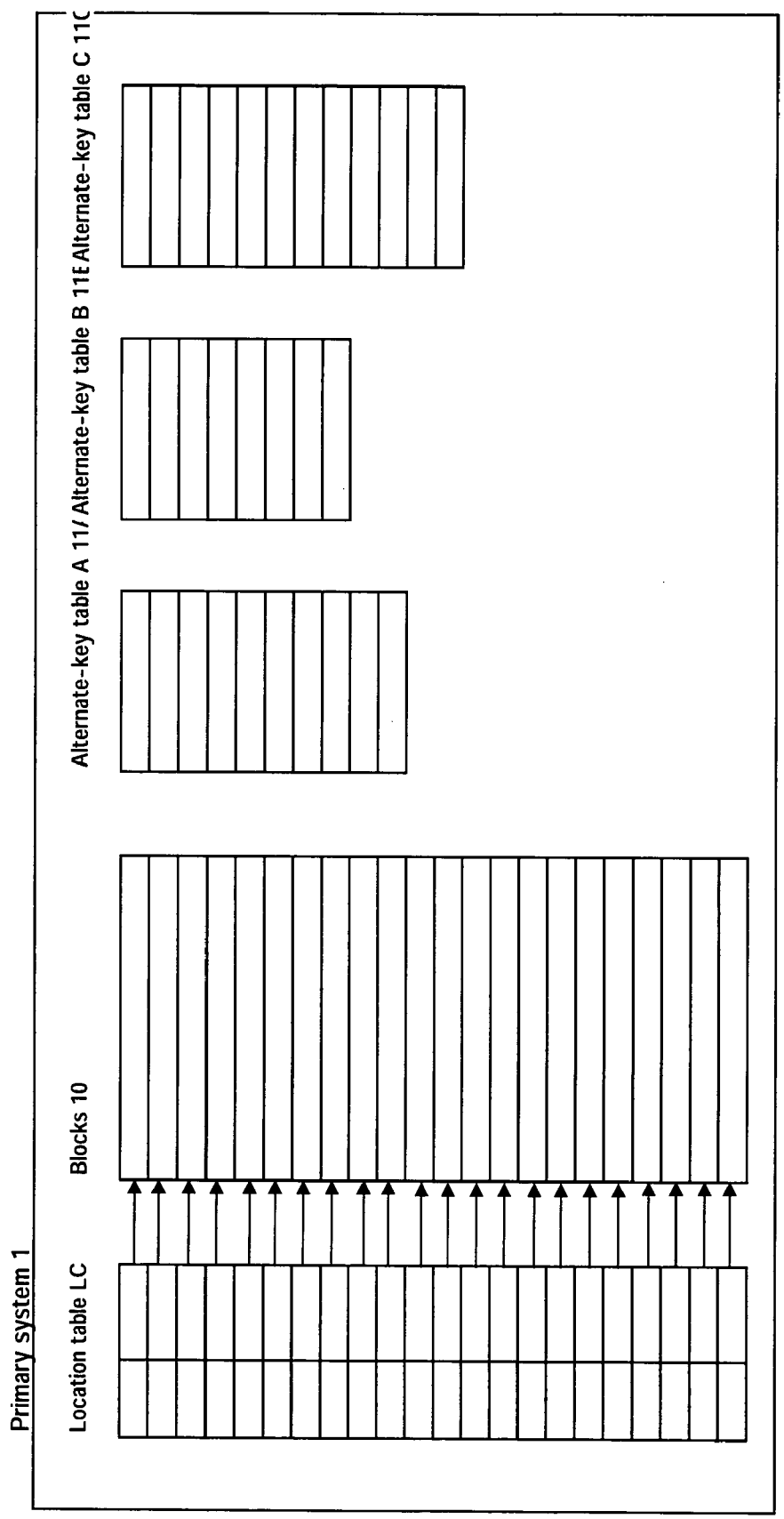
FIG. 1 is a block diagram of an example of a primary system in which is applied the database reorganization system that is an embodiment of the invention as it concerns primary keys.

1 Primary system
2 Secondary system
10 Blocks
11 Alternate-key table
12 Primary blocks
13, 14 Overflow blocks
15, 16 Alternate-key overflow blocks
17 Alternate-key blocks
LC Current location table
LN New location table
AAC Current alternate-key table
AAN New alternate-key table
AALC Current alternate-key location table
AALN New alternate-key location table
UBAT, UABAT Unused-block allocation tables

PREFERRED EMBODIMENTS OF THE INVENTION

A description follows, making reference to the drawings, of embodiments of the invention as it concerns primary keys and alternate keys. Prior to this description is a description of the basis of the invention as it concerns primary keys and alternate keys.

Basis of the Invention as it Concerns Primary Keys and the Invention as it Concerns Alternate Keys The objective of the present invention as it concerns primary keys and the invention as it concerns alternate keys is to build on the concepts of the inventions specified in Japanese Patent publication number Hei11-031096 and U.S. Pat. No. 6,415,375, employing their core components unmodified, and implement automatic reorganization without interrupting the operation of the data storage and retrieval system.

Likewise, in the data backup and recovery system specified by the present inventors in Japanese Patent publication number 2001-356945, a primary system is either provided one or more secondary systems, each comprising a set of location tables, blocks and alternate-key tables, or blocks alone are maintained and backed up and that backup is used for recovery. We explain how the invention as it concerns primary keys and the invention as it concerns alternate keys may be applied as well to this data backup and recovery system.

A description follows of the data backup and recovery system specified in Japanese Patent publication number Hei11-031096. The first characteristic of the data backup and recovery system specified in Japanese Patent publication number Hei11-031096 is the use of flat (non-hierarchical) tables called location table to manage blocks (primary blocks and overflow blocks) that store records. The primary-key value of a record stored in a block is smaller than the primary-key value of a record stored in the block following it. Records are stored in blocks in the order of their primary keys. This applies within primary blocks and within overflow blocks linked to a primary block, and likewise between a primary block and any overflow blocks linked to it. This gives improved efficiency when retrieving a record in a block.

As a data type, a "primary key" is a unique key and one is required for each record. The primary key in an employee master database may be the employee code, for example, and in a customer master database it may be the customer code. As a data type, an "alternate key" is a non-unique key and multiple kinds of alternate keys may exist within a record. Alternate keys in an employee master database might be employee name, posting or date of employment, for example.

When a record is inserted into a block but cannot be stored in that block, an overflow block is added and the record is stored by using the two contiguously. When an overflow block becomes insufficient, another overflow block is linked to that overflow block and any number of records may be inserted by thus sequentially linking overflow blocks. These overflow blocks are linked to the first primary block.

Location table are reserved in contiguous areas. Such contiguous areas are of a logical order and may be in physically separate areas. Location table manage only primary blocks, while overflow blocks are dependent on primary blocks and are not managed by location table. Thus the creation of overflow blocks does not result in any structural modification of a location table.

The second characteristic of this data storage and retrieval system is accelerated retrieval and storage without traditional indices and with greater efficiency of index management by means of binary searching of location table for primary keys in order to identify target blocks.

The third characteristic of this data storage and retrieval system is the use of alternate-key tables, also flat tables, for alternate keys. As a data type, an "alternate key" is, as stated above, a non-unique key and multiple kinds of alternate keys may exist within a record. Alternate keys in an employee master database might be employee name, posting or date of employment, for example.

The addition of alternate-key overflow blocks to alternate-key table blocks when the number of key-value entries increases with the addition or modification of alternate keys gives greater efficiency in alternate-key index management without the segmenting applied to traditional indices. When a single alternate-key overflow block is insufficient, another alternate-key overflow block may be linked to it, thus doing away with any limitation on the insertion of alternate-key entries.

The fourth characteristic of this data storage and retrieval system is accelerated alternate-key retrieval by means of performing binary searches on alternate-key tables.

The fifth characteristic of this data storage and retrieval system is that while retrieval efficiency may fall due to an increase in alternate-key overflow blocks when there are many additions and modifications of key values in alternate-key tables, the use of pre-alternate-key tables provides a means of maintaining that efficiency.

In the invention as it concerns primary keys and the invention as it concerns alternate keys, location table and alternate-key tables are used to retrieve records from data-storage files (aggregates of blocks), as described in Japanese Patent publication number Hei11-031096.

Additionally, the insertion and addition of records in blocks results in the creation of overflow blocks, and the deletion of records results in empty space in blocks. One objective of reorganization is to maximize record access efficiency and storage efficiency, which both suffer from more overflow blocks and more empty space in blocks.

Likewise, record additions, updates and deletions in alternate-key tables result in the modification of alternate-key values, and alternate-key overflow blocks are added and empty space created in alternate-key blocks and alternate-key overflow blocks.

One objective of reorganization is to maximize entry access efficiency and storage efficiency, which both suffer from more overflow blocks and more empty space in blocks.

In the invention as it concerns primary keys and the invention as it concerns alternate keys, the combination (in one set) of a location table, a block and an alternate-key table (one of each) defined in this data retrieval and storage system are termed a primary system. In real-world applications, a primary system may be comprised of multiple such sets and reorganization of a single set may be applied to other such sets.

The invention as it concerns primary keys and the invention as it concerns alternate keys are readily comprehended with a database in mind, but their applicability is not restricted to databases, but extends also to data storage and retrieval systems and systems in general. Conventional computers load into main memory and then execute programs and data stored in external storage devices. Thus, whereas external databases and internal main memory have conventionally been discretely separated, high-speed random access memory will likely in future be adopted in external storage devices with the spread of non-volatile memory technologies. If so, there will no longer be any reason to discriminate between external storage and internal memory. The method and system of the present invention may then be applied wherever data is stored other than in external storage devices.

Objectives of and Reasons for Reorganization

The three objectives of reorganization are as follows: (i) elimination of overflow blocks, (ii) the elimination of fragmentation and (iii) the reservation of suitable initial storage rates.

Descriptions follow of objectives of and reasons for reorganization (i) through (iii) above.

Objective of Reorganization 1: (i) Elimination of Overflow Blocks

Overflow blocks result from the insertion of records. When records have filled a primary block and a further record is then to be inserted into that primary block, the insertion cannot be performed as is. In order to allow such an insertion, an overflow block is allocated to that primary block, the necessary number of records moved from the primary block to the overflow block and the object record then inserted into the original primary block to make the insertion of the record possible.

However, since record retrieval necessitates a greater load when overflow blocks exist than when primary blocks alone exist, overflow blocks must be made over into primary blocks and managed from location table in order to achieve faster access.

Also, since records are stored in blocks in the order of their primary keys, the insertion of a record requires the movement of records, and the number of records moved increases when there are many overflow blocks, resulting in efficiency problems.

Objective of Reorganization 2: (ii) Elimination of Fragmentation

Next is the elimination of fragmentation. Fragmentation consists in dispersion in storage regions. When a record stored in a block (either a primary block or an overflow block) is no longer required and is erased, the space it once occupied in the storage region of the block is then empty. The storage region will remain empty and go wasted unless there is a record to insert. In order to eliminate such wasted storage regions, records stored in a subsequent block are moved to the anterior block so that records are sufficiently stored in that block and so permit the elimination of waste in the use of storage regions.

As well, where an overflow block is generated and few records are stored in that overflow block relative to its storage capacity, that empty space will go unused as wasted storage region unless record insertions subsequently occur.

Considering the matter on the level of blocks, when blocks that had been used are used no longer and blocks are thus mixed together in the storage region and are not reused, the term fragmentation may further be applied to the storage region as a whole. The basis of the invention addresses solutions for the reutilization of unused blocks separately from the elimination of fragmentation within blocks.

Objective of Reorganization 3: (iii) Reservation of Suitable Initial Storage Rates Next is the reservation of suitable initial storage rates. Initial storage rates are used to prevent to some extent the generation of overflow blocks by leaving a certain proportion of the space in a block empty when first creating the block and writing records to it.

When initially storing records in a block, these records may be stored at 100% of the capacity of the block, but thus storing records at the full capacity of the block will result in the generation of an overflow block immediately when a record is inserted. Not only do overflow blocks lead to lower retrieval efficiency, they are also a cause of the fragmentation described above when overflow blocks store few records and have large amounts of empty space. In order to avoid this development, when first storing records in a primary block, records are stored up to a limit of, for example, 90% of the storage capacity and that empty space is used to store records when records are subsequently inserted, making it possible to prevent the immediate generation of an overflow block.

Thus reserving a defined proportion of the space within a block as empty for record insertion is the approach taken with suitable initial storage rates and is a technique that is well-known.

Objective of Reorganization 3, Detailed Explanation: Details of the Reservation of Suitable Initial Storage Rates A suitable initial storage rate may be applied on four occasions: (a) when initially creating a database, (b) when reserving a new block and storing records in it by adding them to the block, (c) when inserting records into an existing reserved block whose space utilization rate is out of the suitable storage rate, and (d) when performing reorganization.

Cases (b) when reserving a new block and storing records in it by adding them to the block and (c) when inserting records into an existing reserved block whose space utilization rate is out of the suitable storage rate above, which both involve the insertion of records into the block, are discrete instances by a strict definition, but in practice may be implemented according to the same logic.

To explain (b) when reserving a new block and storing records in it by adding them to the block in somewhat greater detail, a new block is reserved when the block pointed to by the entry immediately preceding the final pointer in the location table (i.e. the final entry) has a storage rate greater than that which is suitable and the record to be stored in that block has a primary-key value greater than the records stored in that block; a new primary block is then allocated and the record stored in that newly allocated primary block.

When records are written to this new primary block by adding them to it, records are stored therein up to the suitable initial storage rate, and when the suitable storage rate is exceeded, the next primary block is allocated. After the allocation of a primary block, records are thus stored in the block until the suitable initial storage rate is reached. This applies likewise to the storage of records in that block by insertion: such records are stored in that primary block until the suitable initial storage rate is reached.

It goes without saying that the final pointer is sequentially advanced when a new primary block has been allocated.

Another instance of the allocation of new blocks is the allocation of overflow blocks. When storing records in an overflow block, the records are stored, as with primary blocks, until the suitable initial storage rate is reached. When the suitable storage rate is reached, the next overflow block is newly allocated and records are then stored in that new overflow block.

When the space utilization rate in an existing reserved block is below the suitable storage rate, the insertion of records into that block is performed as described below.

When a block (either a primary block or an overflow block) storing records undergoes a deletion, the record is erased from the block and the space that it had taken up is then empty. This empty space may be reckoned wasted if the space utilization rate of the block is below its suitable initial storage rate. When records are inserted into such a block, it is advantageous in terms of the effective utilization of storage space to insert records until the suitable initial storage rate is reached.

Such an approach of suitable initial storage rates is no more than a means to determine whether or not to allocate a new block; when an overflow block is allocated to a primary block and records inserted in that primary block, they are stored until the storage rate reaches 100%.

The foregoing discussion focuses on location table, blocks and overflow blocks, but alternate-key blocks and alternate-key overflow blocks entail the same issues and, as discussed below, the reorganization of alternate-key blocks is also an object of the present invention.

Statistical Techniques for the Automation of Reorganization

The utilization of statistical techniques as follows is an effective means of implementing automatic reorganization. These statistical techniques have been used in existing methods. This enables automatic execution by means of software. Statistical methods are added to conventional data storage systems. In order to track how overflow blocks are generated for blocks, these statistical methods survey the values a-i through a-v below. It is not absolutely necessary to survey all of these values, which may be used selectively according to the goals obtaining.

a-i Total number of blocks
a-ii Number of primary blocks
a-iii Number of overflow blocks
a-iv Maximum number of overflow blocks per single primary block
a-v Standard deviation of number of overflow blocks per single primary block The data obtained from b-i and b-ii below are effective in addressing fragmentation and suitable initial storage rates, but the suitable initial storage rate pertains, as discussed above, to the initial condition of a block and fragmentation is of greater importance. In b-i and b-ii, "blocks" includes both primary blocks and overflow blocks.

b-i Total block storage capacity
b-ii Block storage space actually utilized

Likewise, in order to track how alternate-key overflow blocks are generated for the alternate-key blocks in alternate-key tables, the values c-i through c-iv below are surveyed. It is not absolutely necessary to survey all of these values, which may be used selectively according to the goals obtaining.

c-i Number of alternate-key blocks
c-ii Number of alternate-key overflow blocks
c-iii Maximum number of alternate-key overflow blocks per single alternate-key block
c-iv Standard deviation of number of alternate-key overflow blocks per single alternate-key block Likewise, the data obtained from d-i and d-ii below are effective in addressing fragmentation and suitable initial storage rates, but the suitable initial storage rate pertains, as discussed above, to the initial condition of an alternate-key block and the information on fragmentation is of greater importance.

d-i Total storage capacity of both alternate-key blocks and alternate-key overflow blocks
d-ii Storage space actually utilized in both alternate-key blocks and alternate-key overflow blocks Counts should also be made of accesses to location tables and alternate-key tables. This enables the option of not performing reorganization if access is low even with overflow.

The values above are surveyed, and reorganization is performed automatically when predefined thresholds are reached.

As discussed below, the database reorganization system of the invention as it concerns primary keys and the invention as it concerns alternate keys allows reorganization to be performed during operation, without interrupting the primary system. Likewise, the where data backup and recovery system discussed above is employed, reorganization may be performed while maintaining consistency between the primary system and the secondary systems.

Where this automatic reorganization is employed, it should run when the operation load is low since overall system performance will deteriorate if it is run when the operation load of the system is high, but this automatic reorganization system is, as discussed below, capable of pausing reorganization at any time and later restarting. Thus, it is unnecessary to suspend operation for long periods as with conventional methods, and reorganization may proceed gradually at such times as when the system load is low.

Selection of Overflow Block Format

On Overflow Block Formats

Three possible overflow block formats are suggested for the data storage and retrieval system discussed above. These are 1) blocks of the same size as primary blocks, 2) blocks of a different size from primary blocks and 3) management from multiple primary blocks.

The present invention assumes the use of overflow blocks that are the same size as primary blocks. The reasons this format is preferred are that when overflow blocks are not of the same size as the primary blocks, reorganization may require modification of block size and that when overflow blocks that are not of the same size as the primary blocks go unused, major restrictions are imposed on their reutilization. Nor is it preferable to manage an overflow block from multiple primary blocks because this increases the load incurred in reorganization.

Regions Required for Reorganization

Maintenance of Two Location Tables

The execution of automatic reorganization with this automatic reorganization system requires the maintenance, at any given time, of two location tables or two alternate-key tables and therefore the space requisite for them.

The example described below is for three types (A, B and C) of alternate-key tables. (See FIG. 1.)

It is determined whether it is necessary to reorganize the location table LC and any one of the alternate-key tables A, B and C. This consists of examining such values, described above, as the number of overflow blocks and their standard deviation and applying defined threshold values. When performing reorganization of the location table and also one or more of the alternate-key tables, reorganization is not performed simultaneously on all of these, but first reorganization is performed on the location table and next on the alternate-key tables individually and one by one. When performing reorganization on each of A, B and C, first reorganization is performed on A and when that reorganization has completed, reorganization is performed on B and when the reorganization of B has completed, reorganization is performed on C.

That is, space is required for two tables, the old table and the new table, but not simultaneously for the old and new location table and the old and new alternate-key tables all at once; rather, space is required only for the old and new tables of the table undergoing reorganization at any given time and so the amount of space required is not great.

Preferred Embodiment of the Invention as it Concerns Primary Keys

FIG. 1 is a block diagram of an example of a primary system in which is applied the database reorganization system that is an embodiment of the invention as it concerns primary keys.

In FIG. 1 the primary system 1 is comprised of the location table LC, blocks 10, alternate-key table 11A, alternate-key table 11B and alternate-key table 11C. A secondary system of identical structure, while not depicted in the drawing, also exists but is omitted from the description in order to facilitate the description.

As shown in FIG. 1, the location table LC shows the positions of the blocks 10 at the block numbers given in the location table LC.

Figure 2:
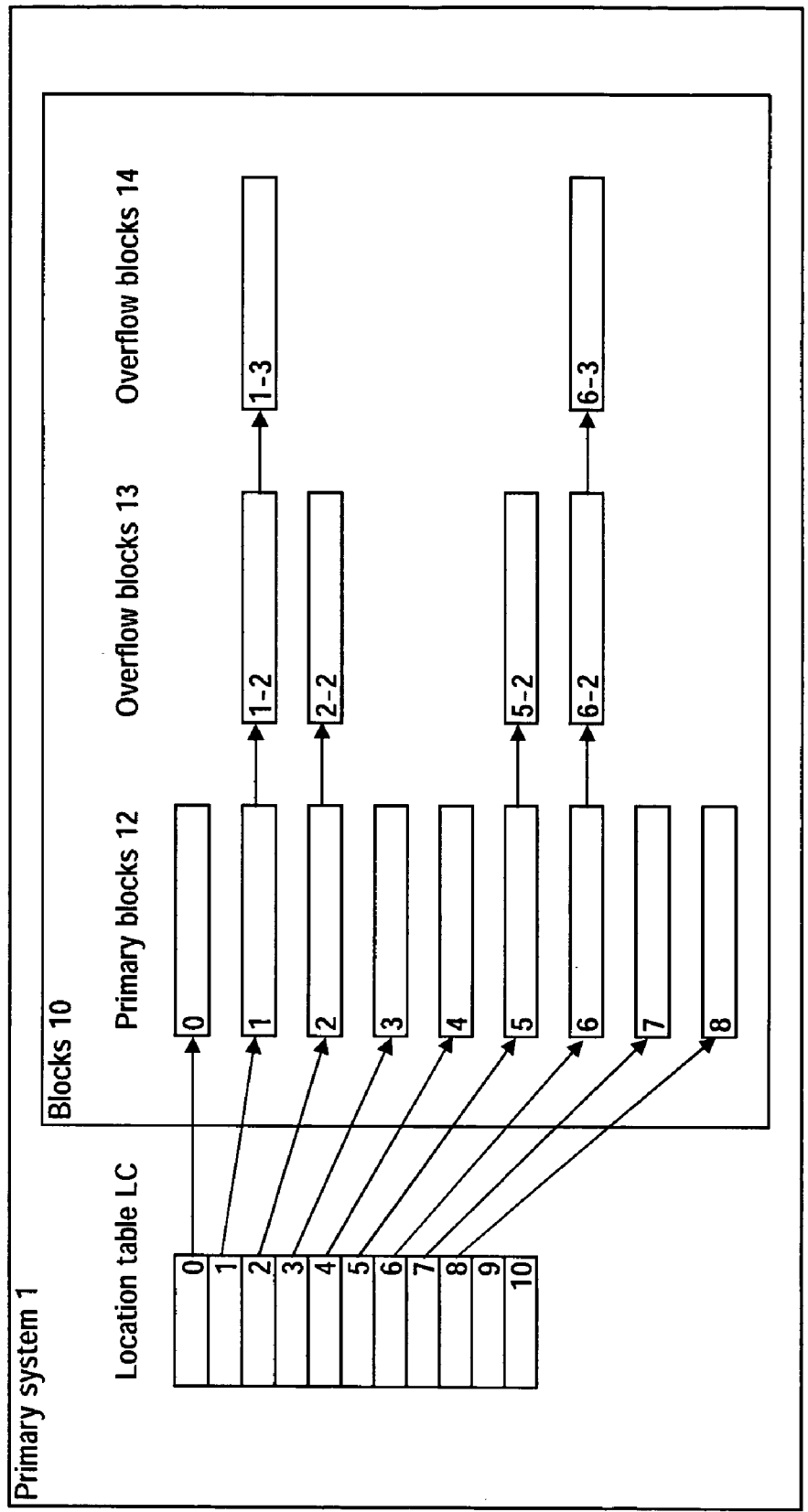
FIG. 2 is an outline of only that part of the primary system depicted in FIG. 1 in which is applied the database reorganization system that is an embodiment of the invention as it concerns primary keys.

FIG. 2 is an outline of only that part of the primary system depicted in FIG. 1 in which is applied the database reorganization system that is an embodiment of the invention as it concerns primary keys.

In FIG. 2 the blocks 10 are divided into primary blocks 12, overflow blocks 13 and overflow blocks 14 and are presented in the context of the primary system 1 in order to indicate their configuration with the location table LC. In other words, the primary system 1 is comprised of the location table LC, the primary blocks 12, the overflow blocks 13 and the overflow blocks 14.

The first entry in the location table LC references block number 0 in the primary blocks 12.

The second entry in the location table LC references block number 1 in the primary blocks 12, and this primary blocks 12 references block number 1-2 in the overflow blocks 13, which in turn references block number 1-3 in the overflow blocks 14.

The third entry in the location table LC references block number 2 in the primary blocks 12.

The fourth entry in the location table LC references block number 3 in the primary blocks 12.

The fifth entry in the location table LC references block number 4 in the primary blocks 12.

The sixth entry in the location table LC references block number 5 in the primary blocks 12, and this primary block 12 references block number 5-2 in the overflow blocks 13.

The seventh entry in the location table LC references block number 6 in the primary blocks 12, and this primary block 12 references block number 6-2 in the overflow blocks 13, which in turn references block number 6-3 in the overflow blocks 14.

The eighth entry in the location table LC references block number 7 in the primary blocks 12.

The ninth entry in the location table LC references block number 8 in the primary blocks 12.

Below, the location table LC is reckoned to reference the individual primary blocks 12.

In the primary system 1 of FIG. 2, overflow blocks are generated for block number 1, block number 2, block number 5 and block number 6 among the primary blocks 12.

Reorganization of the location table LC and the primary blocks 12, the overflow blocks 13 and the overflow blocks 14 in such a primary system 1 would be performed as follows.

Figure 3:
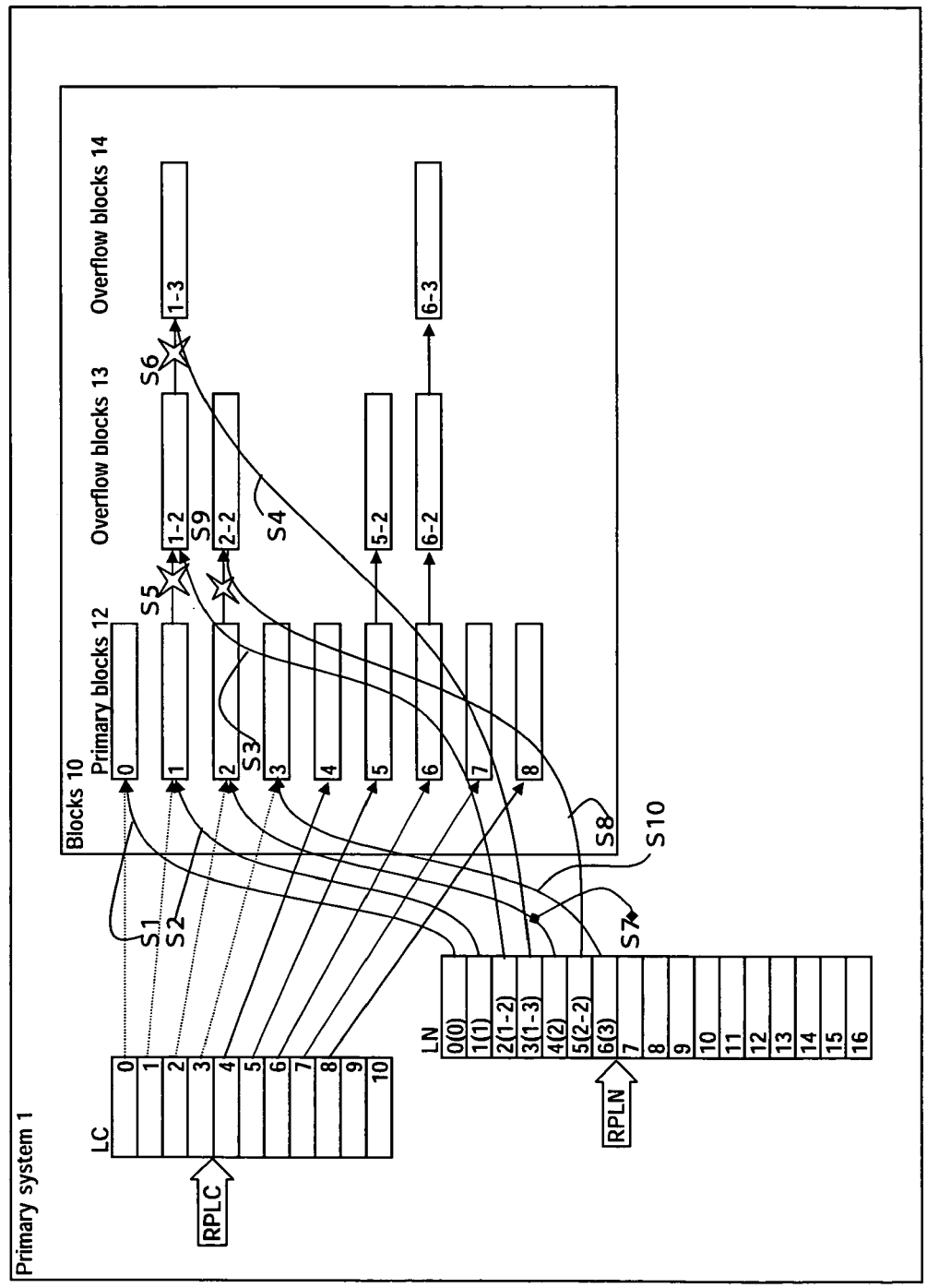
FIG. 3 illustrates the operation of the database reorganization system that is an embodiment of the invention as it concerns primary keys.

The description following of the operation of the database reorganization system in an embodiment of the invention as it concerns primary keys is based on FIG. 2 and makes reference also to FIG. 3.

FIG. 3 here illustrates the operation of the database reorganization system that is an embodiment of the invention as it concerns primary keys.

Location Table and Block Reorganization: Elimination of Overflow

First we describe the reorganization of the location table LC.

"Reorganization of the location table LC" in FIG. 2 and FIG. 3 is the procedure described below.

The blocks 10 managed by the location table LC are only the primary blocks 12. The overflow blocks 13 are managed by the primary blocks 12. In other words, the primary blocks 12 maintain the addresses of the overflow blocks 13. Therefore, when using the location table LC to retrieve data with a primary key, if a binary search of the location table LC returns block 15 among the primary blocks 12, it is then necessary to find the object record within that block 15. When multiple overflow blocks 13 and 14 are linked to the primary blocks 12, it takes longer, to the extent of the number of overflow blocks 13 (14, etc.), to find a record than it does when only the primary blocks 12 (in FIG. 1, for example, block number 0, block number 3, block number 4, block number 7 and block number 8) exist.

In order to avoid this, the embodiment of the invention as it concerns primary keys eliminates overflow blocks and makes all overflow blocks 13 and 14 over into primary blocks (12), thus permitting records to be found in less time by managing them with the location table (LC or LN).

Furthermore, since records are held in the blocks (10) in the order of their primary keys, the insertion of a record requires that records be moved, and a large number overflow blocks (13, 14) results in a large number of records to be moved, which entails issues of efficiency.

Using Two Location Tables, One Current and One New, to Perform Reorganization

As shown in FIG. 3, the invention as it concerns primary keys uses two location tables, the current location table LC and the new location table LN, to perform reorganization.

In the invention as it concerns primary keys a count is made of the number of overflow blocks (13, 14 . . . ) generated and so the sum of the number of entries in the location table LC and the number of overflow blocks (13, 14 . . . ) is the number of entries in the new location table LN. In this specification, the location table in use at the time of reorganization is referred to below as "LC" and the new location table referred to below as "LN". Since the number of entries may increase due to insertions during reorganization and will also increase after reorganization with the addition of data, a number greater than that actually required should be reserved.

However, as described below, since the number of blocks required may also decrease with the elimination of fragmentation and the number of blocks required varies with the reservation of a suitable initial storage rate, the optimal method is to calculate the figure on the basis of the number of records stored and the suitable initial storage rate.

In the embodiment of the invention as it concerns primary keys, a contiguous region is reserved by a first means on the primary system 1 that is sufficient to hold the capacity of the new location table LN.

Once the region for the new location table LN is reserved, the entries in the current location table LC are, as shown in FIG. 3, sequentially written over to the new location table LN, which procedure is described below.

The Reorganization Pointers

In the embodiment of the invention as it concerns primary keys, the following operation is performed by a second means. First, reorganization pointer are created. These reorganization pointers indicate through which entry in the location tables (LC and LN) reorganization has completed, and so two such pointers are provided, one for the current location table LC and one for the new location table LN. The reorganization pointer for the current location table LC is termed RPLC, and the reorganization for the new location table LN termed RPLN.

Here, the initial value of the current location table LC reorganization pointer RPLC is the first address in the current location table LC, and the initial value of the new location table LN reorganization pointer RPLN is the first address in the new location table LN.

The first, second, third and so on entries in the location table LC of the primary system 1 reference, as described above, specific block numbers in the primary blocks 12.

In FIG. 3, the first entry of the reorganization pointer RPLC, the primary block 12 (block number 0) managed by that entry and its overflow blocks are first of all placed under exclusion. Overflow blocks do not exist in this case and so only the primary block 12 (block number 0) is affected.

Next, the first entry (block number 0) is written over (S1 in FIG. 3) from the current location table LC to the new location table LN. When doing so, a check is made whether any overflow blocks are linked to the block 12 (block number 0) managed by the first entry (block number 0). If not, the addresses of the (current) reorganization pointer RPLC and the (new) reorganization pointer RPLN are changed to point to the beginning of the second entry.

Since no overflow blocks are linked to the block number 0 primary block 12 in FIG. 3, both the (current) reorganization pointer RPLC and the (new) reorganization pointer RPLN are changed to point to the beginning of the second entry.

Exclusion is lifted on the first entry of the (current) reorganization pointer RPLC, the primary block 12 (block number 0) managed by that entry and its overflow blocks. Overflow blocks do not exist in this case and so only the primary block is affected.

Next, the second entry (block number 1) is processed. The second entry of the location table LC, the primary block 12 (block number 1) managed by that entry and the overflow block 13 (block number 1-2) and the overflow block 14 (block number 1-3) are placed under exclusion. The two overflow blocks 13 and 14 are linked to the primary block 12 managed by the second entry in the current location table LC. Cases in which overflow blocks 13 and 14 are thus linked to a primary block 12 and handled as follows. The second entry in the current location table LC is written over (S2 in FIG. 3) to the second entry in the new location table LN. Rather than performing a simple write operation, the low value and the high value of the primary key of the record stored in the block are modified. Where the location table LC and LN entries hold the low value and high value of the primary keys of the blocks (12, 13 and 14), the low value and high value of the primary keys of the entries in the new location table LN will fail to match the low value and high value of the primary keys of the records stored in the blocks (12, 13 and 14) if a simple write operation is performed and so this is avoided.

Assume a low value of 0000 and a high value of 0299 for the primary key value of the second entry in the current location table LC. Given then a low value of 0000 and a high value of 0099 for the primary key value of the record stored in the primary block 12, a low value of 0100 and a high value of 0199 for the primary key value of the record stored in the first overflow block 13, and a low value of 0200 and a high value of 0299 for the primary key value of the record stored in the second overflow block 14, the operation proceeds as follows.

The low value of the primary key value of the second entry in the new location table LN is 0000 and its high value 0099. Since the address of the primary block 12 (block number 1) is given to the address of the block 10, it takes (S3 in FIG. 3) the same value as the address of the current location table LC. Next, the address of the first overflow block 13 (block number 1-2) and the low value 0100 and the high value 0199 of its primary key are assigned (S3 in FIG. 3) to the third entry in the new location table LN.

The address of the second overflow block 14 (block number 1-3) is assigned to the fourth entry in the new location table LN, and its primary key assigned the low value of 0200 and the high value of 0299. (S4 in FIG. 3)

Next, the overflow block address in the primary block 12 (block number 1) is reset and the overflow block 13 (block number 1-2) delinked from the primary block 12 (block number 1). (S5 in FIG. 3) Next, the overflow block address in the first overflow block 13 is reset and the second overflow block 14 (block number 1-3) delinked from the first overflow block 13 (block number 1-2). (S6 in FIG. 3)

Next, the (current) reorganization pointer RPLC is updated to point to the third entry in the current location table LC, and the (new) reorganization pointer RPLN updated to point to the fifth entry in the new location table LN.

Next, exclusion is lifted on the second entry of the (current) reorganization pointer RPLC, the primary block 12 (indicated as block number 1 in FIG. 3) managed by that entry and the overflow block 13 (indicated as block number 1-2 in FIG. 3) and the overflow block 14 (indicated as block number 1-3 in FIG. 2).

Next, the third entry (block number 2) is processed. The third entry in the current location table LC, the primary block 12 (block number 2) managed by that entry and the overflow block 13 (block number 2-2) are placed under exclusion.

The fifth entry in the new location table LN is assigned the address of the primary block 12 (block number 2) and so takes (S7 in FIG. 3) the same value as the address of the current location table LC. Next, the low value and the high value of the primary key value of the address of the first overflow block 13 (block number 2-2) are assigned (S8 in FIG. 3) to the sixth entry in the new location table LN.

Next, the overflow block address in the primary block 12 (block number 2) is reset and the overflow block 13 (block number 2-2) delinked from the primary block 12 (block number 2). (S9 in FIG. 3)

Next, the (current) reorganization pointer RPLC is updated to point to the fourth entry in the current location table LC, and the (new) reorganization pointer RPLN updated to point to the sixth entry in the (new) location table LN.

Next, exclusion is lifted on the fourth entry of the (current) reorganization pointer RPLC, the primary block 12 (indicated as block number 2 in FIG. 3) managed by that entry and the overflow block 13 (indicated as block number 2-2 in FIG. 3).

Next, the seventh entry of the reorganization pointer RPLC, the primary block 12 (block number 3) managed by that entry and its overflow blocks are placed under exclusion. Overflow blocks do not exist in this case and so only the primary block 12 (block number 3) is affected.

Next, the first entry (block number 3) is written over (S10 in FIG. 3) from the current location table LC to the new location table LN. When doing so, a check is made whether any overflow blocks are linked to the block 10 (block number 3) managed by the first entry (block number 3). Since none are, the (current) reorganization pointer RPLC is changed to point to the beginning of the fifth entry. And the address of the (new) reorganization pointer RPLN is changed to point to the beginning of the seventh entry.

Exclusion is lifted on the fourth entry of the (current) reorganization pointer, the primary block 10 (block number 3) managed by that entry and its overflow blocks. Overflow blocks do not exist in this case and so only the primary block is affected.

This procedure permits reorganization without rewriting the overflow blocks to another location.

Reorganization then proceeds sequentially in the same fashion from the fifth entry (block number 5) onwards.

FIG. 3 illustrates the state in which reorganization has completed through the fourth entry of the current location table LC.

The value of the (new) reorganization pointer RPLN in FIG. 3 points to the beginning of the eighth entry (block number 7) in the location table LN.

Problems Arising from the Format of Entries in Alternate-Key Tables and their Resolution When performing the reorganization procedure described above, it is necessary to rewrite alternate-key table entries. This varies with the format of entries in alternate-key tables.

Differences in Methods Varying with the Format of Entries in Alternate-Key Tables In the data storage and retrieval system specified above, entries in alternate-key tables (cf. 11A, 11B and 11C in FIG. 1) are made up of an alternate key, the physical address of the block in which the record of that key value is stored and the primary key of the record of that key value, and the drawing illustrates a method made up of an alternate key, the block number of the block in which the record of that key value is stored and the primary key of the record of that key value.

First, consider an alternate-key table whose entries are made up of an alternate key, the block number of the block in which the record of that key value is stored and the primary key of the record of that key value.

After the operation described above, the alternate-key table entries of the records that had been stored in the former first and former second overflow blocks are modified. If the numbers of blocks in which records are stored are maintained in the entries of the alternate-key table, the block numbers of the primary block and the overflow blocks were all 1 before reorganization, but with reorganization the block number of the former primary block becomes 1, the block number of the former first overflow block becomes 2 and the block number of the former second overflow block becomes 3. These changes are reflected in the requisite entries of the alternate-key table.

Since this operation is performed on the alternate-key table entries of records that undergo reorganization at a given point, it must be noted that it takes more time than does the delinking of overflow blocks.

Addition of New Alternate-Key Table Entry Formats

It is advantageous in reorganization to adopt a following format. Assigning an alternate-key value and the primary key value of the record to the entries that eliminates the need to rewrite alternate-key table entries in reorganization and permits alleviation of the load entailed by reorganization. If this method is adopted, however, retrieval using alternate keys will be time-consuming since target blocks will not be identified unless a search is run on the location table with a primary key value after that primary key is first obtained from a search of the alternate-key table.

Next, we explain for an alternate-key table whose entries are made up of an alternate key, the physical address of the block in which the record of that key value is stored and the primary key of the record of that key value.

This format has the advantages of retrieving a block directly when data is retrieved with an alternate key and, since block addresses do not change with reorganization, a lower load during reorganization than with the use of block numbers.

While possessed of these advantages, this format also suffers from the shortcomings described below and so due consideration must be given to its utilization. First, if the blocks in which records are stored change with the elimination of fragmentation, it will be necessary to rewrite the block addresses of the alternate-key table entries relating to those records, which procedure will constitute a considerable load. Changes in the blocks in which records are stored will also result from the addition of overflow blocks when records are inserted and newly moving records to overflow blocks.

Next, as described below, there is a greater possibility of deadlock due to a different order of exclusion.

Additionally, as described below, limitations are incurred when performing recovery with the data backup and recovery system, for which domestic priority has been claimed.

The frequency of location table reorganization and ease of recovery should be taken into consideration when choosing among these formats.

Location Table and Block Reorganization: Exceptions to Elimination of Overflow

While the foregoing description deals with the elimination of overflow blocks, that following deals with cases in which elimination cannot be performed. These are cases in which spanned records are present. A spanned record is one that is larger than the size of a block and so is segmented to a size that can be stored in blocks and stored across multiple blocks, and is a format has long been in use.

Since a spanned record is a single record that has been segmented, each segment has the same primary key and it is not stored in multiple primary blocks, but always in a single primary block and one or more overflow blocks or in multiple overflow blocks. Storage in multiple overflow blocks occurs when records are already stored in the primary block and the overflow block immediately posterior and storage of the spanned record begins in the midst of an overflow block.

Where a spanned record is stored, maintaining that information in the blocks facilitates understanding. Information specifying whether it is the beginning, the middle or the end of the spanned record is maintained. Otherwise, it does not differ from the case of storage of regular records.

In such a case, overflow blocks involving regular records may be eliminated, but since blocks in which spanned records are stored are necessarily of a structure that entails overflow blocks, these overflow blocks may not be eliminated. In such cases, information relating to spanned records should be output as post-reorganization information.

Location Table and Block Reorganization: Elimination of Fragmentation

A method of eliminating overflow blocks has been described above, but fragmentation also presents significant problems in terms of efficiency. The description following makes reference to FIG. 4 to implement operations similar to those used in reorganization for the elimination of overflow blocks in order to eliminate fragmentation.

Figure 4:
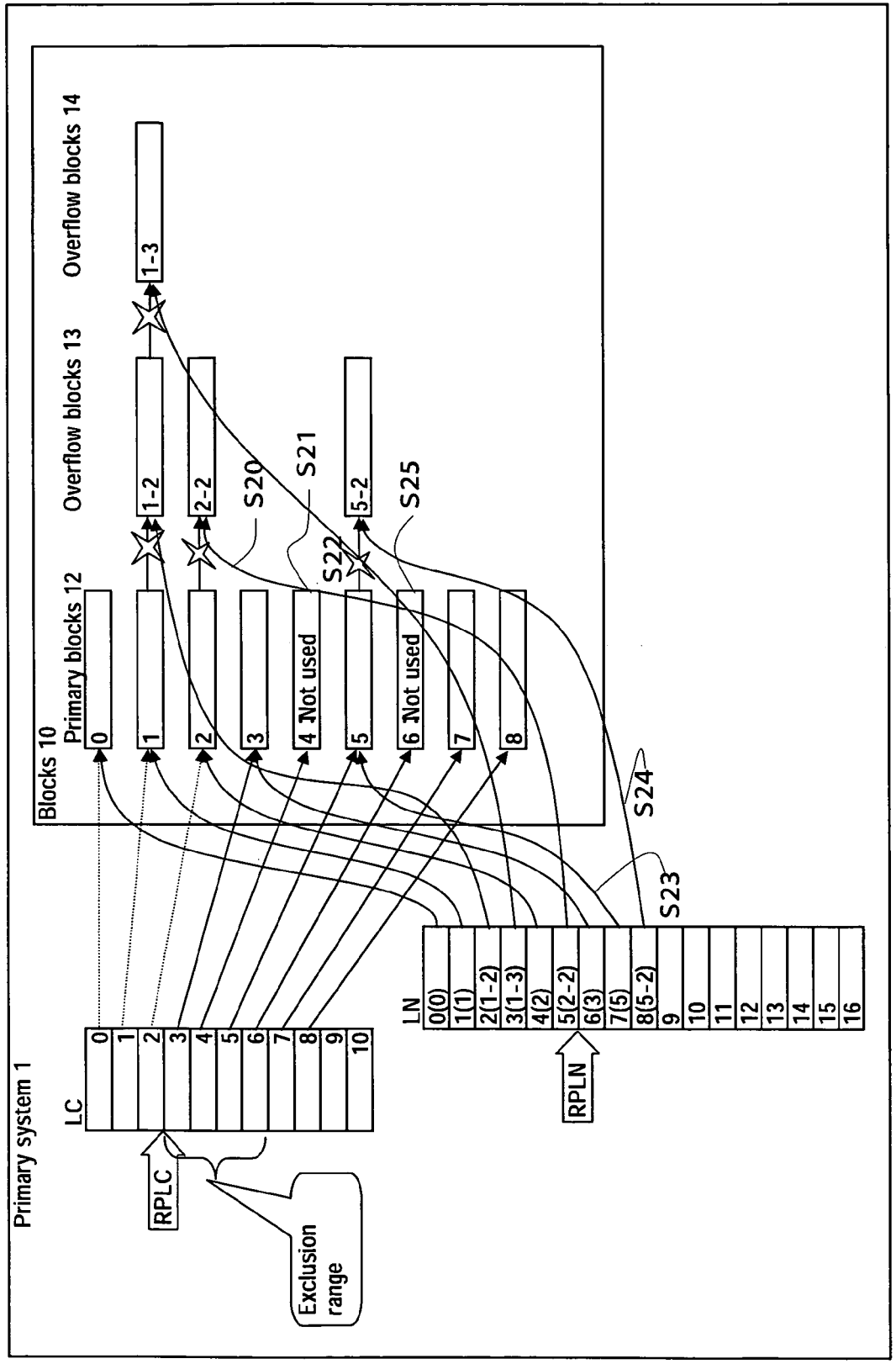
FIG. 4 illustrates the operation of reorganization that eliminates fragmentation in the database reorganization system that is an embodiment of the invention as it concerns primary keys.

FIG. 4 illustrates the operation of reorganization that eliminates fragmentation in the database reorganization system that is an embodiment of the invention as it concerns primary keys.

FIG. 4 assumes that records are stored moderately in block numbers 0, 1 in primary block 1-2, 1-3, 2 and 2-2 in overflow blocks 12, 13 and 14, and that the elimination of overflow blocks has been completed with the method described above. The block numbers used in the description following are the block numbers in current location table LC. Where numbers from new location table LN are used, it is so stated.

Records are stored in block number 3 of the primary blocks 12 up to 30% of its storage capacity. Records are stored in block number 4 of the primary blocks 12 up to 40% of its storage capacity. Records are stored in block number 5 of the primary blocks 12 up to 70% of its storage capacity, in block 5-2 of the overflow blocks 13 up to 60% of its storage capacity and in block 6 of the overflow blocks 13 up to 70% of its storage capacity. The suitable initial storage rate of each block after reorganization is 90%. This is to prevent the generation of overflow blocks immediately upon the insertion of records after reorganization.

The reorganization system is about to reorganize block 3, which is referenced by the fourth entry, which reorganization pointer RPLC of the current location table LC is pointing to. However, its storage rate (the volume of records stored in that block as a proportion of the capacity of the block) is 30%, which does not satisfy the suitable initial storage rate. Therefore, attention turns to the current block number 4 of the primary blocks 12. Since the storage rate of this block number 4 of the primary blocks 12 is 40%, adding the two blocks together still falls short of the suitable initial storage rate (90%). Attention then turns to block number 5 of the primary blocks 12, which has a storage rate of 70% and would thus exceed the suitable initial storage rate of 90%.

Leaving the records stored in block number 3 of the primary blocks 12 untouched, the records in block number 4 of the primary blocks 12 are moved to block number 3 of the primary blocks 12. Furthermore, in order to achieve the suitable initial storage rate, the first 20% of the records stored in block number 5 of the primary blocks 12 is moved to block 3 of the primary blocks 12, and the remaining 50% of the records in block number 5 of the primary blocks 12 is shifted to the beginning of that block (to the left in FIG. 4). When doing so, the alternate-key table entries of the records shifted are revised in the same fashion as described above in the elimination of overflow blocks.

The low value and high value of the primary keys of records stored in the blocks are modified. Where current location table LC and new location table LN entries hold low and high values of primary keys in blocks, the low value and high value of primary keys in new location table LN entries are modified.

Since block 3 of the primary blocks 12 is done, the address of the seventh entry in the new location table LN is rewritten (S20 in FIG. 4) to block 3.

Reorganization pointer RPLN moves to the beginning of the eighth entry in the location table LN. At this point block 4 of the primary blocks 12 becomes an unused block. (S21 in FIG. 4)

Next, the operation is performed on block 5 of the primary blocks 12, and the storage rate of block 5 of the primary blocks 12 is now 50% due to reorganization. Since block 5-2 of the overflow blocks 13 has a storage rate of 60%, the 30% of records from the beginning of block 5-2 of the overflow blocks 13 are moved to block 5 of the primary blocks 12, and the remaining records in block 5-2 of the overflow blocks 13 are shifted to the beginning of that block (moved leftwards in the drawing). The link between block 5 of the primary blocks 12 and block 5-2 of the overflow blocks 13 is then cut (S22 in FIG. 4). This sets the overflow block address of block five of the primary blocks 12 to a specific value (for example, zero). The alternate-key table entries of the records moved are revised in the same fashion as described above in the elimination of overflow blocks.

Since block 5 of the primary blocks 12 is done, the address of the eighth entry in the location table LN is rewritten (S23 in FIG. 4) to block 5 of the primary blocks 12.

Next, since block 5-2 that had been an overflow block 13 has a storage rate of 30% and block 6 that is the next primary block 12 has a storage rate of 60%, all the records of block 6 that is the next primary block 12 are moved to block 5-2 that had been an overflow block 13. Since the storage rate of block 5-2 that had been an overflow block 13 is now a suitable one, the address of the eighth entry in the new location table LN is rewritten (S24 in FIG. 4) to block 5-2 that had been an overflow block 13. The reorganization pointer RPLN moves to the beginning of the ninth entry in the location table LN. At this point block 6 of the primary blocks 12 becomes an unused block. (S25 in FIG. 4)

Reservation of Suitable Initial Storage Rates

The reservation of a suitable initial storage rate may require the addition of blocks, the converse of handling fragmentation. What this means is that, for example, given a space utilization rate of 100% in all blocks, achieving a suitable initial storage rate of 90% entails the addition of one block to the nine that may exist at the point of reorganization and storing records in each of them for a block storage rate of 90%.

It may not be possible in some cases, for reasons of block and record size, to strictly implement reservation of suitable storage rates, and since it may be necessary to subject considerably large numbers of blocks to reorganization at particular points in time, the requisite exclusion range may expand accordingly and have an adverse effect on system operation.

Multiple Initial Storage Rates

In order to prevent such circumstances arising, it is preferable in operational terms to use multiple values, such as 85% to 90%, for the suitable initial storage rate. In this case, the suitable initial storage rate need only fall within the range of 85% to 90%.

Suitable initial storage rates may also be specified block by block, depending on the overflow-block status of each block. Such block-specific suitable initial storage rates may be implemented by adding an element in location table entries and specifying them there or by including an element within blocks and specifying them there.

When reserving suitable initial storage rates, records may be rewritten from their original blocks to other blocks. It is also necessary to rewrite any alternate-key table entries related to the records thus rewritten.

Reorganization in Practice and Prevention of Deadlock

As the execution of reorganization in practice consists of at once performing the elimination of overflow blocks, the elimination of fragmentation and the reservation of suitable initial storage rates, it is a combination of these three.

In principle, a reorganization system may be implemented as described above, but as blocks are sequentially read and blocks created with suitable initial storage rates, the risk of deadlock increases since the exclusion range cannot be determined from the outset and exclusion extends sequentially. Effective ways of preventing deadlock are as follows.

The first method of preventing deadlock is to read the blocks in sequence without placing them under exclusion, find their record storage rates and calculate the appropriate size for combinations of multiple blocks in order to determine the exclusion range.

The second method of preventing deadlock is to provide, in the data storage and retrieval system described above, location table entries capable of maintaining, in addition to block numbers and block addresses, either or both of the low value and high value of the primary key values of records stored in blocks.

Adding Elements to Location Table Entries

In addition to this information, the storage rates of records or the number of bytes occupied by records in blocks and the number of overflow blocks linked to blocks are added to location table entries. This eliminates the need to read blocks, as described for the first method above, and allows that information to be gained simply by reading the location table. However, since the storage rates of records and the number of bytes occupied by records in blocks changes with the insertion and deletion of records and the need arises to rewrite the location table, a choice should be made between the first and the second method of preventing deadlock described above depending on the state of record generation. This information may also be maintained within blocks.

Thus, the reorganization range is determined upon finding the storage rates within blocks, and the location table entries within that range, the blocks that those entries point to and the overflow blocks linked to those blocks are placed under exclusion.

Then the number of blocks and overflow blocks subject to reorganization and their storage capacity are found and the actual volume of the records requiring storage is found, and then it is assessed whether the number of blocks required is equal to, greater than or less than the sum of the current number of blocks and overflow blocks. Then applying the logic described above for the elimination of overflow blocks, the elimination of fragmentation and the reservation of suitable initial storage rates, the blocks are reorganized and entries created in the new location table. In this case, the reorganization pointers move at once for the amount of blocks subject to reorganization.

Reorganization is thus performed on from one block to several tens of blocks in a single pass, but this reorganization does not interfere with regular data processing since it appears to be treated as a regular data processing transaction.

And by performing successive passes of this reorganization on the location table and the blocks, reorganization of the whole is completed.

Completion of Reorganization

Description follows of methods of recognizing the completion of reorganization. A final pointer is provided to the current location table LC to indicate the final position used by that location table.

The final pointer is provided for the following purpose. The location table is reserved in a contiguous region. A method of providing a additional location table in region discontiguous with the first location table when location table entries are insufficient reorganization system can not add new additional location table in contiguous region to current the location table, converting addresses to perform binary searches as though their areas were contiguous is described in the data storage and retrieval system, but is not recommended because the load of address conversion increases with large numbers of discontiguous areas. Therefore, a fully adequate area for location tables is reserved from the outset and the address of the next entry after the entries used is pointed to in order to distinguish used entries from unused entries.

Thus, the provision of the final pointer allows the retrieval of records by means of primary keys even if unused entries exist in the current location table LC by means of executing a binary search between the first address and the final pointer in the current location table LC.

Methods of Detecting the Completion of Reorganization

The final pointer is used as an indicator. Reorganization of the location table and blocks is completed when reorganization runs and the address pointed to by the current reorganization pointer RPLC matches the address pointed to by the final pointer. Overflow blocks linked to the block that the final entry points to do not represent a problem because the current reorganization pointer RPLC does not move until the reorganization of these overflow blocks is complete.

When reorganization has completed, the current reorganization pointer RPLC is no longer needed and so the new location table LN is designated the current location table and the location table LC may be deleted.

Figure 20:
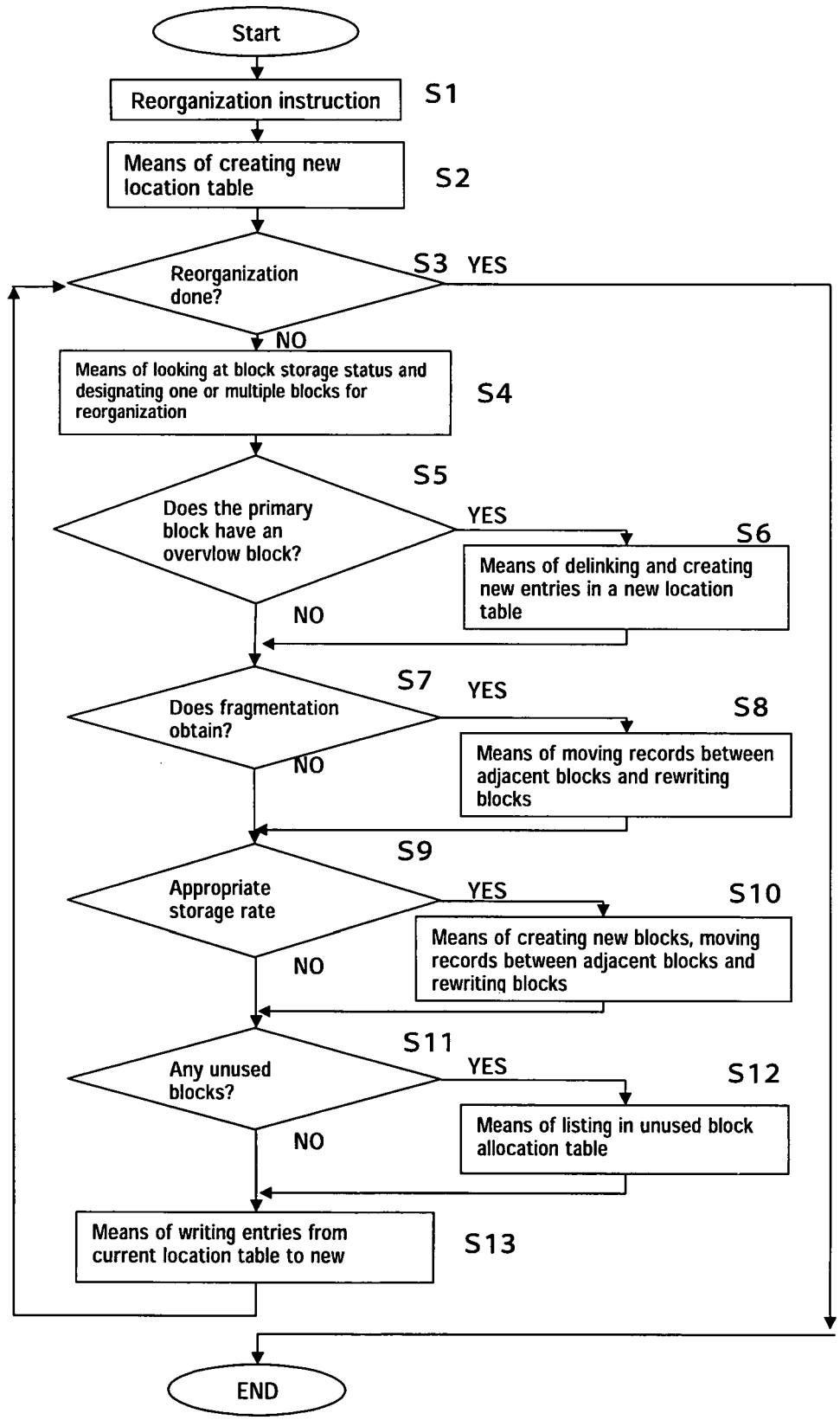
FIG. 20 is a flowchart of reorganization.

FIG. 20 is a flowchart of the reorganization described above. S1 here is an instruction for reorganization. S2 represents a means of creating the new location table. S3 evaluates the completion of reorganization. S4 represents a means of examining the status of storage in blocks and allocating one or multiple blocks for reorganization. S5 evaluates whether overflow blocks are linked to the primary block. S6 represents a means for delinking overflow blocks and creating new entries in the new location table. S7 evaluates whether fragmentation obtains or not. S8 represents a means for moving records between blocks, rewriting blocks and eliminating fragmentation. S9 evaluates whether suitable initial storage rates are exceeded. S10 represents a means for creating new blocks, moving records between blocks and rewriting blocks. S11 evaluates whether unused blocks exist. S12 represents a means of making registrations in an unused block allocation table. S13 represents a means of transcribing entries from the current location table to the new location table.

Reutilization of Unused Blocks

A method of reorganization has thus been described that addresses fragmentation, but in FIG. 4 block 4 of the primary blocks 12 of the current location table LC and block 6 of the primary blocks 12 are left unused. Left as it is, this may result in failing to eliminate overall fragmentation while eliminating fragmentation within blocks. The following expedient is adopted in order to prevent this outcome.

Unused Block Allocation Table, Start-Position Pointer and End-Position Pointer

Figure 5:
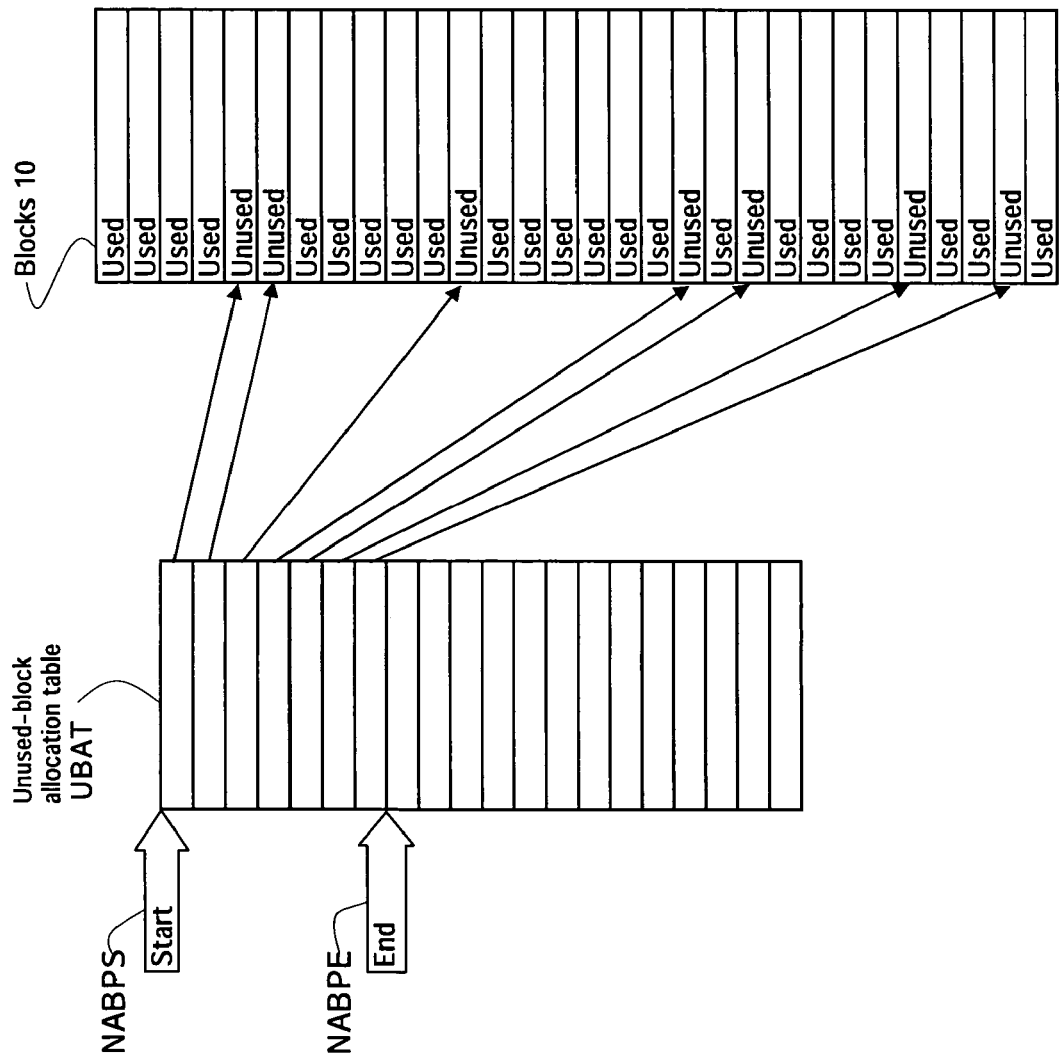
FIG. 5 illustrates a method of eliminating overall fragmentation in the database reorganization system that is an embodiment of the invention as it concerns primary keys.
Figure 6:
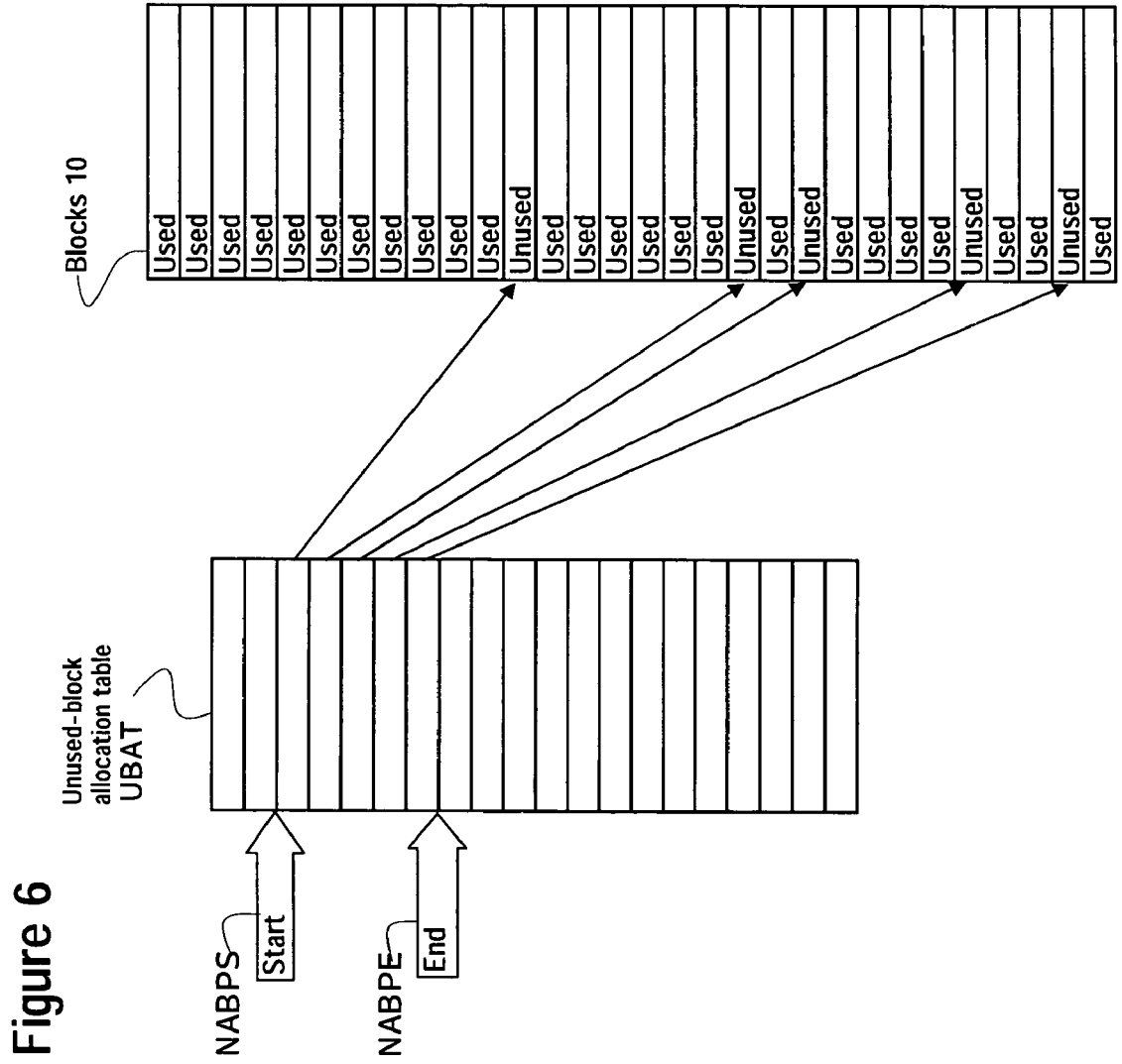
FIG. 6 illustrates a method of eliminating overall fragmentation in the database reorganization system that is an embodiment of the invention as it concerns primary keys.

FIG. 5 and FIG. 6 assist in the description of a method for eliminating overall fragmentation in the database reorganization system that is a preferred embodiment of the invention as it concerns primary keys.

A method of eliminating overall fragmentation in the database reorganization system is, as shown in FIG. 5, to use an unused block allocation table UBAT. The unused block allocation table UBAT is a table of the format shown in FIG. 5, and its purpose is to store the addresses of unused blocks among the blocks 10. In this method of eliminating overall fragmentation in the database reorganization system, two pointers are also used, a start-position pointer NABPS to indicate the start position in the unused block allocation table UBAT and an end-position pointer NABPE to indicate the end position in the unused block allocation table UBAT. FIG. 5 represents a state in which seven unused blocks have appeared where none at all previously existed.

In their initial states, both the start-position pointer NABPS and the end-position pointer NABPE point to the beginning of the unused block allocation table UBAT.

Here, when an unused block appears, the unused block of the blocks 10 is registered in the unused block allocation table UBAT entry that the end-position pointer NABPE is pointing to and the end-position pointer NABPE is rewritten to point to the next entry in the unused block allocation table. The result of the sequential execution of this operation is shown in FIG. 5 illustrating the state after the appearance of seven unused blocks. Here, the end-position pointer NABPE is pointing, as shown in FIG. 5, to the eighth entry in the unused block allocation table UBAT.

Next, a description follows of a method for the reutilization of unused blocks. In the database reorganization system that is a preferred embodiment of the invention as it concerns primary keys, when the need arises to acquire a new block (for example, the addition and acquisition of the next primary block after the final pointer in the location table with the addition of a record, or the addition of an overflow block), rather than acquiring the block from a new area, the unused block allocation table UBAT is referenced and, if an unused block exists, blocks registered in the unused block allocation table UBAT are prioritized for use. A method of utilizing unused blocks is to use the block in the entry that the start-position pointer NABPS is pointing to. The unused block allocation table UBAT contains the addresses of unused blocks, so when a block is added, the address is written to the location table (location tables LC and LN in FIG. 2 or FIG. 4), and when an overflow block is added, the address is written to the primary block that manages that block or to the pointer to the overflow block. The content of the start-position pointer NABPS is then rewritten to point to the next entry in the unused block allocation table. FIG. 5 illustrates a state immediately following two executions of such rewriting and the utilization of two unused blocks.

The unused block allocation table UBAT may be used in cyclical fashion. When an unused block appears, the position of the end-position pointer NABPE moves towards the end of the unused block allocation table UBAT (downwards in the drawing), and when an unused block is utilized, the position of the start-position pointer NABPS likewise slides towards the end of the unused block allocation table UBAT (downwards in the drawing), and so the one table may be used cyclically as long as the end-position pointer NABPE does not overtake the start-position pointer NABPS. In other words, in the database reorganization system that is a preferred embodiment of the invention as it concerns primary keys, when the end-position pointer NABPE reaches the final position (bottommost in the drawing) of the unused block allocation table UBAT, the end-position pointer NABPE is returned to the beginning (uppermost in the drawing) of the unused block allocation table UBAT again and the unused block allocation table UBAT may thus be recycled.

Database Access During Reorganization

Figure 7:
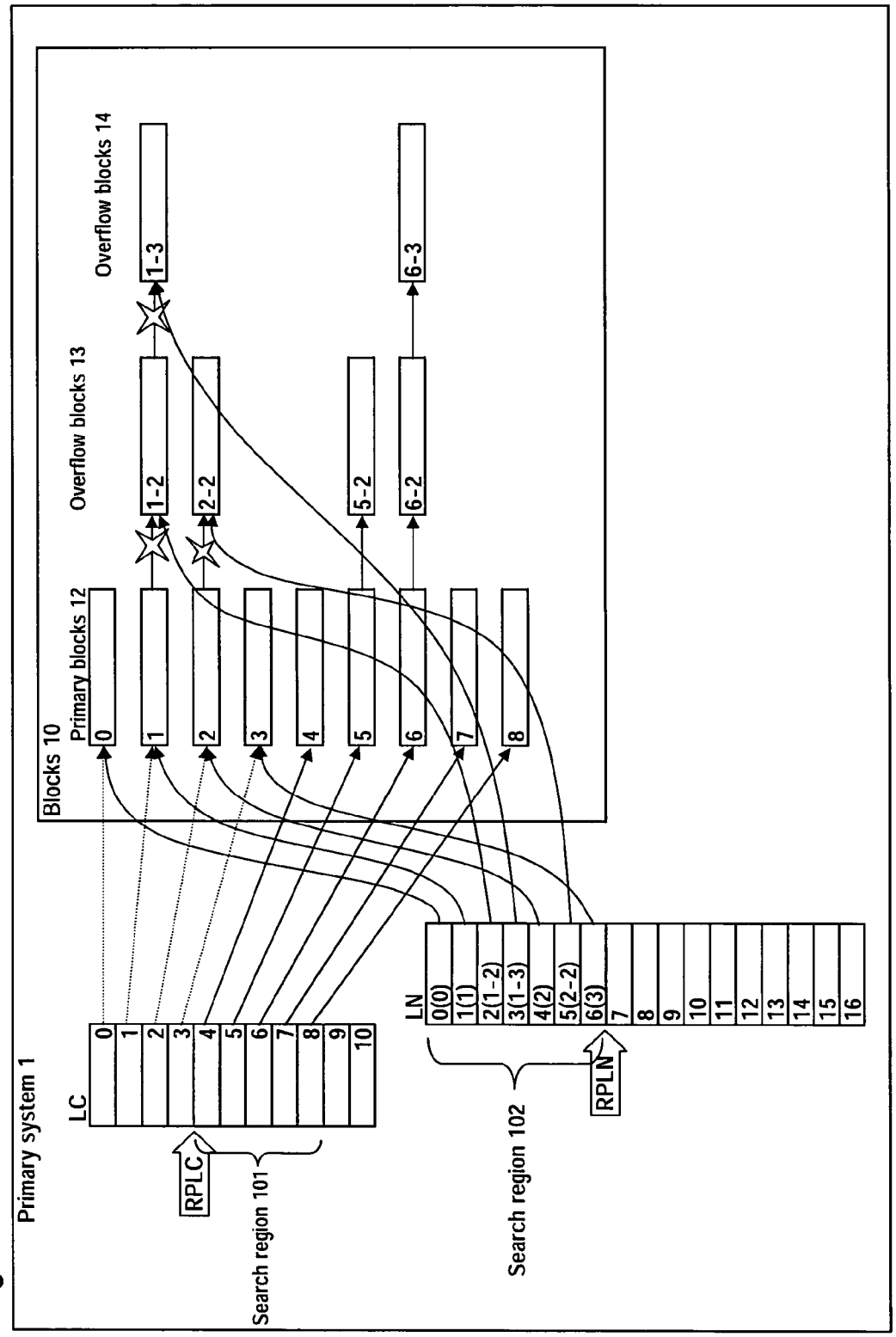
FIG. 7 illustrates data retrieval and read/write operations during reorganization in the database reorganization system that is an embodiment of the invention as it concerns primary keys.

Next, a description follows, referencing FIG. 7, of enabling data retrieval, reading and writing during reorganization in the database reorganization system that is a preferred embodiment of the present invention as it concerns primary keys.

That it is possible to retrieve, write and read data during reorganization means that it is possible to perform reorganization without shutting down the system and even as the data storage and retrieval system is in operation.

FIG. 7 illustrates data retrieval and read/write operations during reorganization in the database reorganization system that is an embodiment of the invention as it concerns primary keys.

In this database reorganization system, retrieval with primary key values while reorganization is not running is performed by means of binary search using the current location table LC.

In this database reorganization system, if reorganization is running, the target key value (the key value to be retrieved) is assessed as less than (upwards in the drawing) or greater than (downwards in the drawing) the primary key value that the reorganization pointer RPLC is pointing to. Since primary keys are listed in the order of their values in the current location table LC, this may be achieved by comparing the key value of the entry that the reorganization pointer RPLC is pointing to and the target key value.

If the target key value is less than the low value of the primary key value in the entry that the reorganization pointer is pointing to, then the target entry exists upwards from (in a smaller address than) the reorganization pointer RPLC. In this case the new location table LN is used to perform a binary search between the first address in the new location table LN and the reorganization pointer RPLN (in the search region 102). As the result of the binary search, the records in the block that the target entry is pointing to are examined and it is determined whether the target record is present or not.

If the target key value is equal to or greater than the low value of the primary key value of the entry that the current reorganization pointer RPLC0 is pointing to, the target entry exists downwards from the current reorganization pointer RPLC (the entry RPLC0 is pointing to or in a larger address). In this case the current location table LC is used to perform a binary search on the entries between the current reorganization pointer RPLC and the final pointer in the current location table LC (in the search region 101).

Thus, in the database reorganization system that is a preferred embodiment of the present invention as it concerns primary keys, the current reorganization pointer RPLC is used to make a comparison with the target key value and assess it as less than (upwards from in the drawing) or greater than (downwards in the drawing) the primary key value that the current reorganization pointer RPLC is pointing to, and since the target entry may then be definitively retrieved by performing a binary search on the location table LN if the target key value is less than that primary key value or on the location table LC if greater than that primary key value, the record holding the target primary key value may be retrieved.

In the database reorganization system that is a preferred embodiment of the present invention, a block containing the record that holds the target primary target key cannot be accessed while positively under reorganization for reason of exclusion and is queued for release from exclusion, but this state does not in any way constitute a problem since it is no different from the update, insertion or deletion of records in normal access. In other words, requests to excluded blocks are queued for their release from exclusion and may be processed once reorganization of that block is complete and it is released from exclusion.

Retrieval by Means of Alternate Key

Retrieval by means of alternate key in the database reorganization system that is a preferred embodiment of the present invention as it concerns primary keys is described with reference to FIGS. 1 through 4.

The foregoing description concerns an instance of retrieval by means of primary key during the reorganization of a location table and blocks, and retrieval by means of alternate key is as follows. Retrieval by means of alternate key consists of using alternate key tables (reference numerals 11A, 11B and 11C in FIG. 1) or, as discussed below, alternate-key location tables to retrieve the target alternate-key entry.

Once the alternate-key entry is found, its content is applied to retrieve the record. As described above, alternate-key entries may have one of three formats: (i) entries maintaining block numbers, (ii) entries not maintaining block numbers and (iii) entries maintaining block addresses.

Given format (ii) in which entries do not maintain block numbers, a binary search is performed on the location table with the primary key in entirely like fashion as described above to access a database undergoing reorganization. If the entries maintain block addresses, the block at that address is known to be the target block because block addresses are not modified in reorganization. However, if the entries maintain block numbers, the number must be identified as one in the current location table or one in the new location table, since block numbers are updated in reorganization.

This identification is performed as follows.

If the block number the current reorganization pointer RPLC is pointing to is greater than the block number the new reorganization pointer RPLN is pointing to, identification is performed as follows. It is not possible for the object of retrieval to be a block between the block number the current reorganization pointer RPLC is pointing to and the block number the new reorganization pointer RPLN is pointing to. The reason is that since reorganization in the current location table LC has progressed through the location of the reorganization pointer RPLC and reorganization has not run on the section of the new location table LN beyond the reorganization pointer RPLN, blocks with block numbers greater than the block the new reorganization pointer RPLN is pointing to will not be the object of retrieval.

That is, when the object of retrieval is a block number less than the block number the new reorganization pointer RPLN is pointing to, the new location table LN is used. When the object of retrieval is a block number equal to or greater than the reorganization pointer RPLC, the current location table LC is used.

If the block number the current reorganization pointer RPLC is pointing to is less than the block number the new reorganization pointer RPLN is pointing to, identification is performed as follows.

When the block number that is the object of retrieval is less than the block number the reorganization pointer RPLC is pointing to, the new location table LN is used. When the block number that is the object of retrieval is greater than the block number the reorganization pointer RPLN is pointing to, the current location table LN is used.

When the block number that is the object of retrieval is equal to or greater than the block number the current reorganization pointer RPLC is pointing to and less than the block number the new reorganization pointer RPLN is pointing to, the block number alone is insufficient to uniquely specify which location table is appropriate and so the following procedures is performed.

In the results of retrieval from an alternate-key table, the alternate-key entry obtained contains a primary key. This primary key value is compared with the primary key value in the entry of the location table that the reorganization pointer RPLN is pointing to, and if the primary key value of the alternate-key entry is less than the primary key value of the reorganization pointer RPLN, the new location table LN is used. If the primary key value of the alternate-key entry is greater than or equal to the primary key value of the reorganization pointer RPLN, the current location table LC is used.

The description foregoing concerns record retrieval, but its application also permits record insertion, updating and deletion.

First, a description follows of insertion. To insert a record, it must first be determined by means of the primary key value of the record to be inserted at which position in which block to insert the record. This is because the data storage and retrieval system described above has a specified storage system in which records are stored in blocks in the order of their primary key values, and the primary key value of a record stored in a block anterior to another block is less than the primary key values of records stored in that other block.

The insertion position of a record is obtained by finding the block into which the record should be inserted and searching within that block, with entirely the same retrieval methods as described above. Here, the pertinent entries in the location table and the block subject to insertion are placed under exclusion. As described for retrieval, if that block is positively undergoing reorganization, it is under exclusion and the exclusion instruction is queued for release from exclusion, and the block may be placed under exclusion and the following operations performed once the reorganization exclusion is lifted.

The description first concerns itself with cases in which no overflow blocks are linked to the block.

If sufficient free space to store the inserted record exists in that primary block, records located after the insertion location are shifted towards the end by the amount of the length of the record inserted and the inserted record is written to the area freed up.

If sufficient free space to store the inserted record does not exist in that primary block, a new overflow block is linked to the primary block, the post-insertion storage volume calculated, sufficient records moved to the overflow block to reserve the suitable initial storage rate in the primary block and the inserted record stored at the appropriate location in the primary block or the overflow block.

If an overflow block is linked to the primary block, the operation described above is performed reckoning the primary block and any overflow blocks as a single unit.

Next, alternate keys are added. If the inserted record has alternate keys in three kinds (A, B and C), alternate-key tables are searched for each kind. The description following applies to alternate-key table A. A detailed description of a method for retrieval by means of alternate key during reorganization is provided in the discussion on reorganization of alternate-key tables and so is omitted here. Once the alternate-key block where an alternate-key entry is to be inserted is retrieved, the location at which the alternate-key entry is inserted inside the alternate-key block is determined. At this point, the alternate-key block and, if any alternate-key overflow blocks are linked to that alternate-key block, those alternate-key overflow blocks are placed under exclusion. If an alternate-key location table is used, the pertinent entries in that alternate-key location table are also placed under exclusion. If that alternate-key block is positively undergoing reorganization (the reorganization of alternate-key tables is discussed below), it is under exclusion and the exclusion instruction is queued for release from exclusion, and the alternate-key block may be placed under exclusion and the following operations performed once the reorganization exclusion is lifted.

The description initially addresses instances in which there are no alternate-key overflow blocks linked to that alternate-key block.

If sufficient free space to store the inserted alternate-key entry exists in that alternate-key block, alternate-key entries located after the insertion location are shifted towards the end by the amount of the length of the alternate-key entry inserted and the inserted alternate-key entry is written to the area freed up.

If sufficient free space to store the inserted alternate-key entry does not exist in that primary block, a new alternate-key overflow block is linked to the alternate-key block, the post-insertion storage volume calculated, sufficient alternate-key entries moved to the alternate-key overflow block to reserve the suitable initial storage rate in the alternate-key block and the inserted alternate-key entry stored at the appropriate location in the alternate-key block or the alternate-key overflow block.

If an alternate-key overflow block is linked to that block, the operation described above is performed reckoning the alternate-key block and any alternate-key overflow blocks as a single unit.

Likewise, entirely same operations are performed for alternate keys B and C.

Performing the above sequence of operations gives a completed record insertion. Exclusion is now lifted on any entries in the location table, blocks, overflow blocks, alternate-key blocks and alternate-key overflow blocks that had been placed under exclusion.

Next, the discussion addresses the updating of records.

Updating a record likewise first requires the retrieval of that record. Retrieval is performed with the retrieval method described above. Once the record is thus found, the pertinent entries in the location table and the pertinent blocks are placed under exclusion. The record may then be updated. If the length of the record remains unchanged and no alternate keys are modified, the update is complete and exclusion is lifted on the location table and blocks.

If an update results in a change to the length of a record, operations are similar to those for insertion. If the record is now longer, it is determined whether there is sufficient storage space for the additional length. If there is sufficient storage space, the records after the storage location are shifted towards the end by the requisite number of additional bytes and the storage space occupied by the record prior to update is combined with the newly reserved storage space to store the updated record.

If there is insufficient free space, an overflow block is linked and records moved to the overflow block, the procedures here being the same as those for insertion.

If an alternate-key value has been modified, the alternate-key table must be modified. A modified alternate-key value results in the deletion of the old alternate-key value entry and the addition of a new alternate-key value entry.

The addition of an alternate-key entry involves the same procedure as for the insertion of a record. To delete an alternate-key entry, the alternate-key block affected is retrieved and the alternate-key entry to be deleted found. When the alternate-key block is found, the alternate-key block and, if any alternate-key overflow blocks are linked to that alternate-key block, those alternate-key overflow blocks are placed under exclusion. If an alternate-key location table is used, the pertinent entries in that alternate-key location table are also placed under exclusion.

The entry to be deleted is deleted, and the alternate-key entries after the deleted entry are shifted towards the beginning of the alternate-key block. If the alternate-key entry to be deleted is stored in an alternate-key overflow block, alternate-key entries are moved within the alternate-key overflow block. When deleting an alternate-key entry in an alternate-key block to which an alternate-key overflow block is linked, some of the alternate-key entries in the alternate-key overflow block may be moved to the alternate-key block, but they need not be moved since not moving them will not cause any operational problems. This applies likewise to instances in which the alternate-key entry affected exists in an alternate-key overflow block.

When multiple alternate keys have been modified, the above operations are executed on the alternate-key tables for which they are necessary.

Performing the above sequence of operations completes record updating operations, and so any exclusion applied is lifted.

Next, the description addresses the deletion of records. The deletion of a record also first requires the retrieval of the record to be deleted. Once the record is found, the affected entries in the location table and the affected blocks are placed under exclusion.

Next, the record to be deleted is deleted, and the records after that record are moved towards the beginning by the amount of space that had been occupied by the deleted record. When deleting a record in a primary block to which an overflow block is linked, some of the records in the linked overflow block may be moved to the primary block, but they need not be moved since not moving them will not cause any operational problems. This applies likewise to instances in which the record affected exists in an overflow block.

In this way, records may be retrieved, inserted, updated and deleted while reorganization is underway. Since the addition of a record is a variation on insertion, an addition may be performed in the same fashion as an insertion.

Handling Advances in Reorganization During Retrieval Operations

Figure 8:
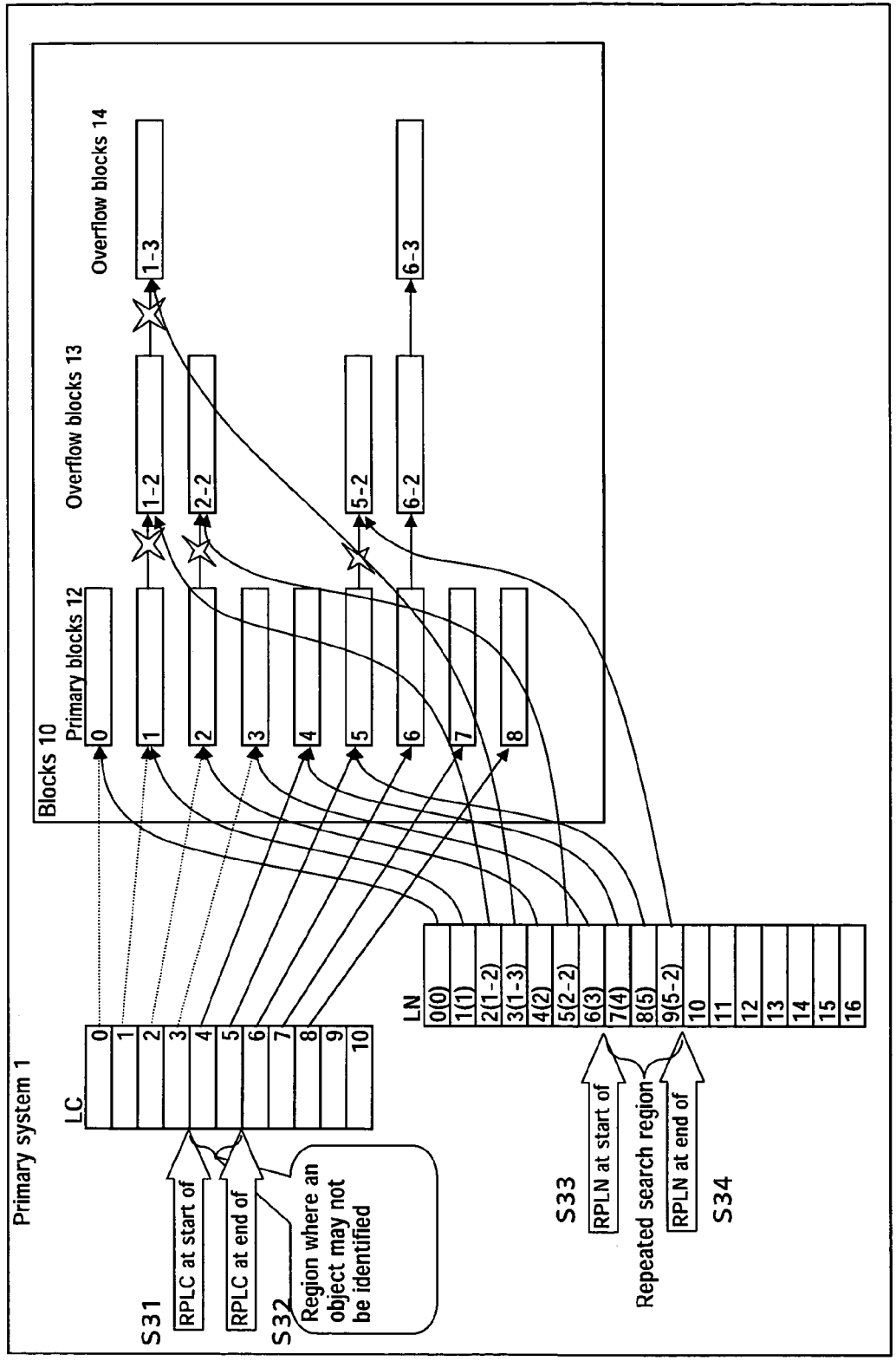
FIG. 8 illustrates operation when reorganization advances during a retrieval operation in the database reorganization system that is an embodiment of the invention as it concerns primary keys.

FIG. 8 illustrates operation when reorganization advances during a retrieval operation in the database reorganization system that is an embodiment of the invention as it concerns primary keys.

It has been explained how it is possible, in the database reorganization system that is a preferred embodiment of the present invention as it concerns primary keys, to call records during reorganization by using the reorganization pointer to make comparisons with the target key value and deciding whether to use the current location table LC or the new location table LN.

However, as shown in FIG. 8, if reorganization advances during a retrieval by means of a primary key using the current location table LC, the position of the reorganization pointer RPLC at the end of the retrieval (S32 in FIG. 8) is different from the position of the reorganization pointer RPLC at the start of the retrieval (S31 in FIG. 8) and the blocks in that range had been subject to the search, there is a possibility that records that actually exist may no longer exist because overflow blocks are already delinked. In FIG. 8 an overflow block 13 (block number 5-2) has been delinked from block number 5 in the primary blocks 12. Left as is, this state leads to unstable operation and introduces the inconvenience of unuseability.

Given this inconvenience, retrievals may be performed without problem by implementing the following measures. The target key value and reorganization pointer are used to determine whether the location table subjected to the search is the current location table LC or the new location table LN. If the location table used is the new location table LN, no problem arises even if the reorganization pointer RPLN has advanced from when the search started. Problems arise when it is the current location table LC that is used. When the current location table LC is searched, unless measures are implemented problems will arise if the reorganization pointer RPLN advances from when the search started.

Access Methods when Reorganization Advances

If reorganization is underway, the value of the current reorganization pointer RPLC and the value of the new reorganization pointer RPLN are saved to specific areas in memory before initiating retrieval. These are S-RPLC and S-RPLN. Additionally, the value of the reorganization pointer RPLN at the point the search of the new location table LN is completed is saved as E-RPLC.

At the point the search in the current location table LC is completed, the value of the reorganization pointer RPLC (which is termed "E-RPLC") is compared with the value of S-RPLC. If these values are different, this means that reorganization advanced during the search. In this case, it is determined where the block that is the object of retrieval is. If the determination finds that the block is between S-RPLC and E-RPLC, it is possible, as discussed above, that the record cannot be retrieved. In this case, the new location table LN is used to perform a binary search between S-RPLN and E-RPLN. Here, if the record can be detected, the record is reckoned to exist, and if it cannot be detected, the record is reckoned not to exist. This permits records to be definitively retrieved, and so the phenomenon of the non-existence of a record exist does not occur.

As described above, records may be read even during reorganization.

Record Insertion and Updating

The insertion of a record, as discussed above with respect to calling a record, requires, in order to determine the block into which the record will be inserted, performing a binary search to find the block and then inserting the record into that block, which consists of the same operations as calling a record.

And since data updating is performing in the order of once reading a record and then updating and storing it, it applies the process described above for calling a record, but the following applies when a primary key value is modified.

When a primary key value in a record is modified, the location in which the record is stored must change. The reason is that records are stored in blocks in the order of their primary keys and if a record exists outside that range, it cannot be retrieved with the location table. Therefore, when a primary key value is modified, the current record is deleted and a new record is then inserted in the block identified on the basis of the primary key value as that where it should be stored. This is a method that has been in general use in conventional databases.

Otherwise, blocks may be found and written with the same methods as are used for calling records.

Suspending and Resuming Reorganization

It is possible, as described above, to retrieve (read), update, insert, add and delete records by means of primary keys even while the location table is under reorganization. In short, it goes without saying that records may be accessed however far reorganization has advanced or, in other words, from any entry in the location table.

Suspending and Resuming Reorganization

It follows that record access may be executed even if reorganization is temporarily suspended. Suspension is, of course, effected after reorganization has completed on some given selection of blocks.

In the database reorganization system that is a preferred embodiment of the present invention as it concerns primary keys, reorganization may be resumed with the entry in the current location table LC and the new location table LN indicated by the current reorganization pointer RPLC and the new reorganization pointer RPLN at the point reorganization was suspended.

Since these functions permit reorganization to be suspended and resources allocated to data processing when the load on the primary system increases and then resumed when the load of data processing falls, there is no need to make advance forecasts of the load on the primary system and operating conditions and reserve a fixed period of time for reorganization in advance.

Overflow Block Formats

The drawings provide an example of an overflow block format in the data storage and retrieval system described above. According to this format, an overflow block does not maintain the low value and high value of the primary key values of the records in that block. The example in the drawings is one in which, in addition to the low value and high value of the primary keys values of records in primary blocks, the low value and high value of the primary key values of records in overflow blocks are maintained in primary blocks.

Overflow Block Formats

The following formats have been devised as alternatives. Primary blocks maintain the low value and high value of the primary keys of the records in the primary block. Overflow blocks likewise maintain the low value and high value of the primary keys of the records in the overflow block. And entries in the location table maintain either one or both of the low value and high value of the primary keys of records stored in the primary blocks managed by those entries and in all of the overflow blocks managed by those primary blocks.

Where overflow blocks do not maintain the low value and high value of primary keys, that much more space may be allocated to the storage of records. However, when overflow blocks are liquidated and made into primary blocks in reorganization, they will then maintain the low value and high value of the primary keys and so if one is full with stored records, it will lack space to maintain the low value and high value of primary keys and an overflow block must be created. And when large numbers of overflow blocks are linked to a single primary block, the problem arises that records in the overflow blocks must be read sequentially in order to find a target record, thus adding to retrieval time. The beneficial effects detailed below may be obtained by maintaining in primary blocks the low value and high value of the primary key values of records in those primary blocks and likewise maintaining in overflow blocks the low value and high value of the primary key values of records in those overflow blocks.

New Overflow Block Formats

As described above, according to the database reorganization system that is a preferred embodiment of the present invention as it concerns primary keys, changing an overflow block to a primary block in reorganization does not result in a new overflow block due to the maintenance introduced of the low value and high value of primary keys, since there are no modifications of block format.

The database reorganization system that is a preferred embodiment of the present invention as it concerns primary keys additionally addresses the problem that records in the overflow blocks must be read sequentially in order to find a target record, thus adding to retrieval time when large numbers overflow blocks are linked to a single primary block, with the capability of reading the low values and high values of primary keys in primary blocks and, if the target key value falls within that range, evaluating whether the target record may exist among the primary blocks. It is known that if the target key value exceeds the high value, this indicates that the target record may exist in the overflow block; that if the first overflow block is read, the target key value is compared with the low value and the high value of the primary key values in that block, and the target record may exist within the block if the target key value falls within that range; and that if the target key value exceeds the high value, the target record may exist in one of the subsequent blocks.

Thus, according to the database reorganization system that is a preferred embodiment of the present invention as it concerns primary keys, it is possible to reduce target-record search times by wide margins when large numbers of overflow blocks are linked.

The above describes the primary system as existing on a single server, but since the primary system is a logical construct, it may exist on multiple servers.

Reorganization Rewriting Blocks

The above description concerns reorganization of location tables, blocks and overflow blocks. This implementation of reorganization has the benefits of holding the rewriting of blocks and overflow blocks to a minimum and abbreviating reorganization times by rewriting the current location table to a new location table.

However, blocks must be rewritten in order to change the size of blocks or in order to change the block storage medium. Application of the system described above allows ready execution of reorganization while thus rewriting blocks. The description makes reference to FIG. 19.

Figure 19:
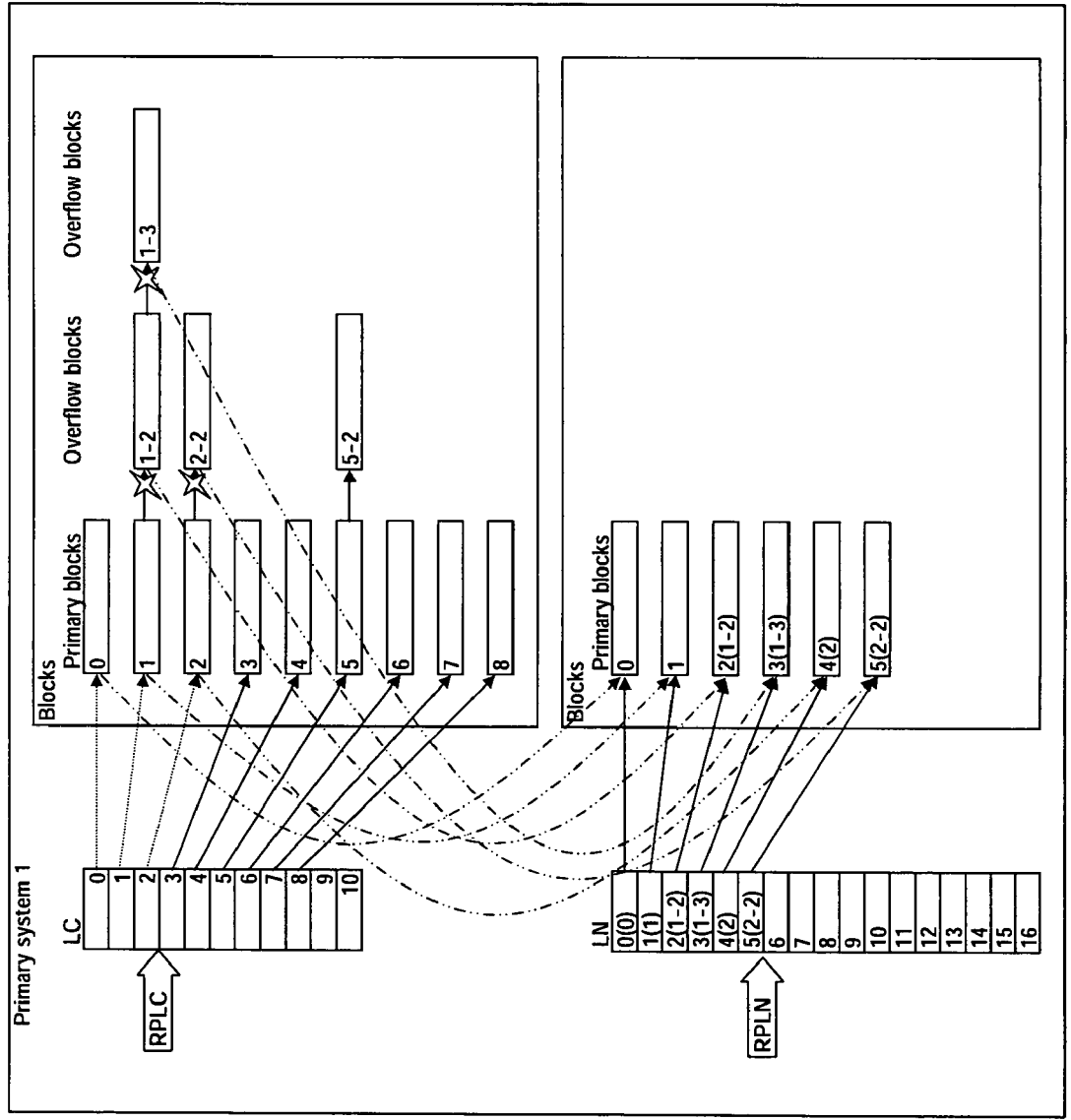
FIG. 19 illustrates the transfer of blocks during reorganization.

FIG. 19 illustrates reorganization with respect to the elimination of overflow blocks, but the elimination of fragmentation and the reservation of suitable initial storage rates may be implemented in entirely like fashion by applying the methods described in the invention as it concerns primary keys.

The top part of FIG. 19 depicts a current database. The bottom part depicts a new database. First, a new location table LN is created corresponding to the current location table LC. Next, the first LC entry is read and the current block 0 is transferred to the block 0 in the new database. Then the LC entry 0 is transferred to LN. The reason this order is applied is that the address of the block 0 in the new database is determined after the transfer, but the order may be reversed if the address is determined in advance.

Next, the LC entry 1 is transferred to LN, but since two overflow blocks are linked to the entry 1, the LC entry 1 becomes the three entries 1, 2 and 3 in LN. After the current blocks 1, 1-2 and 1-3 are transferred to the blocks 1, 2 and 3 in the new database, the LN entries 1, 2 and 3 are created.

FIG. 19 depicts the point at which processing has completed through blocks 2 and 2-2 in the current database. The chained-and-dotted lines in the drawing indicate the action of transfer. As indicated for the invention as it concerns primary keys, one reorganization pointer each is created and provided to LC and LN. The numerals assigned to the LN entries are block numbers, and the numerals in parentheses are the original block numbers in the current database.

In order to simplify the description, the blocks here are of the same size in the current and new databases, but the block size may also be changed. Reorganization is completed at the point when the final pointer of the current location table is pointing to the same address as the reorganization pointer. In FIG. 19 the six current blocks 0, 1, 1-2, 1-3, 2 and 2-2 are left in existence, but they may be deleted after transfer to the new database.

Also in entirely like fashion as described for the invention as it concerns primary keys, database access is to the new database when the target key value is less than the reorganization pointer and to the current database when the target key value is greater than or equal to the reorganization pointer. The suspension and resumption of reorganization is also in entirely like fashion as for the invention as it concerns primary keys.

The current and new databases are depicted here as present on the same machine, but they may also be present on different machines.

Reorganization of Alternate-Key Tables

Alternate-Key Table Formats

In the data storage and retrieval system, alternate key tables were of a format without location tables. A more advantageous format has been devised for the invention as it concerns alternate keys. In the data storage and retrieval system proposed by the inventors, alternate-key blocks have a format maintaining the low values and high values of the alternate-key values of the entries contained in that block and the low values and high values of the alternate-key values of the entries contained in alternate-key overflow blocks linked to that block.

The new format for alternate-key tables is one that employs location tables for alternate-key tables as well.

Reorganization of alternate-key tables lacking alternate-key location tables may be implemented by creating new alternate-key blocks for current alternate-key blocks and sequentially transferring from the current alternate-key blocks to the new alternate-key blocks. In like fashion as for location tables and blocks, reorganization pointers are used here as well, alternate-key overflow blocks are made into alternate-key blocks and the elimination of fragmentation and the reservation of suitable initial storage rates are performed.

Objectives of Reorganization of Alternate-Key Tables

The objectives are the same as those of the reorganization of location tables and blocks. The three objectives are the elimination of alternate-key overflow blocks, the elimination of fragmentation and the reservation of suitable initial storage rates. Since each of these objectives is discussed in detail for the reorganization of location tables and blocks, detailed individual descriptions of them are omitted here.

New Alternate-Key Table Format

Addition of Alternate-Key Location Tables

Figure 9:
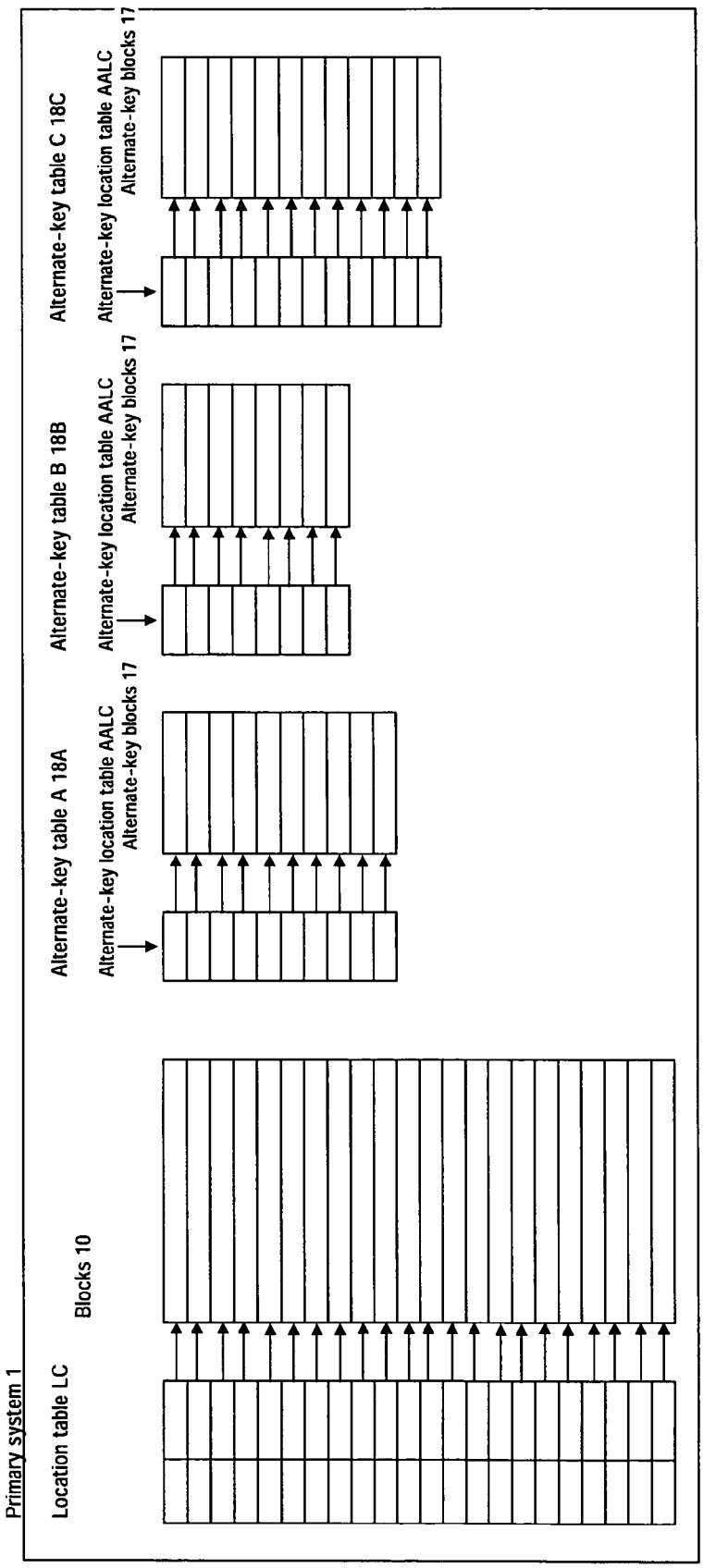
FIG. 9 illustrates the database reorganization system that is an embodiment of the invention as it concerns alternate keys.

A description follows, with reference to FIG. 9 and subsequent, of the database reorganization system that is a preferred embodiment of the present invention as it concerns alternate keys.

FIG. 9 illustrates the automatic database reorganization system that is a preferred embodiment of the present invention as it concerns alternate keys.

The database reorganization system that is a preferred embodiment of the present invention in FIG. 9 employs a new format for alternate-key tables 11A, 11B and 11C, which is to use location tables for the alternate-key tables 11A, 11B and 11C.

That is, the database reorganization system that is a preferred embodiment of the present invention as it concerns alternate keys uses an alternate-key location table AALC to the purpose of managing alternate-key blocks 17 of the alternate-key location tables 11A, 11B and 11C. This alternate-key location table AALC has the same functionality as the location table for blocks described in the preferred embodiment of the present invention as it concerns primary keys.

Figure 11:
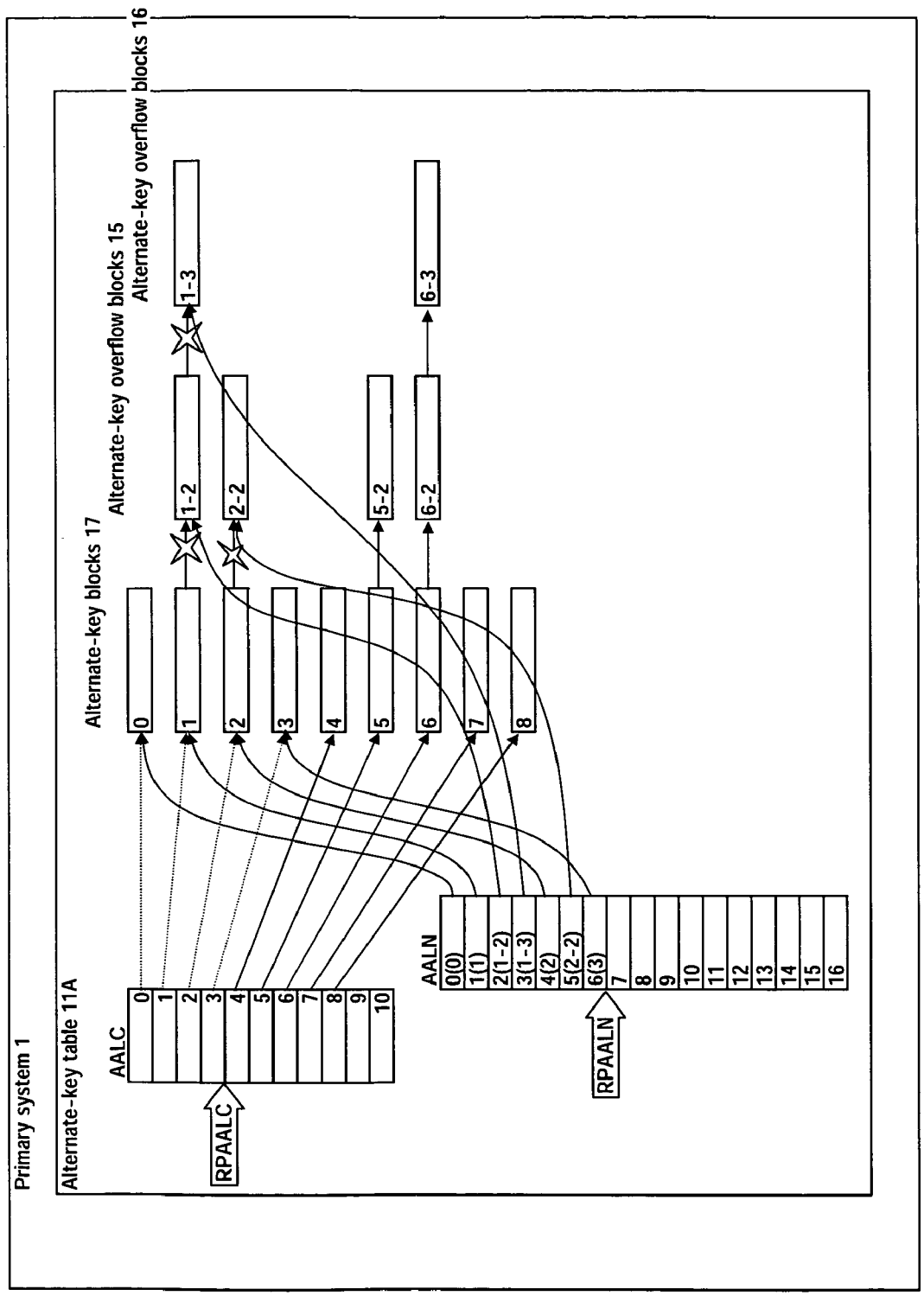
FIG. 11 illustrates methods of reorganization in the database reorganization system that is an embodiment of the invention as it concerns alternate keys.

In FIG. 11 alternate-key table 11A is comprised of an alternate-key location table AALC and alternate-key blocks 17, alternate-key table 11B is comprised of an alternate-key table AALC and alternate-key blocks 17, and alternate-key table 11C is also comprised of an alternate-key table AALC and alternate-key blocks 17.

Therefore, the alternate-key table 11A is held, in this discussion of this database reorganization system that is a second preferred embodiment of the present invention, to stand for the others, and discussion of the alternate-key tables 11B and 11C is omitted.

Figure 10:
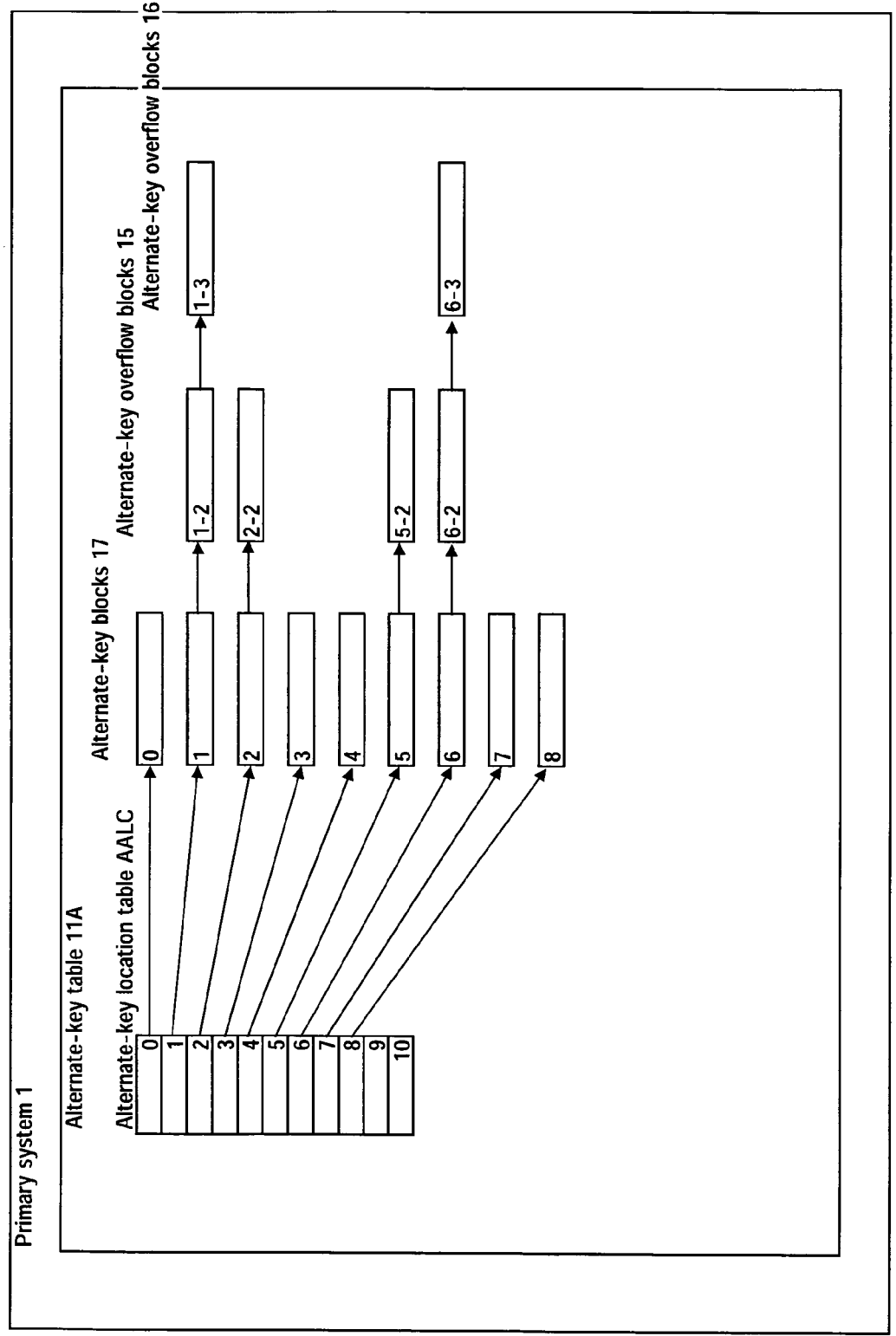
FIG. 10 illustrates an alternate-key table in a primary system in the database reorganization system that is an embodiment of the invention as it concerns alternate keys.

FIG. 10 illustrates an alternate-key table in a primary system in the database reorganization system that is an embodiment of the invention as it concerns alternate keys.

In FIG. 10, the entries in alternate-key location table AALC (alternate-key location table entries) in primary system 1 maintain the addresses of alternate-key blocks AAC that those entries manage. Additionally and as needed, they maintain the numbers of the alternate-key blocks AAC and either or both of the low values and high values of the alternate-key values of the alternate-key entries stored in those alternate-key blocks AAC and in alternate-key overflow blocks 15 and 16 linked to those alternate-key blocks AAC. The alternate-key overflow blocks 15 and 16 are managed by the alternate-key block AAC and so are not managed by the alternate-key location table AALC.

The maintenance of the low values and high values of the alternate-key values of the alternate-key entries stored in the alternate-key blocks AAC and the alternate-key overflow blocks 15 and 16 is likewise to that of the first format in the present invention as it concerns alternate keys. This alleviates the load when retrieving a target alternate-key entry when multiple alternate-key blocks 15 and 16 are linked to the alternate-key blocks AAC.

The utilization of such a format allows the maintenance in alternate-key location tables AALC of the low values and/or high values of the alternate-key values of the alternate-key blocks 17 and the alternate-key overflow blocks 15 and 16 linked to the alternate-key blocks 17. It is thus no longer necessary for the alternate-key blocks AAC to maintain the low values and high values of the alternate-key entries stored in themselves and in the alternate-key overflow blocks 15 and 16 linked to themselves, and it allows an identical format to be used for both the alternate-key blocks 17 and the alternate-key overflow blocks 15 and 16.

Advantages in the Use of Alternate-Key Location Tables

The following advantages may be expected of the use of the format described above in the database reorganization system that is a second preferred embodiment of the present invention.

First, there is no need to change the format of alternate-key blocks or alternate-key overflow blocks in reorganization, allowing alleviation of the load during reorganization.

Second, the transfer of alternate-key blocks and alternate-key overflow blocks is held to a minimum.

Third, whereas the format used in the data storage and retrieval system required that a contiguous region be acquired for alternate-key tables, when this format is adopted and alternate-key location tables are used, no inconvenience arises from having alternate-key blocks scattered in discontiguous regions if a contiguous region is acquired for the alternate-key location table, and so region acquisition may be performed with flexibility.

On the other hand, a disadvantage of this system is the routine need for extra space for the region of the alternate-key location table.

Reorganization of Alternate-Key Tables

Next, a description follows, making reference to FIG. 11, of methods of reorganization employing the new format for alternate-key tables in a data and database reorganization system that is the preferred embodiment of the present invention as it concerns alternate keys.

FIG. 11 here illustrates methods of reorganization in the database reorganization system that is the preferred embodiment of the invention as it concerns alternate keys.

In FIG. 11, the second implementation of alternate-key tables in the preferred embodiment of the present invention as it concerns alternate keys consists of providing an alternate-key location table AALC to alternate-key blocks 17 of an alternate-key table 11A, in which the entries of the alternate-key location table AALC manage the alternate-key blocks 17. Alternate-key overflow blocks 15 and 16 have almost the same relationship as that between an alternate-key block table and blocks.

Two Alternate-Key Location Tables and Two Reorganization Pointers: Transferring Alternate-Key Location Table Entries Thus, reorganization in this case may be executed according to much the same logic as described above for the reorganization of a location table and blocks.

Reorganization of Alternate-Key Tables: Region Required for Reorganization

Two Location Tables

To perform automatic reorganization with this automatic reorganization system requires one pair of the alternate-key location table subjected to reorganization.

Reorganization of Alternate-Key Tables: Elimination of Overflow

The description following concerns reorganization of the alternate-key table 11A in FIG. 9. As explained above, description concerning the alternate-key tables 11B and 11C is omitted, but their reorganization is entirely likewise that of the alternate-key table 11A.

In FIG. 9, FIG. 10 and FIG. 11, reorganization utilizing alternate-key location tables AALC and AALN is described below. It is only the alternate-key blocks 17 that are managed by alternate-key location table AALC. Alternate-key overflow blocks 15 and 16 are managed by alternate-key blocks 17. In other words, alternate-key blocks 17 maintain the addresses of the alternate-key overflow blocks 15. Therefore, when using the alternate-key location table AALC to retrieve data with an alternate key, the target alternate-key block 17 is found by performing a binary search on the alternate-key location table AALC, but it is further necessary to find the target alternate-key entry within that alternate-key block 17. If multiple alternate-key overflow blocks 15 and 16 are linked to the alternate-key block 17, it will take more time, for the alternate-key overflow blocks 15 and 16, to find the target alternate-key entry than when only an alternate-key block 17 exists. The time required to find a target alternate-key entry may be reduced by doing away with the alternate-key overflow blocks 15 and 16, in order to avoid this, and managing all the alternate-key blocks in the alternate-key location table AALC.

Further, alternate-key entries are held in the alternate-key blocks 17 and the alternate-key overflow blocks 15 and 16 in the order of their alternate keys, and if there are many alternate-key overflow blocks, more shifting of alternate-key entries results when an alternate-key entry is inserted and efficiency falls during insertion, the prevention of which is a further objective.

Using Two Location Tables, One Current and One New, to Perform Reorganization

Since a count is kept of how many alternate-key overflow blocks 15 and 16 are generated, the number of entries in the new location table AALN is the sum of the number of entries in the alternate-key location table AALC and the number of overflow blocks 15 and 16. In order to contrast the location table in use at the time of reorganization with AALN, it shall be referred to as AALC. Since the number of entries may increase during reorganization and the number of alternate-key entries will increase with the addition of records after reorganization, a number greater than that necessary should be reserved.

However, since, as described below, the number of alternate-key blocks required may conversely decrease with the elimination of fragmentation and the number of alternate-key blocks required may vary with the reservation of suitable initial storage rates, the most preferable method is to calculate this figure from the volume of entries stored and the suitable initial storage rate.

A contiguous region sufficient to the volume of the new alternate-key location table AALN is secured in the primary system.

Once the region is secured, the entries are sequentially transferred from the current alternate-key location table AALC to the new alternate-key location table AALN, which procedure is performed as described below.

Reorganization Pointers

First, reorganization pointers are created. These indicate through which entry in the alternate-key location tables transfer has been completed, and so two are provided: a current reorganization pointer RPAALC for the current alternate-key location table AALC and a new reorganization pointer RPAALN for the new alternate-key location table AALN. The initial value of the current reorganization pointer RPAALC is the first address in the current alternate-key location table AALC, and the initial value of the new reorganization pointer RPAALN is the first address in the new alternate-key location table AALN.

Next, the first entry of the current reorganization pointer RPAALC and the alternate-key block 17 and alternate-key overflow blocks managed by that entry are placed under exclusion. Overflow blocks do not exist in this case, and so only the alternate-key block 17 (alternate-key block number 0) is affected.

Next, the first entry (block number 0) is transferred (S51 in FIG. 11) from the current alternate-key location table AALC to the new alternate-key location table AALN. When doing so, a check is made whether any overflow blocks are linked to the block managed by the first entry. If not, the addresses of the current reorganization pointer RPAALC and the new reorganization pointer RPAALN are modified to point to the second entry.

In FIG. 11, there are no alternate-key overflow blocks linked and so the current reorganization pointer RPAALC is modified to point to the second entry in the current alternate-key location table AALC. The new reorganization pointer RPAALN is likewise modified to point to the second entry in the new alternate-key location table AALN. Next, if the first entry had been placed under exclusion, exclusion is now lifted on it.

Next, the second entry in the current alternate-key location table AALC is placed under exclusion. Since two alternate-key overflow blocks 15 and 16 are linked to the second entry, the alternate key block 17 and the alternate-key overflow blocks are placed under exclusion.

Next, the second entry (block number 1) is processed. Two alternate-key overflow blocks are linked to the alternate-key block managed by the second entry in AALC. The following applies when alternate-key overflow blocks are linked. The second entry in the alternate-key location table AALC is transferred to the second entry in the new alternate-key location table AALN, and the low value and high value of the alternate-key value of the entry stored in that block are modified.

This is because when the current alternate-key location table AALC entry holds the low value and high value of the alternate-key value of the alternate-key block 17, the low value and high value of the alternate-key value of the alternate-key location table AALC will not match the low value and high value of the alternate-key value of the entry stored in the alternate-key block 17 (alternate-key block number 1) is they are merely transferred and is done in order to avoid this.

Assume a low value of 0000 and a high value of 0299 for the alternate-key value of the second entry in the new alternate-key location table AALN. Further assume a low value of 0000 and a high value 0099 for the alternate-key value of the entry stored in the alternate-key block 17 (alternate-key block number 1), a low value of 0100 and a high value of 0199 for the alternate-key value of the entry stored in the first alternate-key overflow block 15, and a low value of 0200 and a high value of 0299 for the alternate-key value of the entry stored in the second alternate-key overflow block 16.

The alternate-key value of the second entry in the new alternate-key location table AALN will have a low value of 0000 and a high value of 0099 (S52 in FIG. 11). The address of the alternate-key block maintained in the entry in the new alternate-key location table AALN will take the same value as the address of the alternate-key block 17 (alternate-key block number 1).

Next, the third entry in the new alternate-key location table AALN takes (S53 in FIG. 11) the address and the low value of 0100 and the high value of 0199 of the alternate-key value of the first alternate-key overflow block 15. The fourth entry in the new alternate-key location table takes (S54 in FIG. 11) the address of the second alternate-key overflow block 16 and the low value of 0200 and the high value of 0299 of the alternate-key value.

Next, the alternate-key overflow block address in the alternate-key block 17 (alternate-key block number 1) is reset and the alternate-key overflow block 15 delinked (S55 in FIG. 11). Next, the alternate-key overflow block address in alternate-key overflow block 15 is reset and the second alternate-key overflow block 16 delinked (S56 in FIG. 11).

Once reorganization is completed for a given entry in the new alternate-key location table AALN, exclusion is lifted on the block managed by that entry.

This allows reorganization to be performed without rewriting alternate-key overflow blocks to a separate location. Thereafter, the third entry (alternate-key block number 2) and the fourth entry (alternate-key block number 3) in the current alternate-key location table AALC are likewise reorganized (S60 in FIG. 11), and reorganization thus proceeds sequentially.

FIG. 11 depicts reorganization completed through the fourth entry in the current alternate-key location table AALC.

Next, the value of the new reorganization pointer RPAALN is rewritten (S61 in FIG. 11) to point to the beginning of the fourth entry in the new alternate-key location table AALN.

Reorganization of Alternate-Key Tables: Exceptions to Elimination of Overflow

The elimination of alternate-key overflow blocks has been discussed; the discussion below concerns instances in which overflow cannot be eliminated. Instances in which overflow cannot be eliminated are those in which many entries have the same alternate key and these cannot be stored in a single block. Entries having the same alternate key are not stored in multiple alternate-key blocks, but are always stored in a single alternate-key block and one or more alternate-key overflow blocks or in multiple alternate-key overflow blocks. Storage in multiple alternate-key overflow blocks occurs when entries are already stored in an alternate-key block and the alternate-key overflow block immediately subsequent and storage of the entries with the identical alternate key commences midway through the alternate-key overflow block.

Where entries with an identical alternate key are stored, maintaining that information in the alternate-key block and the alternate-key overflow blocks facilitates understanding. Information specifying whether it is the beginning, the middle or the end of the entries with the identical alternate key is maintained. Otherwise, it does not differ from the storage of regular entries.

In such a case, elimination may be performed on those sections of alternate-key overflow blocks that have regular entries, but since alternate-key blocks and alternate-key overflow blocks storing entries with an identical alternate key are necessarily of a structure entailing alternate-key overflow blocks, these alternate-key overflow blocks may not be eliminated. In such cases, information relating to the entries with the identical alternate key should be output as post-reorganization information.

Reorganization of Alternate-Key Tables of the Second Format: Elimination of Fragmentation The description foregoing concerns methods of eliminating alternate-key overflow blocks; like overflow, fragmentation presents significant problems in terms of efficiency.

Figure 12:
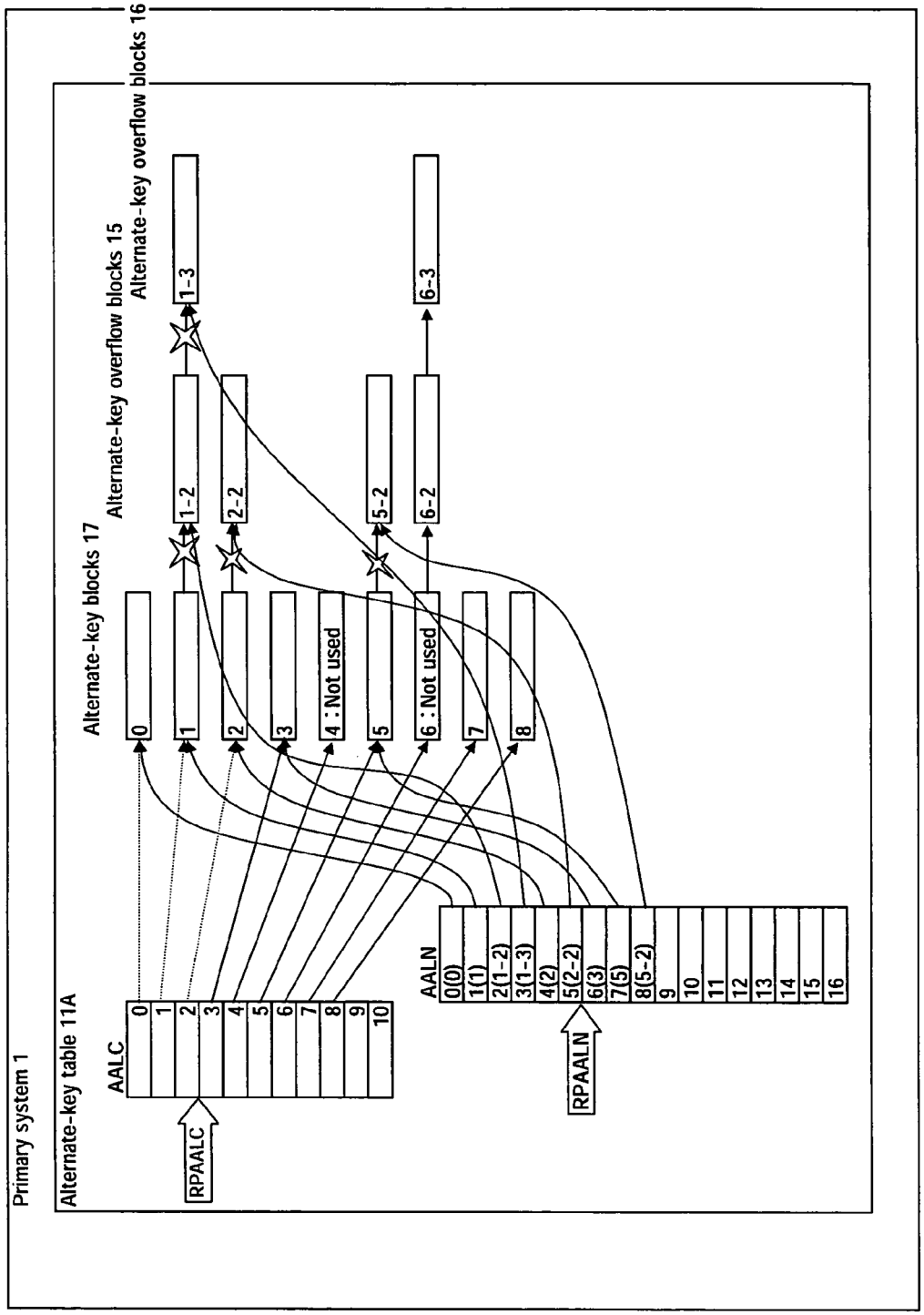
FIG. 12 illustrates the elimination of fragmentation in the database reorganization system that is an embodiment of the invention as it concerns alternate keys.

Fragmentation may be eliminated by means of operations similar to those for reorganization to eliminate alternate-key overflow blocks. The discussion makes reference to FIG. 12. FIG. 12 here illustrates a method for the elimination of fragmentation in the database reorganization system that is a third preferred embodiment of the present invention.

Alternate-key location tables are again used in FIG. 12, a new alternate-key location table AALN in addition to a current alternate-key location table AALC.

In FIG. 12, entries are moderately stored in alternate-key blocks 0, 1, 1-2, 1-3, 2 and 2-2 in alternate-key blocks 17, and the elimination of alternate-key overflow blocks has been completed according to the method described above.

The block numbers used in the description below are the block numbers in the current alternate-key location table AALC.

Where numbers from new alternate-key location table AALN are used, it is so stated.

In the alternate-key blocks 17, entries are stored in alternate-key block number 3 up to 30% of its storage capacity. Entries are stored in alternate-key block number 4 up to 40% of its storage capacity. Entries are stored in alternate-key block number 5 up to 70% of its storage capacity, in alternate-key block number 5-2 of the alternate-key overflow blocks 15 up to 60% of its storage capacity and in alternate-key block number 6 of the alternate-key blocks 17 up to 70% of its storage capacity. The utilization rate of each block after reorganization is 90%. This is to prevent the generation of alternate-key overflow blocks immediately upon the insertion of records after reorganization.

The reorganization system that is a preferred embodiment of the present invention as it concerns alternate keys is about to perform the reorganization of alternate-key block number 3 of the alternate key blocks 17 that the new reorganization pointer RPAALN of the new alternate-key location table is pointing to. However, its storage rate (the volume of records stored in that block as a proportion of the capacity of the block) is 30%, which does not satisfy the suitable initial storage rate. Therefore, attention turns to the next alternate-key block number 4 of the alternate-key blocks 17. Since the storage rate of this alternate-key block number 4 is 40%, adding the two alternate-key blocks together still falls short of the suitable initial storage rate (90%). Attention then turns to alternate-key block number 5 of the alternate-key blocks 17, which has a storage rate of 70% and would thus exceed the suitable initial storage rate of 90%. Leaving the records stored in block number 3 of the alternate-key blocks 17 untouched, the records in alternate-key block number 4 of the alternate-key blocks 17 are moved to alternate-key block number 3 of the alternate-key blocks 17. This gives alternate-key block number 3 of the alternate-key blocks 17 a storage rate of 70%. In order to achieve the suitable initial storage rate, the first 20% of the entries stored in alternate-key block number 5 of the alternate-key blocks 17 is moved to alternate-key block number 3 of the alternate-key blocks 17, and the remaining 50% of the entries is shifted to the beginning of that block (to the left in the drawing). Alternate-key block number 3 of the alternate-key blocks 17 is now done, and so the address of alternate-key block number 6 of the alternate-key blocks 17 of the new reorganization pointer RPAALN is rewritten to alternate-key block number 3 of the alternate-key blocks 17. The new reorganization pointer RPAALN is moved to the beginning of alternate-key block number 7 of the alternate-key blocks 17 in the new alternate-key location table AALN. At this point, alternate-key block number 4 of the alternate-key blocks 17 becomes an unused alternate-key block.

Next, operations are performed on alternate-key block number 5 of the alternate-key blocks 17, and alternate-key block number 5 of the alternate-key blocks 17 has a storage rate resulting from reorganization of 50%. Since alternate-key block number 5-2 of the alternate-key overflow blocks 15 has a storage rate of 60%, the first 30% of the entries in alternate-key block number 5-2 is moved to alternate-key block number 5 of the alternate-key blocks 17, and the remaining entries in alternate-key block number 5-2 are at the same time shifted to the beginning of that block (to the left in the drawing). The link between alternate-key block number 5 of the alternate-key blocks 17 and alternate-key block number 5-2 of the alternate-key overflow blocks 15 is then cut the link. This sets the alternate-key overflow block address of alternate-key block number 5 of the alternate-key blocks 17 to a specific value (for example, zero). Alternate-key block number 5 of the alternate-key blocks 17 is now done, and so the address of alternate-key block number 7 of the alternate-key blocks 17 in the new alternate-key location table AALN is rewritten to alternate-key block number 5 of the alternate-key blocks 17.

Next, since the alternate-key block 5-2 of the alternate-key overflow blocks 15 has a storage rate of 30% and the next alternate-key block number 6 of the alternate-key blocks 17 has a storage rate of 60%, all of the entries in alternate-key block number 6 of the alternate-key blocks 17 are moved to alternate-key block number 5-2 of the alternate-key blocks 17. Alternate-key block number 5-2 of the alternate-key blocks 17 is now done, and so the address of alternate-key number 8 of the alternate-key blocks 17 in the new alternate-key location table AALN is rewritten to alternate-key block number 5-2 of the alternate-key blocks 17. The new reorganization pointer RPAALN is moved to the beginning of alternate-key block number 9 in the new alternate-key location table AALN. At this point, alternate-key block number 6 of the alternate-key blocks 17 becomes an unused alternate-key block.

Reorganization of Alternate-Key Tables: Reservation of Suitable Initial Storage Rates The reservation of a suitable initial storage rate may require the addition of alternate-key blocks, the converse of handling fragmentation. What this means is that, for example, given a space utilization rate of 100% in all alternate-key blocks, achieving a suitable initial storage rate of 90% entails the addition of one alternate-key block to the nine alternate-key blocks that may exist at the point of reorganization and storing entries in each of the ten alternate-key blocks at a storage rate of 90%.

It may not be possible in some cases, for reasons of alternate-key block and entry size, to strictly implement reservation of suitable storage rates, and since it may be necessary to subject considerably large numbers of alternate-key blocks to reorganization at particular points in time, the requisite exclusion range may expand accordingly and have an adverse effect on system operation.

In order to prevent such circumstances arising, it is preferable in operational terms to use multiple values, such as 85% to 90%, for the suitable initial storage rate. In this case, the suitable initial storage rate need only fall within the range of 85% to 90%.

When reserving suitable initial storage rates, entries may be rewritten from their original alternate-key blocks to other alternate-key blocks.

Reorganization of Alternate-Key Tables: Reorganization in Practice and Prevention of Deadlock As the execution of reorganization in practice consists of at once performing the elimination of alternate-key overflow blocks, the elimination of fragmentation and the reservation of suitable initial storage rates, it is a combination of these three.

In principle, a reorganization system may be implemented as described above, but as alternate-key blocks are sequentially read and alternate-key blocks created with suitable initial storage rates, the risk of deadlock increases since the exclusion range cannot be determined from the outset and exclusion extends sequentially. Effective ways of preventing deadlock are as follows.

The first method of preventing deadlock is to read the alternate-key blocks in sequence without placing them under exclusion, find their record storage rates and calculate the appropriate size for combinations of multiple blocks in order to determine the exclusion range.

Adding Elements to Location Table Entries

The second method of preventing deadlock is to provide alternate-key location table entries capable of maintaining, in addition to block numbers and block addresses, either or both of the low value and high value of the alternate key values of records stored in blocks and, additionally, the storage rates of records or the number of bytes occupied by records in blocks. This eliminates the need to read blocks, as described for the first method above, and allows that information to be gained simply by reading the alternate-key location table. However, since the need to rewrite the alternate-key location table then arises with the insertion and deletion of records, a choice should be made between the first and the second method of preventing deadlock described above depending on the state of record generation.

Thus, the reorganization range is determined upon finding the storage rates within alternate-key blocks and alternate-key overflow blocks, and the alternate-key location table entries within that range, the alternate-key blocks that those entries point to and the alternate-key overflow blocks linked to those alternate-key blocks are placed under exclusion.

Then the number of alternate-key blocks and alternate-key overflow blocks subject to reorganization and their storage capacity are found and the actual volume of the entries requiring storage is found, and then it is assessed whether the number of alternate-key blocks required is equal to, greater than or less than the sum of the current number of alternate-key blocks and alternate-key overflow blocks. Then applying the logic described above for the elimination of alternate-key overflow blocks, the elimination of fragmentation and the reservation of suitable initial storage rates, the alternate-key blocks are reorganized and entries created in the new alternate-key location table.

In this case, the reorganization pointers move at once for the amount of blocks subject to reorganization.

Reorganization is thus performed on from one to several tens of alternate-key location table entries and alternate-key blocks in a single pass, but this reorganization does not interfere with regular data processing since it appears to be treated as a regular data processing transaction.

And by performing successive passes of this reorganization on the alternate-key location table and the alternate-key blocks, reorganization of the whole is completed.

Reorganization of Alternate-Key Tables: Completion of Reorganization

Description follows of methods of recognizing the completion of reorganization of an alternate-key location table. An alternate-key final pointer is provided to the current alternate-key location table AALC to indicate the final position used by that alternate-key location table AALC. The final pointer is provided for the following purpose. The alternate-key location table AALC is reserved in a contiguous area. It is possible to provide an additional alternate-key location table in an area discontiguous with the first alternate-key location table when alternate-key location table entries are insufficient and convert addresses to perform binary searches as though their areas were contiguous, but this is not recommended because the load of address conversion increases with large numbers of discontiguous areas. Therefore, a fully adequate area for alternate-key location tables is reserved from the outset and the address of the next entry after the entries used is pointed to in order to distinguish used entries from unused entries.

Thus, the provision of the alternate-key final pointer allows the retrieval of records by means of alternate keys even if unused entries exist in the current alternate-key location table AALC by means of executing a binary search between the first address and the alternate-key final pointer in the current alternate-key location table AALC.

Methods of Detecting the Completion of Reorganization

The alternate-key final pointer is used as an indicator. Reorganization of the alternate-key location table AALC and the alternate-key blocks 17 is completed when reorganization runs and the address pointed to by the current reorganization pointer RPAALC matches the address pointed to by the alternate-key final pointer. Alternate-key overflow blocks linked to the alternate-key block 17 that the final entry points to do not represent a problem because the current reorganization pointer RPAALC does not move until the reorganization of these alternate-key overflow blocks is complete.

Reorganization of Alternate-Key Tables: Reutilization of Unused Blocks

A method of reorganization has thus been described that addresses fragmentation, but in FIG. 12 alternate-key block 4 of the alternate-key blocks 17 and alternate-key block 6 of the alternate-key blocks 17 of the current alternate-key location table AALC are left unused. Left as it is, this may result in failing to eliminate overall fragmentation while eliminating fragmentation within alternate-key blocks. The following approach is adopted in order to prevent this outcome.

Unused Block Allocation Table, Start-Position Pointer and End-Position Pointer

Figure 13:
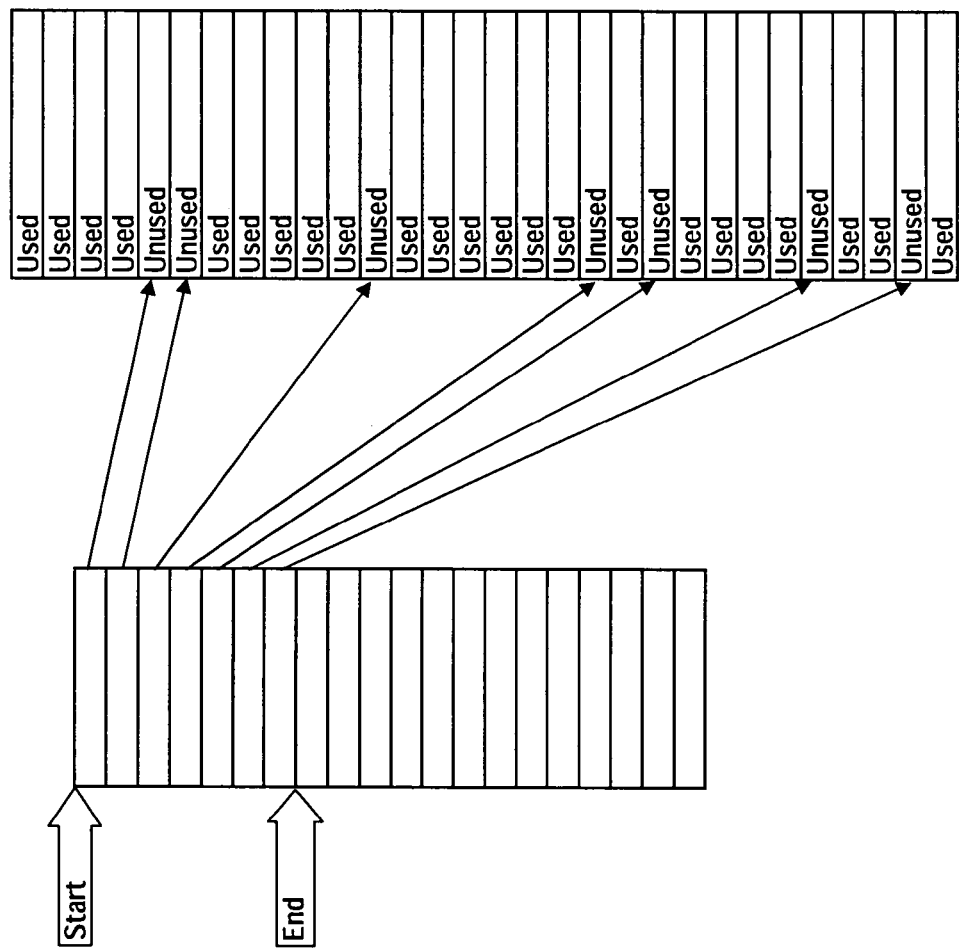
FIG. 13 illustrates the elimination of overall fragmentation in the database reorganization system that is an embodiment of the invention as it concerns alternate keys.

FIG. 13 assists in the description of a method for eliminating overall fragmentation in the database reorganization system that is the third preferred embodiment of the invention as it concerns alternate keys.

An unused alternate-key block allocation table UABAT is used in the preferred embodiment of FIG. 13. The unused alternate-key block allocation table UABAT is a table of the format shown in FIG. 13, and its purpose is to store the addresses of unused alternate-key blocks. Two pointers are also used, a start-position pointer NAAABPS to indicate the start position and an end-position pointer NAAABPE to indicate the end position in the unused alternate-key block allocation table UABAT. FIG. 13 represents a state in which seven unused alternate-key blocks have appeared where none at all previously existed.

In their initial states, both the start-position pointer NAAABPS and the end-position pointer NAAABPE point to the beginning of the unused alternate-key block allocation table UABAT. When an unused alternate-key block (one labeled "unused" in FIG. 13) appears, the address of the unused alternate-key block is registered in the entry that the end-position pointer NAAABPE of the unused alternate-key block allocation table UABAT is pointing to and the end-position pointer NAAABPE is rewritten to point to the next entry in the unused alternate-key block allocation table UABAT. FIG. 13 illustrates the state after the sequential appearance of seven unused alternate-key blocks. Here, the end-position pointer NAAABPE is pointing, as shown in FIG. 13, to the eighth entry in the unused alternate-key block allocation table.

Figure 14:
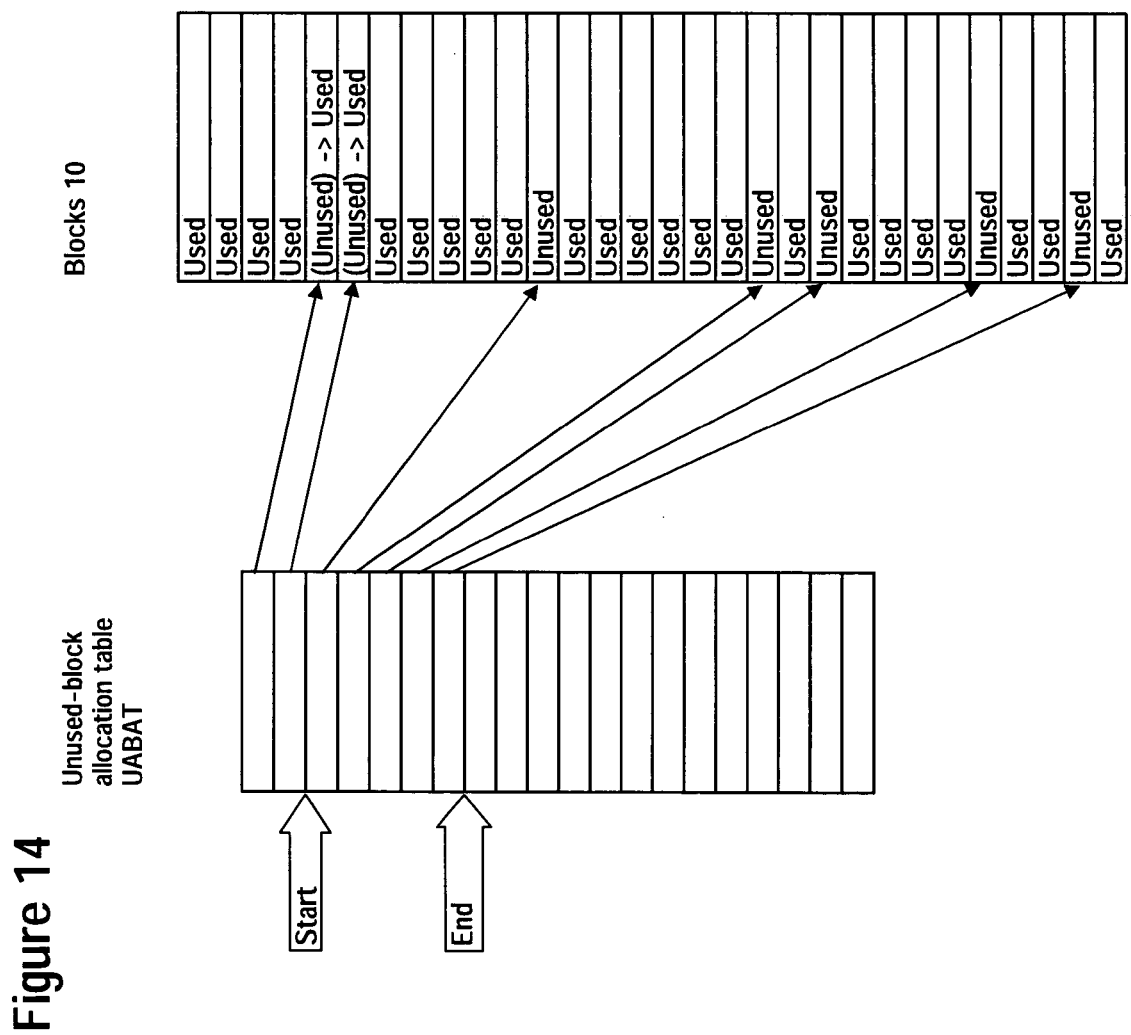
FIG. 14 illustrates the reutilization of blocks in the database reorganization system that is an embodiment of the invention as it concerns alternate keys.

FIG. 14 illustrates the reutilization of blocks in the database reorganization system that is an embodiment of the invention as it concerns alternate keys.

A description follows, with reference to FIG. 14, of a method of reutilization. In the preferred embodiment of the invention as it concerns alternate keys, when the need arises to acquire a new alternate-key block or alternate-key overflow block, rather than acquiring the alternate-key block from an unused area, the unused alternate-key block allocation table UABAT is referenced and, if an unused alternate-key block exists, alternate-key blocks registered in the unused alternate-key block allocation table UABAT are prioritized for use. A method of utilizing unused alternate-key blocks is to use the alternate-key block in the entry that the start-position pointer NAAABPS is pointing to. The entries contains the addresses of unused alternate-key blocks, so when an alternate-key block is added, the address is written to the alternate-key location table, and when an alternate-key overflow block is added, the address is written to the pointer of the alternate-key block or alternate-key overflow block that manages that alternate-key block. The content of the start-position pointer NAAABPS is then rewritten to point to the next entry in the unused alternate-key block allocation table.

FIG. 14 illustrates a state immediately following two executions of such rewriting and the utilization of two unused blocks.

The unused alternate-key block allocation table UABAT may be used in cyclical fashion. When an unused alternate-key block appears, the position of the end-position pointer NAAABPE moves towards the end of the unused alternate-key block allocation table UABAT, and when an unused alternate-key block is utilized, the position of the start-position pointer NAAABPS likewise slides towards the end of the unused alternate-key block allocation table UABAT, and so the one table may be used cyclically as long as the end-position pointer NAAABPE does not overtake the start-position pointer NAAABPS. In other words, when the end-position pointer NAAABPE reaches the final position of the unused alternate-key block allocation table UABAT, it is returned to the beginning of the unused alternate-key block allocation table UABAT again and the unused alternate-key block allocation table UABAT may thus be reused.

Reorganization of Alternate-Key Tables: Database Access During Reorganization

Next, a description follows, referencing FIG. 12, of data retrieval, reading and writing during reorganization such that it is possible to retrieve, read and write data while performing reorganization.

Retrieval with alternate key values is performed by means of binary search using the current alternate-key location table AALC. The target key value (the key value to be retrieved) is assessed as less than or greater than the reorganization pointer RPAALC. Since entries in the current alternate-key location table AALC are listed in the order of their primary keys, this may be achieved by comparing the key value of the entry that the current reorganization pointer RPAALC is pointing to and the target key value.

If the target key value is less than the low value of the alternate-key key value in the entry that the current reorganization pointer RPAALC is pointing to, then the target entry exists upwards from (in a smaller address than) the current reorganization pointer RPAALC. In this case the new alternate-key location table AALN is used to perform a binary search between the first address in the new alternate-key location table AALN and the new reorganization pointer RPAALN. As the result of the binary search, the records in the alternate-key block that the target entry is pointing to are examined and it is determined whether the target record is present or not.

If the target key value is equal to or greater than the low value of the alternate-key key value of the entry that the current reorganization pointer RPAALC is pointing to, the target entry exists downwards from the current reorganization pointer RPAALC (the entry RPAALC is pointing to or in a larger address). In this case the current alternate-key location table AALC is used to perform a binary search on the entries between the current reorganization pointer RPAALC and the final pointer in the current alternate-key location table AALC.

Since the target entry may thus be definitively retrieved, the record holding the target alternate key value may be retrieved by searching inside the block that that entry is pointing to.

The description foregoing is with regard to reorganization underway of alternate-key tables. Since multiple tables are not reorganized at the same time, reorganization will not be running on a location table while reorganization is running on an alternate-key table. It will therefore not be the case that two location tables, one current and one new, exist, nor will it be necessary to determine which to use, as described for the reorganization of a location table and blocks.

Additionally, an alternate-key block containing the entry that holds the target alternate-key key value cannot be accessed while positively under reorganization for reason of exclusion and is queued for release from exclusion, but this is no different from the update, insertion or deletion of records in normal access. In other words, requests to excluded alternate-key blocks are queued for their release from exclusion and may be processed once reorganization of that alternate-key block is complete and it is released from exclusion.

The description above concerns the retrieval of records but may also be applied to the updating and deletion of records by means of alternate keys. Insertions of records are performed by means of primary keys and so are not pertinent here. Care is required when executing a record deletion because alternate keys are non-unique. However, this may be addressed as described below.

Reorganization of Alternate-Key Tables: Handling Advances in Reorganization During Retrieval Operations FIG. 15 illustrates operation, in the database reorganization system that is an embodiment of the present invention as it concerns alternate keys, when reorganization advances during a retrieval operation using an alternate key and the position of the current reorganization pointer at the beginning of the retrieval and the position of the current reorganization pointer at the end of the retrieval are different.

It has been explained how it is possible to call entries during reorganization by using the reorganization pointer to make comparisons with the target key value and deciding whether to use the current alternate-key location table AALC or the new alternate-key location table AALN.

Figure 15:
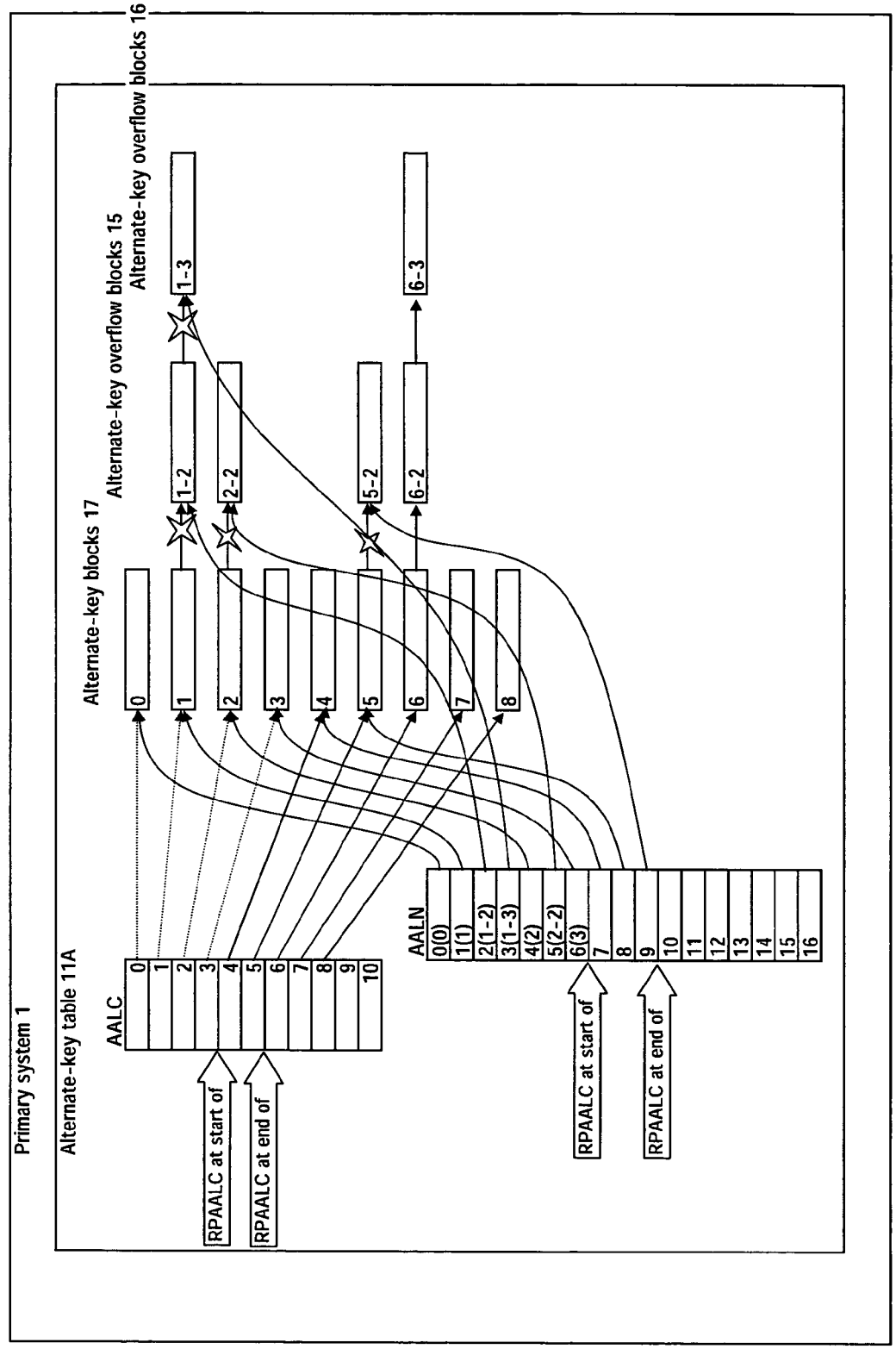
FIG. 15 illustrates operation when reorganization has advanced while an alternate-key search is ongoing and when the retrieval-initiation position of the current reorganization pointer and the retrieval-completion position of the current reorganization pointer are different in the database reorganization system that is an embodiment of the invention as it concerns alternate keys.

However, as shown in FIG. 15, if reorganization advances during a retrieval by means of an alternate key using the alternate-key location tables AALC and AALN, the position of the current reorganization pointer RPAALC at the end of the retrieval is different from the position of the current reorganization pointer RPAALC at the start of the retrieval and the alternate-key blocks in that range had been subject to the search, there is a possibility that entries that actually exist may no longer exist because alternate-key overflow blocks are already delinked. In FIG. 15 an overflow block 5-2 of 15 has been delinked from a primary block 5. Left as is, this leads to unstable operation and unuseability.

Retrievals may be performed without problem by implementing the following measures. the target key value and reorganization pointer are used to determine whether the location table subjected to the search is the current alternate-key location table AALC or the new alternate-key location table AALN. If the alternate-key location table used is the new alternate-key location table AALN, no problem arises even if the new reorganization pointer RPAALN has advanced from when the search started. Problems arise when it is the current alternate-key location table AALC that is used. When the current alternate-key location table AALC is searched and the current reorganization pointer RPAALC does not move, no problem arises. On the other hand, when the current alternate-key location table AALC is searched and the current reorganization pointer RPAALN moves, problems will arise unless measures are implemented.

Access Methods when Reorganization Advances

If reorganization is underway, the value of the current reorganization pointer RPAALC (the address of the next entry in the alternate-key location table to be reorganized) and the value of the new reorganization pointer RPAALN are saved before initiating retrieval. These are S-RPAALC and S-RPAALN. At the point the search in the current alternate-key location table AALC is completed, the value of the current reorganization pointer RPAALC at that point (which is termed "E-RPAALC") is compared with the value of S-RPAALC. If these values are different, this means that reorganization advanced during the search. In this case, it is determined where the block that is the object of retrieval is. If the determination finds that the block is between S-RPAALC and E-RPAALC, it is possible, as discussed above, that the entry cannot be retrieved.

In this case, the new alternate-key location table AALN is used to perform a binary search between S-RPAALN and E-RPAALN. Here, if the entry can be detected, the entry is reckoned to exist, and if it cannot be detected, the entry is reckoned not to exist. This avoids the phenomenon of the non-existence of an entry that does exist.

It is seen that, as described above, entries may be read even during reorganization.

Reorganization of Alternate-Key Tables: Entry Insertion

The insertion of an entry occasioned by the insertion of a record, as discussed above with respect to calling an entry, requires, in order to determine the alternate-key block into which the entry will be inserted, performing a binary search to find the alternate-key block and then inserting the entry into that alternate-key block, which consists of the same operations as calling an entry.

When an alternate key value in a record is modified, the location in which the alternate-key entry is stored must change. The reason is that entries are stored in alternate-key blocks in the order of their alternate key values and if an entry exists outside that range, it cannot be retrieved with the alternate-key location table. Therefore, when an alternate-key value is modified, the current entry is deleted and a new entry is then inserted in the alternate-key block identified on the basis of the alternate-key value as that where it should be stored. This is a method that has been in general use in conventional databases.

Otherwise, alternate-key blocks may be found and written with the same methods as are used for calling entries.

Suspending and Resuming Reorganization

It is possible, as described above, to retrieve (read), update, insert, add and delete records by means of alternate key values even while the alternate-key location table is under reorganization. In short, it goes without saying that records may be accessed however far reorganization has advanced or, in other words, from any entry in the alternate-key location table.

Suspending and Resuming Reorganization

It follows that record access may be executed without problem even if reorganization is temporarily suspended. Suspension is, of course, effected after reorganization has completed on some given selection of alternate-key location tables and alternate-key blocks.

In the database reorganization system that is a preferred embodiment of the present invention as it concerns alternate keys, reorganization may be resumed with the entry in the current alternate-key location table AALC and the new alternate-key location table AALN indicated by the current reorganization pointer RPAALC and the new reorganization pointer RPAALN at the point reorganization was suspended.

Since these functions permit reorganization to be suspended and resources allocated to data processing when the load on the primary system increases and then resumed when the load of data processing falls, there is no need to make advance forecasts of the load on the primary system and operating conditions and reserve a fixed period of time for reorganization in advance.

It has been recited that the following three kinds of entries exist in alternate-key tables. The three kinds are one that maintains block numbers, one that maintains block addresses and one that does not maintain either block numbers or addresses. It has also been recited that these have the following characteristics.

Entries that do not maintain either block numbers or addresses allow reduction of the load and time required for reorganization, but increase the load of retrieval because of the need to search location tables after retrieving the alternate-key entry in an alternate-key search.

Although entries that maintain block numbers or block addresses place a large load on reorganization due to the need to modify information when a number or address changes during reorganization, they do result in greater efficiency of retrieval using alternate keys.

Whichever format of alternate-key entry is selected for the creation and use of alternate-key tables, the conditions under which they are used may change from the original intention. Reorganization may be necessary more frequently than expected, for example, or conversely, the frequency of reorganization may fall markedly below that originally planned.

Thus, it is convenient to have the capability of changing the format of entries when reorganizing alternate-key tables and switching between improved speed of reorganization at the expense of less efficient retrieval, addition, updating and deletion on the one hand and enhanced efficiency of retrieval, addition, updating and deletion at the expense of slower reorganization on the other.

This is made possible by changing the format of alternate-key entries when reorganizing alternate-key tables as follows.

When block numbers or addresses are added to alternate-key entries of the format that does not maintain either block numbers or block addresses, the volume of data per alternate-key block increases by the number of alternate-key entries already present in the alternate-key block and the volume of block numbers or block addresses.

When performing the elimination of overflow, the elimination of fragmentation and the reservation of suitable initial storage rates on one or multiple alternate-key blocks in one pass, alternate-key blocks are reserved so that the increased amount of data may be written. Block numbers or block addresses are added to the entries in the alternate-key blocks affected and the entry data rewritten.

For each alternate-key entry affected, the location table is searched on the basis of the primary key value of that entry and the block number or block address that is found is appended to the entry in the new alternate-key table.

Conversely, when block numbers or block addresses are deleted, the volume of data per alternate-key block decreases by the number of alternate-key entries already existing in the alternate-key block and the volume of block numbers or block addresses.

When performing the elimination of overflow, the elimination of fragmentation and the reservation of suitable initial storage rates on one or multiple alternate-key blocks in one pass, alternate-key blocks are reserved taking into account the decrease in the volume of data. Block numbers or block addresses are deleted from the entries in the alternate-key blocks affected and the entry data rewritten. This takes less time than when appending data because only the deletion of data is involved.

Reorganization Rewriting Blocks

The above description concerns reorganization of alternate-key location tables, alternate-key blocks and alternate-key overflow blocks. This implementation of reorganization has the benefits of holding the rewriting of alternate-key blocks and alternate-key overflow blocks to a minimum and abbreviating reorganization times by rewriting the current alternate-key location table to a new alternate-key location table.

However, alternate-key blocks must be rewritten in order to change the size of alternate-key blocks or in order to change the alternate-key block storage medium. Application of the system described above allows ready execution of reorganization while thus rewriting alternate-key blocks. The details are entirely likewise to the methods described for the present invention as it concerns primary keys. FIG. 19 is an illustration for the purpose of description with respect to location tables, blocks and overflow blocks, but the logic applies in entirely like fashion here.

Entirely likewise to the database access methods described for the present invention as it concerns primary keys, if the target key value is less than the reorganization pointer, the new database is accessed, and if the target key value is greater than the reorganization pointer, the current database is accessed. The ability to suspend and resume reorganization is also entirely likewise to the present invention as it concerns primary keys.

The current and new databases are depicted here as present on the same machine, but they may also be present on different machines.

Exclusion Methods and Exclusion Procedures

The description following concerns exclusion methods and exclusion procedures. "Exclusion procedures" refers to procedures for implementing exclusion, for which are proposed methods that place a low load on the system. "Exclusion methods" refers primarily to the sequence of exclusion. As differing sequences of exclusion can be a cause of deadlock, it is important to ensure a uniform exclusion sequence in a system. The description shows that the exclusion sequences in these procedures and in this system are the same.

Exclusion Procedures

The exclusion procedures are implemented by directly writing an excluded state to each of location tables, blocks (including overflow blocks), alternate-key location tables and alternate-key blocks (including alternate-key overflow blocks).

It is standard practice in information processing that when transactions are generated, they are placed in a queue in the order of their generation and processed in that order. It is also common for access requests within transactions to be expressed in the form of request blocks. The execution of a transaction results in access to various types of data. Even when they constitute access to the same type of data, there are differences between retrieval using location tables and retrieval using alternate-key tables.

Such information as the origin identification of the processing request, the transaction number, the data type, the processing request identification (read, update, addition, insertion, deletion), the read key, the read key value and the write record is stored in the request block either as is or in a form indicating an address where that information is held.

Two fields are added to these request blocks. One is an exclusion table address, and the other is an exclusion table pointer. The exclusion table address refers to a table storing exclusion information. In addition to holding addresses affected by exclusion, the entries in this table hold address identification flags, which are described below. The entries are of a size capable of holding the addresses. The tables have a size (their number of entries) of, for example, 100, and when this becomes insufficient, another 100 are added and the final address in the first table holds the address of the next exclusion table. Address identification flags are provided in order to identify whether an address is one affected by exclusion or that of the next table.

When an exclusive access request occurs in a request block, the addresses affected by exclusion are placed in the exclusion table. In the case of a location table, this is the address of the entry affected, in the case of a block, the address of the block affected, in the case of an alternate-key location table, the address of the entry affected, and in the case of an alternate-key block or an alternate-key overflow block the address of the block affected.

Figure 16:
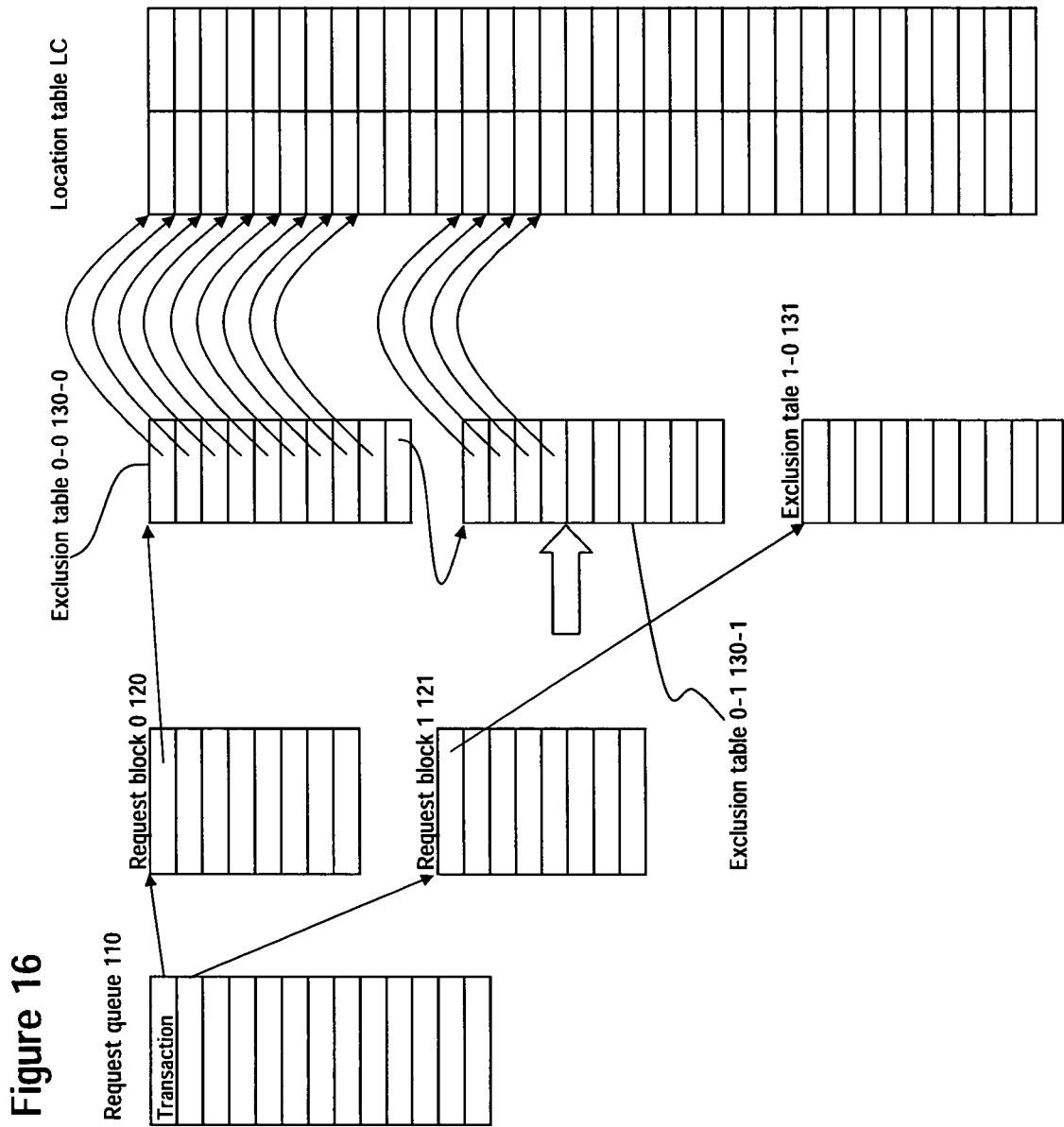
FIG. 16 illustrates exclusion of a location table in the database reorganization system that is an embodiment of the invention as it concerns either primary keys or alternate keys.

FIG. 16 illustrates the exclusion of a location table in the database reorganization systems that are the first and third preferred embodiments of the present invention. FIG. 16 depicts a request queue 110, request blocks 120 and 121, exclusion tables 130-0, 130-1 and 131-0, and a location table LC.

Entry 0 in the exclusion table 130-0 points to entry 0 in the location table LC. This does not mean that entry 0 in an exclusion table 50-0 must always point to entry 0 in the location table LC, but merely represents their relationship of correspondence. A field is added so that the location table LC is able to hold the addresses of entries in the exclusion tables 130-0, 130-1 and 131-0. The location table LC entry 0 points to entry 0 in the exclusion table 130-0.

Whether that entry in the location table LC is placed under exclusion may be identified by whether an address is in the exclusion-table entry address field of that entry. If there is an address in that field, that entry is placed under exclusion and so may not be accessed from other requests.

Location table LC entry addresses are held in the exclusion tables 130-0, 130-1 and 131-0 both in order to ensure the lifting of exclusion when a transaction has completed and in order to quickly effect the lifting of exclusion should the system suffer abnormality and cease operation entirely.

While entries in the location table LC contain identification of their exclusion status, without the exclusion tables 130-0, 130-1 and 131-0, it would be necessary, after an operational stoppage, to look through all the entries in the location table LC and lift exclusion on those placed under exclusion. On the other hand, where entries in an exclusion tables 130-0, 130-1 or 131-0 contain addresses in the location table LC, it is sufficient to look at the exclusion table 130-0, 130-1 or 131-0 and lift exclusion on the relevant entries in the location table LC.

An exclusion table pointer is used to indicate through which entry the exclusion tables 130-0, 130-1 and 131-0 are used. FIG. 16 depicts a state in which an additional exclusion table 130-1 has been reserved and is used midway through. The location of the additional exclusion table 130-1 is pointed to from the first exclusion table 130-0.

Exclusion Methods

The sequence of exclusion is intimately related to the occurrence of deadlock. If the sequence of exclusion varies with the type of access, the probability of deadlock increases and so exclusion must be effected in an identical sequence regardless of the type of access. Since retrieval-type access does not require exclusion, it is here an exception. The discussion following concerns update-type (addition, insertion, update and deletion) access.

Exclusion is effected in the sequence of location tables, then blocks, (then alternate-key location tables) and then alternate-key blocks. Alternate-key location tables are placed in parentheses because some methods uses them and some do not, but where alternate-key location tables are used, exclusion must be performed on alternate-key location tables. An object of exclusion is given here as, for example, location tables, but it is only the entries in a location table, not the entire location, that are placed under exclusion.

When retrieving a target entry by means of binary search performed on a location table, alternate-key tables or alternate-key location tables, entries and alternate-key blocks placed under exclusion may be at the middle point of binary search, but their exclusion is ignored and the binary search continues.

Exclusion Methods for Access by Primary Key

Access by primary key consists first of performing a binary search on a location table and retrieving an entry in the location table. Once the entry is retrieved, the block that entry points to is accessed. Since access is executed in this sequence, exclusion is effected in the sequence of the location table and then blocks. Exclusion is effected on the location table because entries in the location table may be updated.

If an overflow block is linked to a primary block, that overflow block is simultaneously placed under exclusion. This is because when a record is added or inserted, records may be moved and overflow blocks accessed, and also because updating may affect record length and likewise result in access to overflow blocks. When an alternate key is modified due to a record update, the entries in alternate-key tables concerned with that alternate key are updated. Where alternate-key location tables are not used, this results in exclusion effected on the alternate-key blocks concerned of alternate-key tables and on alternate-key overflow blocks linked to those alternate-key blocks, and where alternate-key key location tables are used, first exclusion is effected on alternate-key location tables and then on alternate-key blocks and alternate-key overflow blocks linked to those alternate-key blocks.

This is an exclusion sequence of location tables, then blocks, (then alternate-key location tables) and then alternate-key blocks.

Exclusion Methods for Alternate Keys

The following applies where access is by alternate key. Where alternate-key location tables are not used, first a binary search is performed on alternate-key tables and the alternate-key block containing the entry holding the target alternate-key value is retrieved. Where alternate-key location tables are used, a binary search is performed on alternate-key location tables, the entry containing the target key value retrieved, and the alternate-key block entry of the alternate-key block pointed to by that entry retrieved. Thus far, retrieval may be executed without effecting exclusion. No problems at all arise from not effecting exclusion.

Once the target alternate-key block entry is found, the information in that entry is then used to perform a search on the location table. As recited above, this search of the location table varies with the format of the alternate-key block entry.

Once the location table entry that contains the target primary key is retrieved, that location table entry is placed under exclusion. The block and overflow blocks pointed to by that location table entry are then placed under exclusion, and the record retrieved from those blocks. If the record is detected and the record updated, when this results in modification of the alternate-key value, the same action is taken as when performing a search by primary key.

Effecting exclusion in this fashion, the exclusion sequence is one of location tables, then blocks, (then alternate-key location tables) and then alternate-key blocks. As recited with respect to alternate-key tables, where block addresses are maintained in alternate-key entries, when an alternate-key block entry is found, the block is accessed without passing through the location table because the block address is maintained in that entry. Therefore, the sequence of exclusion reverses (blocks, then the location table). Therefore, the method of maintaining block addresses in alternate-key location table entries is inadvisable from the viewpoint of deadlock.

Coordination with the Data Backup and Recovery System

An application of the reorganization of the present invention to the data backup and recovery system (Japanese Patent 2001-094678) proposed by the inventors is described with reference to FIG. 17 and FIG. 18.

Figure 17:
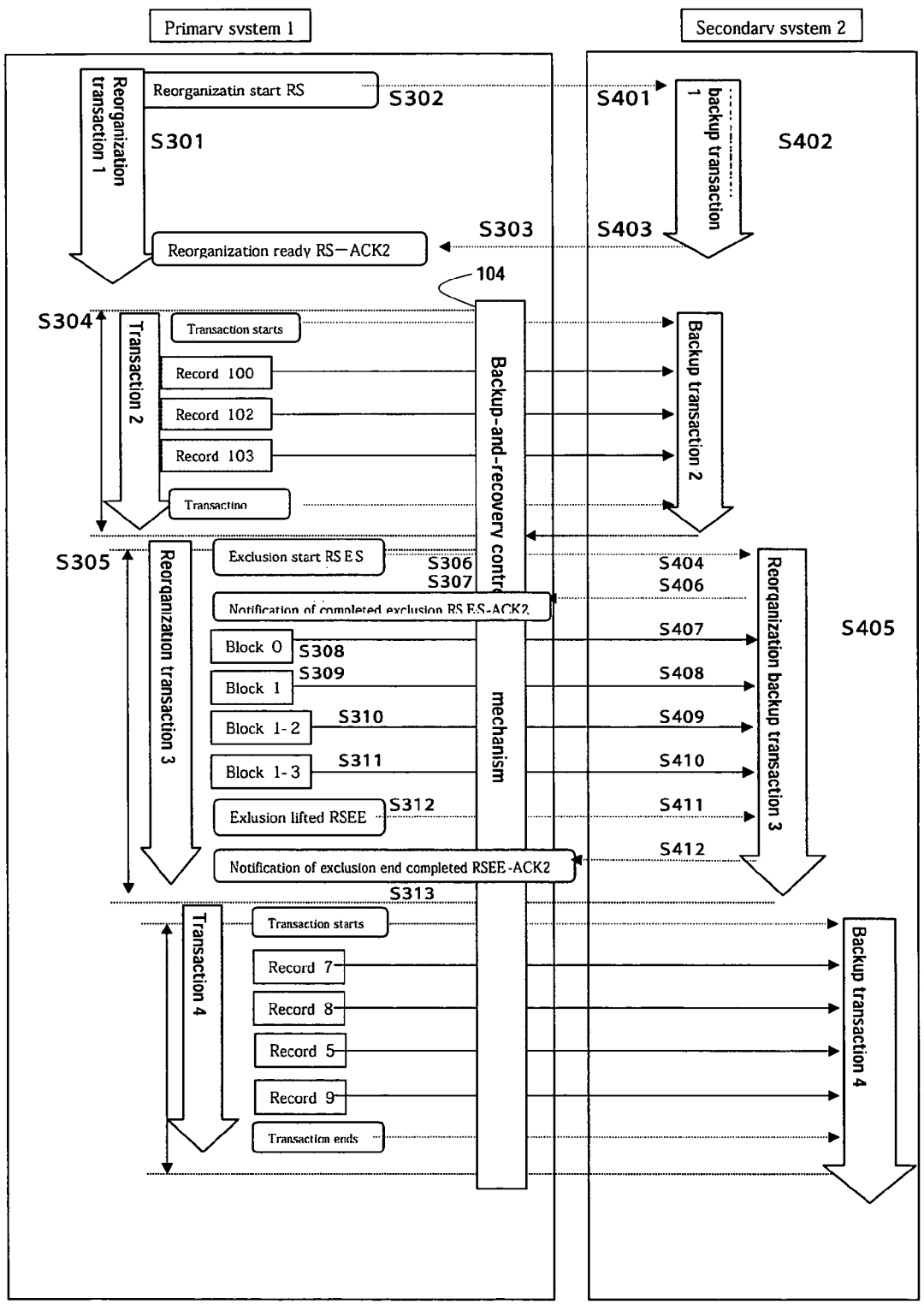
FIG. 17 is a flowchart illustrating operation in a synchronous tightly-coupled data backup and recovery system that is employed in the invention as it concerns either primary keys or alternate keys.

FIG. 17 is a flowchart illustrating operation in a synchronous tightly-coupled data backup and recovery system that is employed in the invention as it concerns either primary keys or alternate keys.

Figure 18:
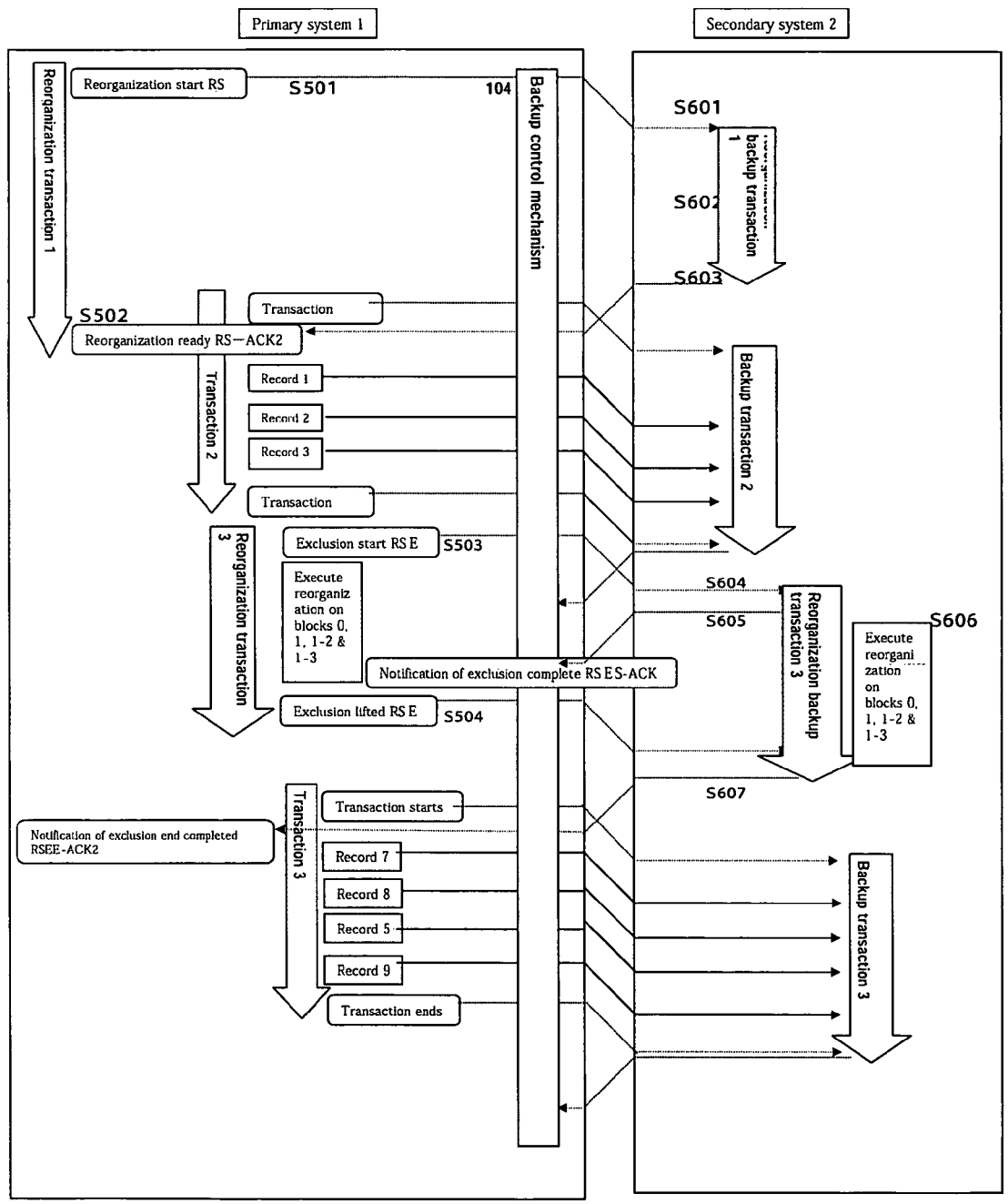
FIG. 18 is a flowchart illustrating operation in an asynchronous loosely-coupled data backup and recovery system that is employed in the invention as it concerns either primary keys or alternate keys.

FIG. 18 is a flowchart illustrating operation in an asynchronous loosely-coupled data backup and recovery system that is employed in the invention as it concerns either primary keys or alternate keys.

As shown in FIG. 17 and FIG. 18, this data backup and recovery system is comprised of a primary system 1 that performs the retrieval and updating of data and a secondary system 2 that makes backups of that data. As shown in FIG. 17 and FIG. 18, the primary system 1 is provided with a backup control mechanism 104. Additionally, as shown in FIG. 1, FIG. 2, and FIG. 9, the secondary system 2 is provided with a location table, alternate-key tables and alternate-key location tables and, employing the same reference numerals stated above, these are discussed with system numbers appended. The system number of the primary system is 1, and the system number of the secondary system is 2.

In the system illustrated in FIG. 17, each time data is modified in the primary system 1, a notification of modification is made to the secondary system 2 and the data is modified in the secondary system 2.

To describe the logs employed in this system, A logs contain information describing modifications to data, and B logs are maintained in order to restore the data to its original state when a transaction is canceled. Another purpose of B logs is to restore the data to some given past state. T logs are logs of transaction data. When data is incorrectly updated due to programming error, B logs may be used to restore the data to its state immediately prior to the program abnormality, and after the program is replaced with a properly-function one, T logs may be used to normalize the data. It is further possible to provide more than one secondary system 2, as needed.

Two implementations of the data backup and recovery system described above are recited, a synchronous tightly-coupled system in which data is updated to synchronize with the primary system 1 when A logs are transmitted to the secondary system 2 and an asynchronous loosely-coupled system in which data updates are delayed in the unsynchronized secondary system 2.

Key Issues in Adoption of Synchronous Tightly-Coupled Systems and Asynchronous Loosely-Coupled Systems A description follows of the key issues involved in the adoption of synchronous tightly-coupled systems and asynchronous loosely-coupled systems. As is well-known, the speed of light is approximately 300,000 km/sec. Calculating data-transmission time from the speed of light, we find as follows. The time required for transmission over a distance of 300 meters is 1 micro seconds, for transmission over a distance of 30 meters 100 nanoseconds and for transmission over a distance of three meters 10 nanoseconds. The following calculations also hold true for data transmission speeds. On equipment with a data transmission speed of one gigabit/sec, the time required to transmit one kilobyte of data on 1 gigabit/sec=100 megabytes/sec is 10 micro seconds.

A synchronous tightly-coupled implementation requires both a transmission delay proportional to distance and a transmission time proportional to data volume. Therefore, adoption of a synchronous tightly-coupled implementation must be premised on these time requirements.

Reorganization as Transaction

As recited above, the reorganization of the present invention is performed on from one to several tens of blocks, alternate-key blocks or the like in any given reorganization pass, and the reorganization is treated such that it appears to be a regular data processing transaction. In the data backup and recovery system (Japanese Patent 2001-094678, domestic priority claimed), backups are performed in transaction units and the scope of recovery is also determined according to whether transactions have completed or not.

The reorganization of the present invention is performed as a single transaction so as not to interfere with the data backup and recovery system recited above.

A Log Reorganization System Advantageous in Synchronous Tightly-Coupled Systems

The description concerns itself first with an A log reorganization system that is beneficial in a synchronous tightly-coupled implementation. The reorganization of the present invention is performed by reorganizing the primary system 1 and secondary systems 2 simultaneously. When executing reorganization on the location table entry 123 on the primary system 1, for example, reorganization of the secondary location table entry 123 is performed on all secondary systems 2. The secondary systems 2 in this case use the A log transmitted from the primary system 1 to update the data on secondary systems 2.

The description first concerns itself with the reorganization of location tables and blocks in an application to the data backup and recovery system of the database reorganization system that is a preferred embodiment of the present invention as it concerns primary keys.

As the reorganization system has already been described in detail and is implemented likewise on secondary systems 2, the description following emphasizes coordination of the primary system 1 and secondary systems 2. While this description of the present invention is for a single secondary system 2, it is implemented in like fashion on multiple secondary systems 2. The system number of secondary systems is 2.

Next, drawing 3 and drawing 17, used in the foregoing description, are used below to describe the operation of the primary system and the secondary system.

In FIG. 3 and FIG. 17, in order to perform reorganization, a log from the primary system 1 is required notifying the secondary system 2 to that effect. This is termed "RS information". This is information to start reorganization and, in addition to information on which key (location table or alternate-key tables) to effect reorganization on, it also includes such information as suitable initial storage rates. In this case, the object of reorganization is a location table.

In FIG. 17 processing of reorganization transaction 1 begins (S301 in FIG. 17), and first a transmission of RS information is made (S302 in FIG. 17) from the primary system 1 to the secondary system 2.

After receiving (S401 in FIG. 17) the RS information, the secondary system 2 creates reorganization pointers RPLC2 and RPLN2, and a region is reserved (S402 in FIG. 17) for a new location table LN2. The initial value of the reorganization pointer RPLC2 is the first address in the current location table LC2, and the initial value of the reorganization pointer RPLN2 is the first address in the new location table LN2. When this has been done, the secondary system 2 transmits (S403 in FIG. 17) RS-ACK2 information to the primary system 1.

After receiving (S303 in FIG. 17) the RS-ACK2 information, the primary system 1 begins actual reorganization work.

The above series of operations constitutes a transaction on the primary system 1 and the secondary system 2. Although this is reorganization transaction 1 and may be distinguished from other transactions in FIG. 17, there is in fact no need to classify types of transactions and it may be treated in like fashion as a regular transaction.

In FIG. 17, next the processing of a regular transaction 2 is executed (S304 in FIG. 17) on the primary system 1. Next, a reorganization transaction 3 is executed (S305 in FIG. 17) on the primary system 1. On primary system 1, as shown in FIG. 3, location tables LC1 and LN1 and, as necessary, blocks 10 are referenced and the first reorganization range determined. For example, assume block number 0 of the blocks 10, block 1 of the blocks 10, block number 1-2 of its overflow blocks 13 and block number 1-3 of its overflow blocks 14 are objects of the reorganization. In this case, notification is given (S306 in FIG. 17) from the primary system 1 to the secondary system 2 in RSES information to exclude block numbers 0 and 1 of the blocks 10 and block numbers 1-2 and 1-3 of the overflow blocks 13 and 14 and to execute reorganization with these blocks as the objects of the first reorganization, and on primary system 1 exclusion of block numbers 0 and 1 of the blocks 10 and block numbers 1-2 and 1-3 of the overflow blocks 13 and 14 is executed.

Once the RSES is received (S404 in FIG. 17), except in special cases where reorganization cannot be executed, exclusion of block numbers 0 and 1 of the blocks and block numbers 1-2 and 1-3 of the overflow blocks is executed (S405 in FIG. 17) immediately on the secondary system 2. The secondary system 2 then transmits (406 in FIG. 17) to the primary system 1 RSES information, which is notification that the exclusion is done.

Reorganization of block numbers 0, 1, 1-2 and 1-3 of the blocks 10 is then executed on the primary system 1. As a result, changes occur in location table LN entries and in block numbers 0 and 1 of the blocks 10 and block numbers 1-2 and 1-3 of the overflow blocks 13 and 14, and these changes are transmitted (S307 through S311 in FIG. 17) to the secondary system 2 in the form of an A log. In logical terms, this is the same as an A log involving regular record updates, and so once the A log has been received, that A log is applied (S407 through S410 in FIG. 17) to the corresponding entries and blocks on the secondary system 2.

Application of the A log is as follows. The A log gives notification of block numbers to identify which entries in the location table and which parts of blocks are at issue. Where an overflow block is linked to a primary block, one method that may be employed for the notification given of block numbers if operations are to be performed on these collectively as one object is to transmit as the A log post-update information of the whole of the primary block and any overflow blocks linked to it, but since this involves the transmission of large volumes of data, the volume of data transmitted may be reduced by transmitting it with identification numbers indicating which overflow block number the log concerns. Another way is, reckoning the primary block and any overflow blocks linked to it as a whole, to extract only the portion updated and transmit it in a format providing offset, length and post-update data.

Logic Transmission

The following implementation is also advantageous. Reorganization entails changes to blocks as a whole, but the content of records does not change. In the elimination of fragmentation and the reservation of suitable initial storage rates in particular, there is much movement of records within blocks and between blocks, and in such cases the volume of data transmitted may be greatly reduced by the movement logic itself as an L (logic) log. An example of such logic would be the 1500-byte rightward movement of all the records within an overflow block and then the movement to the overflow block of the 91st and subsequent records within a primary block.

In the secondary system 2, that logic is applied to manipulate (S405 in FIG. 17) those blocks on the basis of this L log.

To consider the volume of a transmission, assuming blocks of a size of 16 kilobytes and given one hundred 150-byte records internal to a primary block 1 and eighty likewise 150-byte records in an overflow block, transmission as is of post-update information in an A log would require the transmission of block information in addition to the transmission of 150×90=13,500 bytes.

On the other hand, a transmission of the logic involved would amount to a transmission volume of 1,000 bytes or less. Further, a logic format that may readily be executed by an interpreter is preferable, since it is troublesome to execute what is required by a compiler.

Additionally, while it goes without saying, that this logic, consists solely of that required to apply this portion of the reorganization at this point in time and, that application having been completed, may be discarded.

Application of Logic Transmissions to the Data Backup and Recovery System

This logic transmission may be applied to the data backup and recovery system. The data backup and recovery system employs a method of transmitting to secondary systems either the content of modified blocks itself or those portions that are modified, but when a record is inserted, multiple records are moved within a block. Since the records themselves are not modified, an L log is transmitted and the records in those blocks are manipulated in the secondary system on the basis of the logic transmitted.

As recited with respect to the reorganization of location tables and blocks, when blocks are reconfigured, alternate-key tables may, depending on the format of alternate-key table entries, be updated and so these are likewise transmitted as A logs. When performing reorganization, information transmitted as A logs must be identified as for the current new location table LC1 or the new location table LN1. This is because not doing so would result in mistaken updates. In order to prevent this, A logs contain identification of whether they apply to the current location table LC2 or the new location table LN2.

Mistaken updates may thus be prevented. An A log must also include reorganization pointers. Reorganization pointers are important in understanding how far reorganization has progressed, but this is also because, where a secondary system 2 is used as a reference system, it will not operate without reorganization pointers.

Block numbers 0, 1, 1-2 and 1-3 of the blocks 10 are reconfigured (S304 in FIG. 17) on the primary system 1, and once the blocks are done, the modified content of the blocks and the location table is transmitted (S308 in FIG. 17) is transmitted to the secondary system as an A log. When the secondary system 2 receives (S407 in FIG. 17) the A log, it rewrites (S405 in FIG. 17) the new location table LN2 and the blocks in accordance with that information.

When reorganization of block numbers 0 and 1 of the blocks 10 and block numbers 1-2 and 1-3 of the overflow blocks 13 and 14 is done on the primary system 1, exclusion is lifted on those blocks and RSEE information is transmitted (S312 in FIG. 17) to the secondary system. After the RSEE information is received (S411 in FIG. 17) and block numbers 0 and 1 of the blocks and block numbers 1-2 and 1-3 of the overflow blocks have been processed, exclusion is lifted on those blocks in the secondary system 2 and RSEE-ACK2 information is transmitted (S412 in FIG. 17) to the primary system 1.

Thus, as reorganization proceeds on the primary system 1, it is possible to perform reorganization simultaneously on the secondary system 2, synchronizing the primary system 1 and the secondary system 2, by transmitting A logs to the secondary system 2 and immediately updating those blocks or other entities on the secondary system 2.

Reorganization is executed sequentially and, once reorganization is done through the entry immediately prior to that pointed by the final pointer of the current location table LC, the reorganization of the location table and blocks as a whole is done.

Next, the description concerns itself with the application of the second and third preferred embodiments of the present invention to the data backup and recovery system.

First, the description concerns itself, with reference to FIG. 18, with the reorganization of alternate-key tables. As recited for the description of the reorganization of location tables and blocks, in the reorganization of alternate-key tables, the alternate-key blocks and alternate-key overflow blocks affected by reorganization in a pass are determined, and that information is transmitted from the primary system 1 to the secondary system 2. Then the data updated in reorganization is transmitted as an A log from the primary system 1 to the secondary system 2, and on the basis of that information the pertinent alternate-key blocks and, where alternate-key location tables are used, alternate-key location tables are updated on the secondary system 2.

The volume of transmissions may be reduced in the case of alternate-key table reorganization by transmitting L logs instead of A logs.

Advantageous Employment of Parallel Reorganization in the Asynchronous Loosely-Coupled System Next, the description addresses asynchronous loosely-coupled systems. The method of updates by means of A logs may be implemented with asynchronous loosely-coupled systems as well, but there is a high probability that the update of the secondary system may be delayed due to actual delay resulting from the distance along the path of transmission or to delay in transmission of A logs over the path of transmission resulting from their volume.

The description of the benefits of parallel reorganization to an asynchronous loosely-coupled system makes reference to FIG. 18. As shown in FIG. 18, the primary system 1 and the secondary system 2 perform reorganization simultaneously in order to implement the reorganization of the present invention. Given the execution of reorganization on entry 123 in the location table in the primary system 1, for example, reorganization would be effected on the entry 123 in the secondary location tables in all secondary systems 2. In other words, while the primary system 1 and the secondary system 2 are discrete systems, they perform exactly the same operations. Where there are multiple secondary systems 2, all those secondary systems 2 execute reorganization at the same time as the primary system 1.

In order to perform reorganization, a log is required from the primary system 1 notifying the secondary system 2 to that effect. This is RS information. This RS information is information for starting reorganization and includes such information as suitable initial storage rates in addition to information on which keys (location table or alternate-key tables) are the object of reorganization. In this case reorganization is performed on the location table. The primary system 1 transmits (S501 in FIG. 18) this RS information to the secondary system 2.

After receiving (S601 in FIG. 18) the RS information, the secondary system 2 creates the reorganization pointers RPLC2 and RPLN2 and reserves space for the new location table LN2. (S602 in FIG. 18) Once this is done on the secondary system 2, RS-ACK2 information is transmitted (S603 in FIG. 18) to the primary system 1. After receiving (S502 in FIG. 18) the RS-ACK2 information, the primary system 1 begins to perform the actual reorganization operations.

The primary system 1 references the location table and, as required, blocks to determine the first range of reorganization. Take the example of block numbers 0 and 1 of the blocks and block numbers 1-2 and 1-3 of the overflow blocks on the primary system 1. Notification is made (S503 in FIG. 18) from the primary system 1 to the secondary system 2 of RSES information in an RSES log to place block numbers 01 of the blocks and block numbers 1-2 and 1-3 of the overflow blocks under exclusion and to execute reorganization with those blocks as the object of the first reorganization.

Once the RSES is received (S604 in FIG. 18), except in special cases where reorganization cannot be executed, the secondary system 2 transmits (S605 in FIG. 18) RSES-ACK2 to the primary system. Then, the secondary system 2 executes the elimination of overflow blocks, the elimination of fragmentation and the reservation of suitable initial storage rates with the same logic as the primary system 1. And when the primary system 1 has lifted exclusion, it transmits (S504 in FIG. 18) RSEE information to the secondary system 2 as notification that exclusion is lifted.

On the secondary system 2 the block numbers 0 and 1 of the blocks and the block numbers 1-2 and 1-3 of the overflow blocks linked to block number 1 are reorganized (S606 in FIG. 18), and when that is done, RSEE-ACK2 information is transmitted (S607 in FIG. 18) is transmitted to the primary system 1 as notification that exclusion has been lifted.

Since the primary system 1 and the secondary system 2 are not synchronized, an instruction for reorganization of the next block may be transmitted to the secondary system even if the reorganization of block numbers 0 and 1 of the blocks and block numbers 1-2 and 1-3 of the overflow blocks linked to block number 1 is not done on the secondary system 2.

Next, the description addresses the reorganization of alternate-key tables. In the reorganization of alternate-key tables, as recited for the reorganization of location tables and blocks, the alternate-key blocks and alternate-key overflow blocks that are the objects of one pass of reorganization are determined, and that information is transmitted from the primary system to the secondary system. Reorganization is then performed on the secondary system, and when reorganization of the alternate-key blocks that are objects of the pass of reorganization is done, RSEE information is transmitted from the secondary system to the primary system.

Recovery Procedure

Recovery should be executed from a synchronous tightly-coupled secondary system. The reason is that recovery may take a long time in an asynchronous loosely-coupled system because its components are physically distant and its transmission path lacks sufficient capacity. When a recovery request occurs, first a check is made whether the current transaction has completed on the primary system. If it has completed on the primary system, that backup transaction is allowed to complete on the secondary system. If the transaction is uncompleted and has been canceled on the primary system, the B log concerning the backup transaction is used to restore the data on the secondary system to its state prior to execution of the transaction.

Then, some or all of the location table entries, blocks (primary blocks and overflow blocks), alternate-key location table entries, alternate-key blocks or alternate-key overflow blocks requested by the primary system are transmitted from the secondary system to the primary system. The data on the primary system is restored on the basis of the information transmitted from the secondary system. The restoration of the data differs between hardware failure and simple missing data.

If a hardware failure, it is not possible to write the data back to the location of the original data on the primary system, and so the space for recovery is secured in a new storage region. For example, where the storage region of a part of the entries of a location table has been destroyed, that portion alone may be newly reserved and used as a discontiguous location table or a new region may be reserved for the entire location table and the location table placed in a contiguous region. Although location tables hold block addresses, when a recovery is not performed on the blocks themselves, there will be no modification of entry information.

If the blocks, a region for the blocks may be reserved and the blocks written to on the basis of the recovery information transmitted from the secondary system. However, since the addresses of those blocks will be modified in this case, the block addresses in the affected entries of the location table must be rewritten. Further, where alternate-key table entries hold block addresses, it will be necessary to rewrite those alternate-key entries and the recovery will take considerable time. Therefore, this aspect too must be given consideration in the selection of a format for alternate-key entries.

Notes

A database system may also be implemented as follows. A data and database system on computers may be characterized by capability for storage of multiple entries each comprising an alternate key, the block number storing the applicable record and the primary key of the applicable record, the use of alternate-key blocks that may be reserved contiguously in advance in an identical size and in their requisite number, the use of alternate-key location tables that place the numbers assigned to those alternate-key blocks in correspondence with their physical location in storage devices in order to manage the locations of those alternate-key blocks in those storage devices, the storage of alternate-key entries in the key blocks in the order of their alternate keys, the allocation of new alternate-key overflow blocks and the storage in them of alternate-key entries when the alternate-key blocks are unable to store further entries, and the management of the location of the alternate-key blocks in the storage devices by means of alternate-key location tables, and when data is retrieved by an alternate key, the entry containing the target alternate-key value may be found by searching the alternate-key location tables, the block storing the target record may be known from that entry and the record may be retrieved from that block.

Disallowing Synchronization of Reorganization in a Secondary System

Coordination with the backup and recovery system recited above is of reorganization executed on a synchronized primary system and secondary system.

Reorganization may also be executed on an unsynchronized primary system and secondary system. A description follows.

In the backup and recovery system, it is known by means of the transmission of A logs from the primary system to the secondary system which records have been modified in what manner, and data on the secondary system is modified on the basis of the A logs. Also, in the backup and recovery system, "In addition to the content of the post-update data (A log), the nature of the update (differentiating among updates, additions and deletions) and file identification, the message should also include the number of the block where the data is stored and the leading address of the record in the block. The transmission of this data speeds up the reading of the locations written to on the secondary system 2."

Since records include primary keys, it is possible to identify which records are affected if the content of the records is known, but block numbers and offsets within blocks should be included for purposes of acceleration.

If only record content and the nature of the update are transmitted as the A log here, it is not possible to readily determine on the secondary system which blocks are affected, and it is necessary perform a binary search of the location table, in like fashion to regular access, to find the blocks affected. This means that on the secondary system the storage location of records modified in backup may be known by means of performing a binary search on the location table.

And in the reorganization recited above, the use of reorganization pointers permits determination of whether to use the current location table or the new location table, and this allows the definitive retrieval of records and other access regardless of how far in the location table reorganization has advanced.

Therefore, it is possible to obtain a backup even where the primary system and the secondary system are not at all synchronized.

Figure 21:
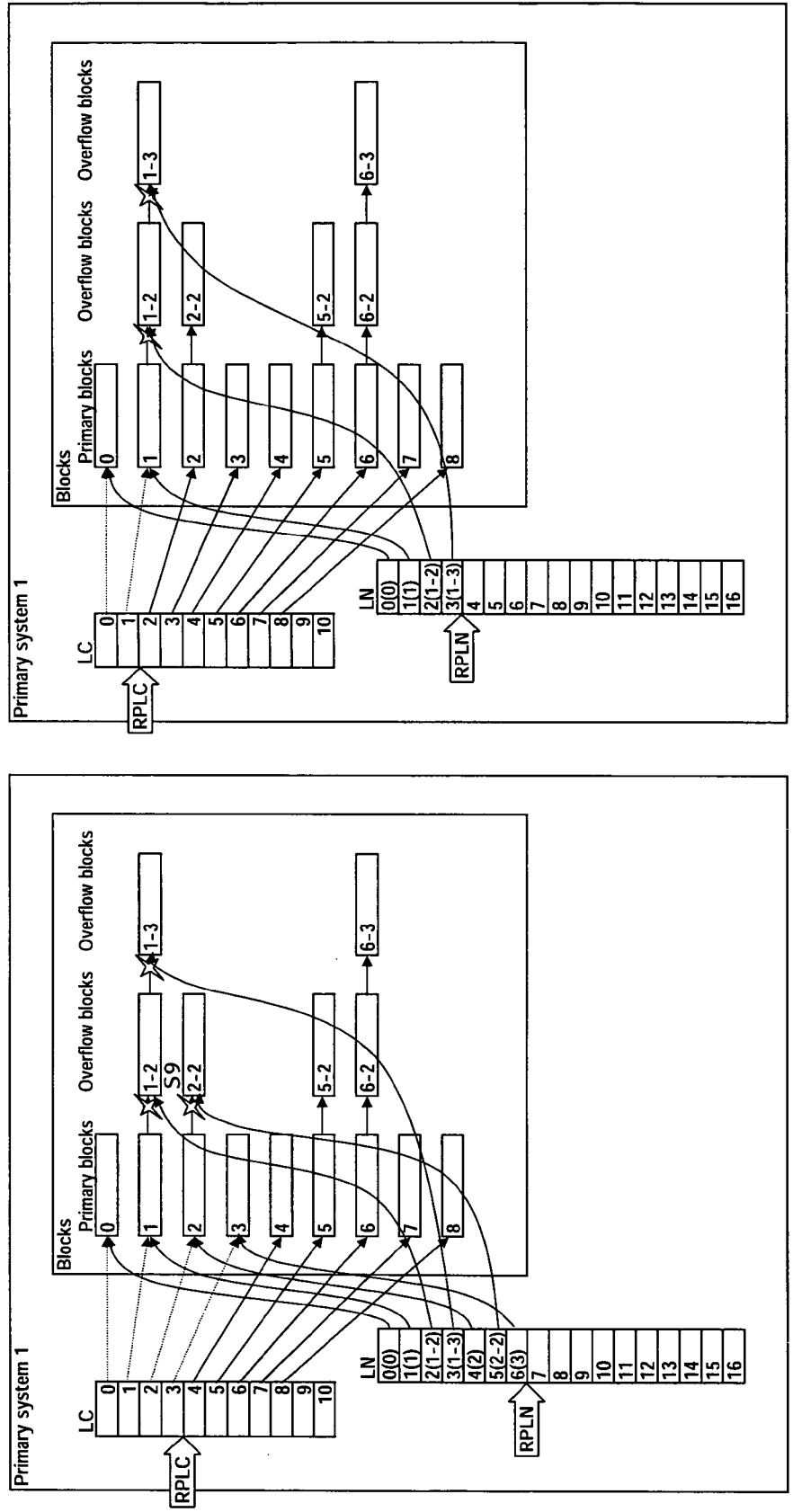
FIG. 21 illustrates the execution of reorganization where the primary system and secondary system are asynchronous.

A more specific description makes reference to FIG. 21. FIG. 21 illustrates a state in which, in the primary system, reorganization has completed through entry 3 in the current location table and through entry 6 in the new location table. On the other hand, it illustrates a state in which, in the secondary system, reorganization has completed through entry 1 in the current location table and through entry 3 in the new location table. It is known that in this case backup may be executed with no problems on the blocks managed in the current location table entries through entry 1 and from entry 4 onward. However, although reorganization of entries 2 and 3 (actually entries 4, 5 and 6 in the new location table) in the current location table has been completed on the primary system, their backup on the secondary system has not been completed.

Assume modification of a record stored in block 3 in these circumstances. On the primary system this block is managed by entry 6 in the new location table and its new block number is 6. Meanwhile, on the secondary system it is managed in the current location table and its block number remains 3. Since the block numbers do not correspond in this case, transmission of the block number is meaningless. The record content and segment modified are transmitted from the primary system. In this case, the record is updated. On the secondary system, a binary search is performed on the location table on the basis of the primary key contained in the record. Since it is greater than the reorganization pointer in this case, the binary search is performed on the current location table. The record is then determined to be one in block 3, and that record in block 3 is updated. Thus, a backup may definitively be performed by determining which location table to use depending on whether the primary key is greater than or less than the reorganization pointer on the secondary system and performing a binary search.

Although the description above applies to location tables and blocks, it is possible in entirely likewise fashion to obtain backups of alternate-key location tables and alternate-key blocks without synchronizing the primary system and the secondary system. To expand, it is possible to reorganize a primary system and to perform reorganization on a secondary system at a different time without reorganizing the secondary system at the same time.

The advantage of this system is that since it is not necessary to synchronize the primary system and the secondary system, the overhead required for scheduling may be eliminated. It may also be mentioned it would be a simple matter to perform recovery when the primary system suffers a fault during the rewriting of a block on the primary system.

Next, with respect to recovery, where backups are obtained without synchronizing the primary system and the secondary system, as described above, it is readily imagined that the structure of blocks and alternate-key blocks may be different on the primary system and the secondary system.

Even in such circumstances, recovery is possible. Where a specific range of a location table is lost, the range of primary key values in the lost section of the location table may be known by reading the surrounding sections of the location table. Recovery is possible by reading the location table and blocks in that range from the secondary system and reproducing them on the primary system. This applies likewise to alternate-key location tables.

Where a specific range of blocks is lost, entirely likewise to the above, recovery is possible by specifying the range lost, reading the location table and blocks in that range on the secondary system and reproducing them on the primary system. This applies likewise to alternate-key location tables.

ADVANTAGES OF THE INVENTION

Accordingly, several objects and advantages of the present invention are as follows.

Owing to the provision of a current location table and a new location table, the processing of one or multiple blocks in a pass and the sequential transfer of entries from the current location table to the new location table, reorganization may be effected without suspension of operation of the system.

As only the space for the new location table is required when effecting reorganization, reorganization is possible with a far smaller region than has been required in conventional systems.

The three objects of the elimination of overflow blocks, the elimination of fragmentation and the reservation of suitable initial storage rates may be accomplished at once in reorganization.

Owing to the provision of a reorganization pointer to each of the current location table and the new location table and the storage in the reorganization pointers of the locations where sequential reorganization of single or multiple blocks terminated in a given reorganization pass, a target record may be definitively retrieved even during reorganization because, when a record is retrieved during reorganization by means of its primary key, the target primary-key value is compared with the primary-key value of the record contained in the primary block or overflow block of the entry pointed to by the reorganization pointers and the current location table is used to retrieve the target record when the target primary-key value is found to be greater than or equal to the primary-key value of the record stored in the block pointed to by the reorganization pointers and the new location table used to retrieve the target record when it is found to be less than that primary-key value. Records may likewise be updated, added and deleted.

Due to the use of reorganization pointers, reorganization may be suspended and resumed at any time. It is therefore possible to perform reorganization without scheduling time for reorganization.

Owing to the provision of a reorganization pointer to each of the current alternate-key location table and the current alternate-key location table and the storage in the reorganization pointers of the locations where sequential reorganization of single or multiple blocks terminated in a given reorganization pass, a target record may be definitively retrieved even during reorganization because, when a record is retrieved during reorganization by means of an alternate key, the target alternate-key value is compared with the alternate-key value of the entry contained in the alternate-key block of the entry pointed to by the reorganization pointers and the current alternate-key location table is used to retrieve the target entry when the target alternate-key value is found to be greater than or equal to the alternate-key value of the record entry in the alternate-key block pointed to by the reorganization pointers and the new alternate-key location table used to retrieve the target entry when it is found to be less than the alternate-key value of that entry.

Owing to the provision of a reorganization pointer to each of the current alternate-key table and the new alternate-key table and the storage in the reorganization pointers of the location through which reorganization is done in a given reorganization pass, a target record may be definitively retrieved even during reorganization because, when a record is retrieved during reorganization by means of an alternate key undergoing reorganization, the target alternate-key value is compared with the alternate-key value of the entry contained in the alternate-key block of the entry pointed to by the reorganization pointers and the current alternate-key location table is used to retrieve the target record when the target alternate-key value is found to be greater than or equal to the alternate-key value of the entry stored in the alternate-key block pointed to by the reorganization pointers and the new alternate-key location table used to retrieve the target record when it is found to be less than the alternate-key value of that entry. Records may likewise be updated, added and deleted.

Owing to the ability to execute reorganization as a transaction like to that of the updating, addition or deletion of a record and owing to the consistency of the sequence of exclusion of location tables, blocks, alternate-key location tables and alternate-key blocks, the system is not susceptible to deadlock.

The integrity of data maintenance is assured because the data backup and recovery recited in Japanese Patent for a data backup and recovery system may be effected together with the reorganization of the present invention.

What is claimed is:

1. A database reorganization system, comprising
a database system that holds data records having data items including primary keys,
primary blocks that store the data records in the order of their primary keys
overflow blocks linked to the primary blocks; and
a location table reserved in a contiguous region and contains location table entries, said location table entry contains addresses of the primary block, to retrieve a target record by means of binary searches performed on the location tables, said database reorganization system further comprising:
a current location table and a new location table in contiguous regions for containing location table entries describing the addresses of the primary blocks to sequentially write location table entries in the current location table to the new location table,
a current location table reorganization pointer that indicates next address of current location table entry which had written location table entry to new location table and indicates through which entry in the current location tables reorganization has completed;
a new location table reorganization pointer that indicates next address of new location table which had written location table entry in the new location table and indicates through which entry in the new location table reorganization has completed; and
a current location table final pointer that indicates the final position used by said location table.

2. The database reorganization system of claim 1, wherein the database recognition system is configured to sequentially write entries in the current location table to the new location table and, where any overflow block is present, to delink said overflow blocks, creating new entries corresponding to the primary blocks and adding the new entries to the new location table.

3. A method of reorganizing the database reorganization system of claim 1, comprising steps of:
when retrieving a record with the primary key during reorganization, evaluating whether the target primary key with the value is greater than or less than the primary key of the record contained in the primary block and the overflow blocks that the reorganization pointers is pointing to;
when the target primary key is evaluated to be greater than or equal to the primary key of the record stored in the block that the reorganization pointer is pointing to, using the current location table to retrieve the target record;
using the current location table to perform a binary search on the entries between the current reorganization pointer and the final pointer in the current location table;
when the target primary key is evaluated to be less than that primary key, using the new location table to retrieve the target record; and
using the new location table to perform a binary search between the first address in the new location table and the reorganization pointer.

4. A database reorganization system, comprising:
data records for holding data containing primary keys and alternate keys;
primary blocks that store the data records in the order of their primary keys;
overflow blocks linked to the primary blocks;
a location table reserved in a contiguous region;
a location table contains location table entries,
said location table entry contains addresses of the primary block,
alternate-key entries that hold data entries, each alternate-key entry comprises an alternate key and a primary key;
alternate-key blocks for containing the alternate-key entries; and
to retrieve data with an alternate key performing a binary search on the alternate-key location table
said database reorganization system further comprising:
alternate-key overflow blocks linked to the alternate-key blocks;
a current alternate-key location table and new alternate-key location table for containing alternate-key location table entries in contiguous regions;
a current alternate-key location table reorganization pointer that indicates a progress of reorganization of the alternate-key location table and alternate-key blocks for the current alternate-key location table; to sequentially write alternate-key location table entries in the current alternate-key location table to the new alternate-key location table, said current alternate-key location table reorganization pointer indicates next address of current alternate-key location table entry which had written alternate-key location table entry to new alternate-key location table;
a new alternate-key location table reorganization pointer that indicates a progress of reorganization of the alternate-key location table and alternate-key blocks for the new alternate-key location table, said new alternate-key location table reorganization pointer that indicates next address of new alternate-key location table which had written alternate-key location table entry in new alternate-key location table; and
an alternate-key final pointer that is provided to the current alternate-key location table to indicate the final position used by said alternate-key location table.

5. A method of reorganizing the database reorganization system of claim 4, comprising steps of:
sequentially writing entries in current alternate-key location table to a new alternate-key location table and, where alternate-key overflow blocks exists,
delinking the alternate-key overflow blocks, creating new alternate-key location table entries corresponding to the alternate-key blocks, and
adding new alternate-key location table entries to a new alternate-key location table.

6. A method of reorganizing the database reorganization systems of claims 4 comprising steps of:
when retrieving a record with the alternate key during reorganization, evaluating whether the target alternate key value is greater or less than the alternate key of the entry contained in the alternate-key block that said reorganization pointer is pointing to;
using the current alternate-key location table to retrieve the target entry when the target alternate key is evaluated by the comparative means to be greater than or equal to the alternate key of the entry stored in the alternate-key blocks that the reorganization pointer is pointing to; and
using the current alternate-key location table to perform a binary search on the entries between the current reorganization pointer and the final pointer in the current alternate-key location table;
using the new alternate-key location table to retrieve the target entry when the target alternate key is evaluated to be less than the alternate key;
using the new alternate-key location table to perform a binary search between the first address in the new alternate-key location table and the reorganization pointer.

* * * * *